(12) United States Patent
Yang et al.

(10) Patent No.: US 12,196,668 B2
(45) Date of Patent: Jan. 14, 2025

(54) METHODS FOR DETERMINING THE THERMODYNAMICS AND KINETICS OF COLLOIDAL PHASE SEPARATION ON A TEMPERATURE GRADIENT DEVICE

(71) Applicant: THE PENN STATE RESEARCH FOUNDATION, University Park, PA (US)

(72) Inventors: Tinglu Yang, State College, PA (US); Bradley Rogers, State College, PA (US); Paul S. Cremer, State College, PA (US)

(73) Assignee: THE PENN STATE RESEARCH FOUNDATION, University Park, PA (US)

( * ) Notice: Subject to any disclaimer, the term of this patent is extended or adjusted under 35 U.S.C. 154(b) by 885 days.

(21) Appl. No.: 17/347,166

(22) Filed: Jun. 14, 2021

(65) Prior Publication Data

US 2022/0003661 A1 Jan. 6, 2022

Related U.S. Application Data

(63) Continuation-in-part of application No. PCT/US2019/066673, filed on Dec. 17, 2019.

(60) Provisional application No. 62/780,145, filed on Dec. 14, 2018.

(51) Int. Cl.
| | |
|---|---|
| *G01N 21/17* | (2006.01) |
| *G01K 11/00* | (2006.01) |
| *G01N 1/38* | (2006.01) |
| *G01N 21/03* | (2006.01) |
| *G01N 21/47* | (2006.01) |
| *G01N 21/49* | (2006.01) |
| *G01N 21/51* | (2006.01) |
| *G01N 21/64* | (2006.01) |

(52) U.S. Cl.
CPC ........ *G01N 21/1717* (2013.01); *G01K 11/00* (2013.01); *G01N 1/38* (2013.01); *G01N 21/03* (2013.01); *G01N 21/4795* (2013.01); *G01N 21/49* (2013.01); *G01N 21/51* (2013.01); *G01N 2021/1731* (2013.01); *G01N 2021/1744* (2013.01); *G01N 21/6458* (2013.01)

(58) Field of Classification Search
CPC ............... G01N 21/1717; G01N 21/03; G01N 21/4795; G01N 21/49; G01N 21/6458; G01N 21/51; G01N 1/38; G01N 2021/1744; G01N 2021/8405; G01K 11/00
See application file for complete search history.

(56) References Cited

U.S. PATENT DOCUMENTS

| | | | | |
|---|---|---|---|---|
| 3,807,865 | A * | 4/1974 | Gordon .................. | G01N 25/02 356/337 |
| 4,609,343 | A * | 9/1986 | Tejfalussy ............... | F27D 19/00 432/55 |
| 5,340,613 | A * | 8/1994 | Hanzalik .................. | B05D 7/52 427/398.1 |
| 2004/0005720 | A1* | 1/2004 | Cremer ............... | B01L 3/50851 435/7.1 |

(Continued)

*Primary Examiner* — Helen C Kwok
(74) *Attorney, Agent, or Firm* — Riverside Law LLP

(57) ABSTRACT

The present invention provides improved methods for characterizing kinetics and thermodynamics of solutions containing macromolecules over a range of concentrations, temperatures, pH, and added excipients in order to improve their long term stability.

24 Claims, 56 Drawing Sheets

(56) References Cited

U.S. PATENT DOCUMENTS

| | | | |
|---|---|---|---|
| 2009/0306311 A1* | 12/2009 | Reed | G01N 21/82 422/119 |
| 2010/0063174 A1* | 3/2010 | Ruberti | C08J 3/075 222/146.2 |
| 2014/0294707 A1* | 10/2014 | Hoshino | F03G 7/005 422/600 |
| 2015/0321408 A1* | 11/2015 | Chen | B29C 55/06 264/28 |
| 2016/0009705 A1* | 1/2016 | Ostrow | A61K 9/0048 514/304 |
| 2019/0029147 A1* | 1/2019 | Cordes | B32B 15/085 |

* cited by examiner

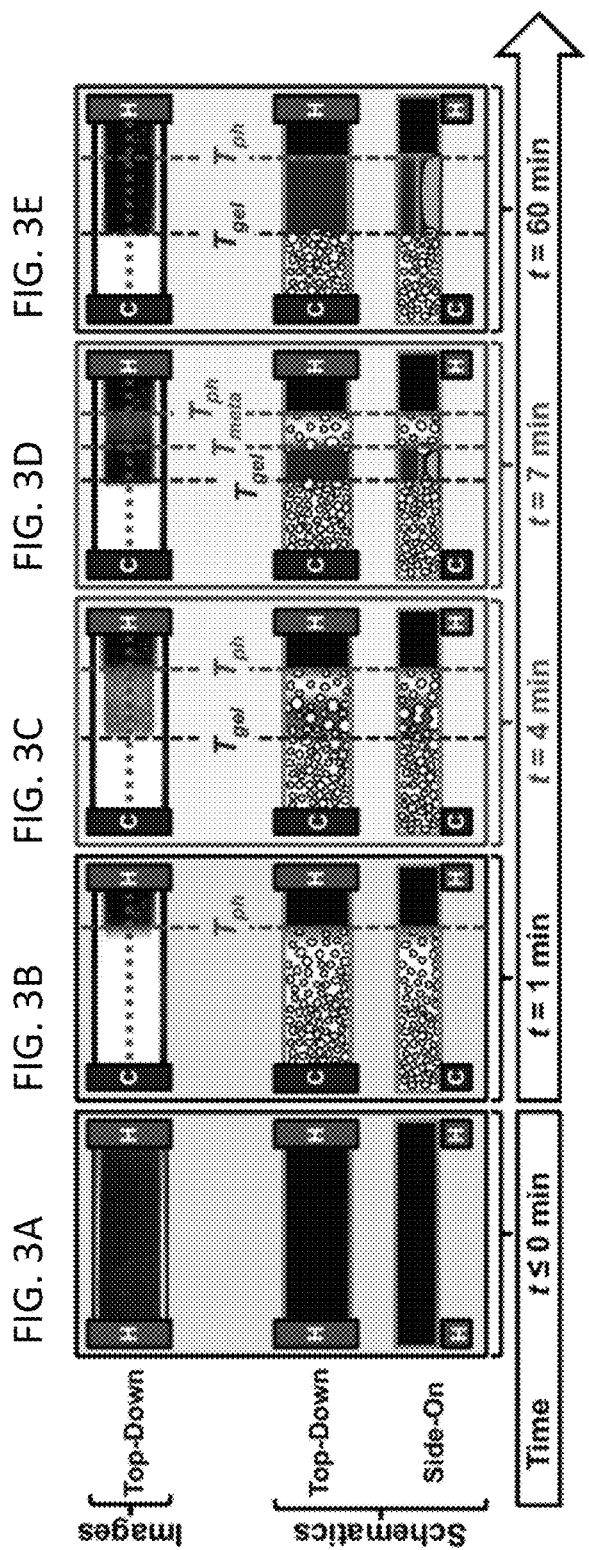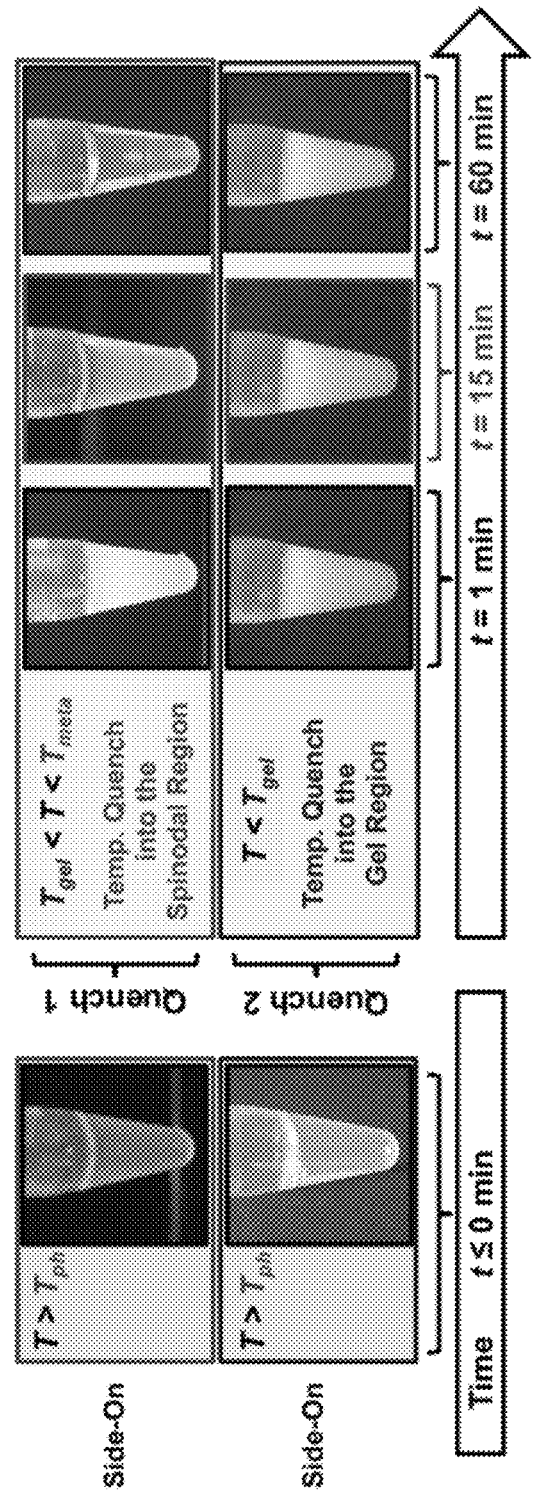

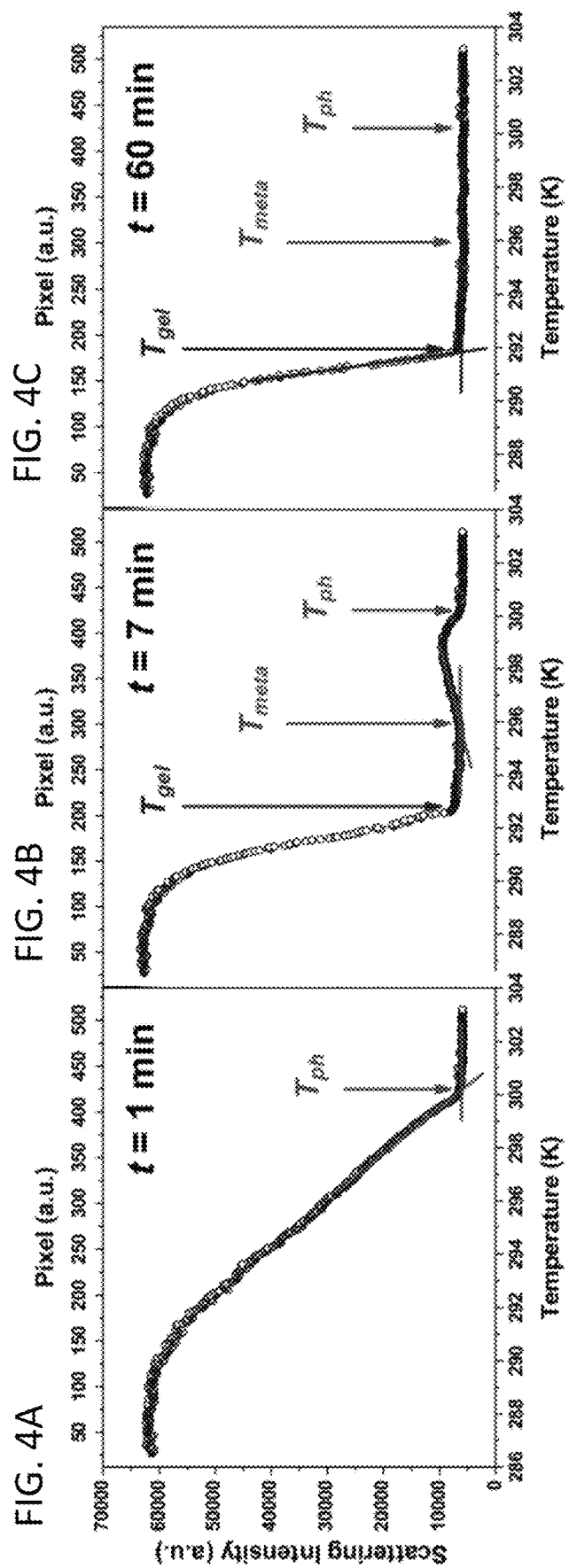

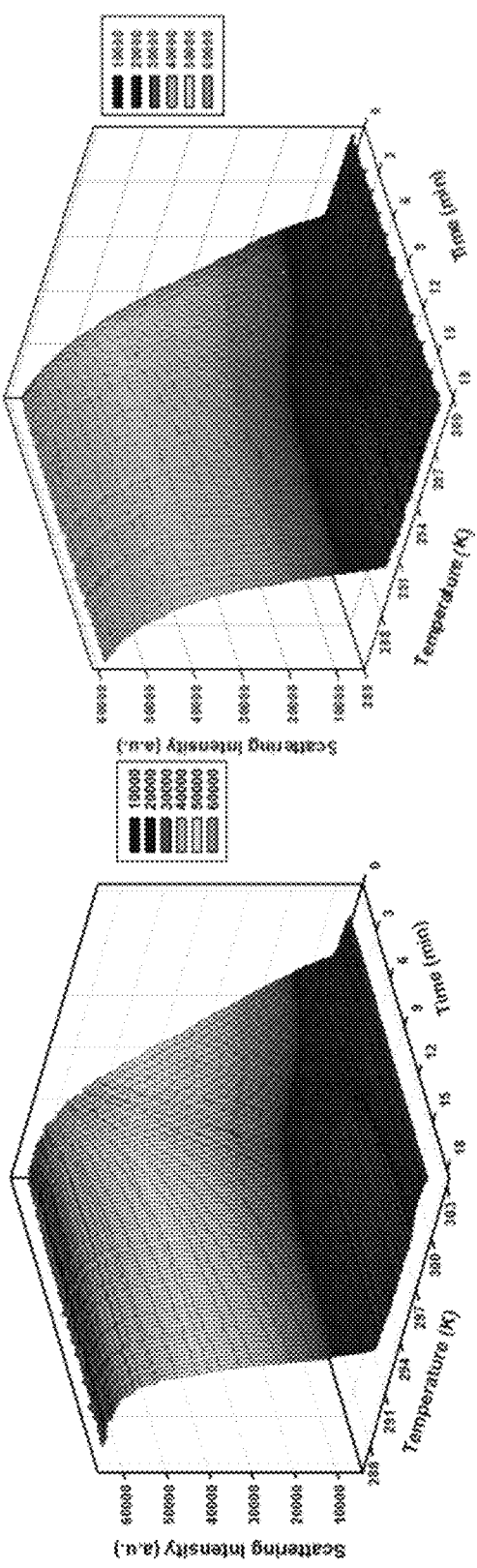
FIG. 6A
FIG. 6B
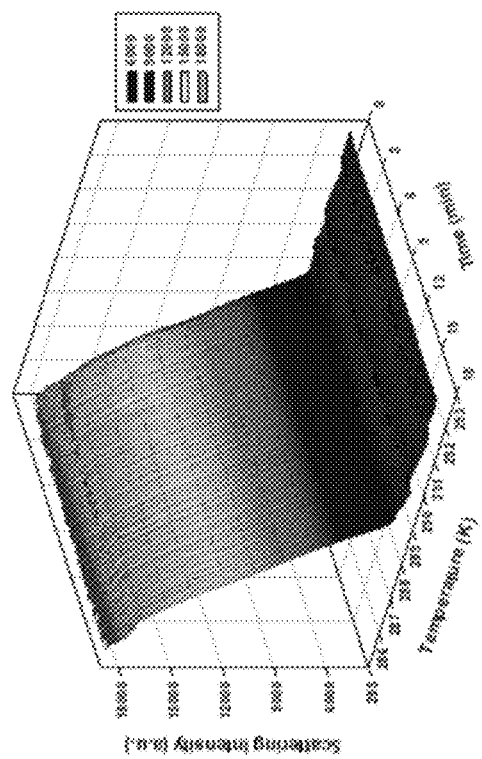
FIG. 6C
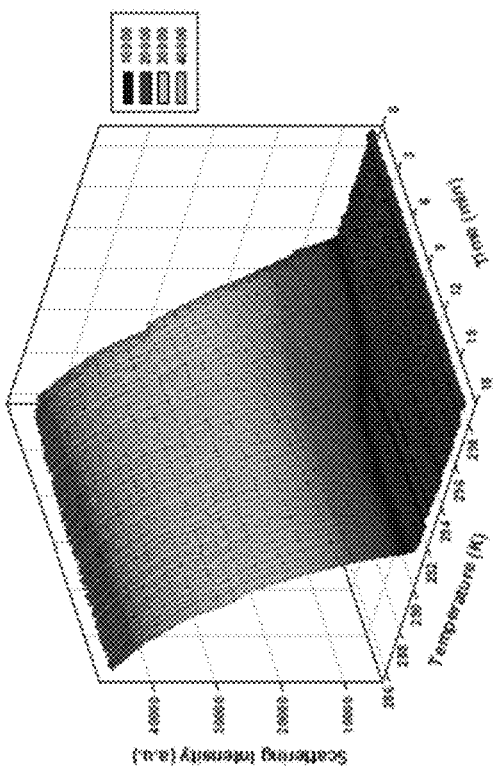
FIG. 6D

| mAb Conc. (mg/mL) | $\tau_\theta$ (s) | $T_\theta$ (K) | $D$ (a.u.) |
|---|---|---|---|
| 90 | 0.57 | 289.6 | 0.05 |
| 60 | 0.24 | 288.7 | 0.08 |
| 40 | 0.28 | 288.9 | 0.07 |

FIG. 12

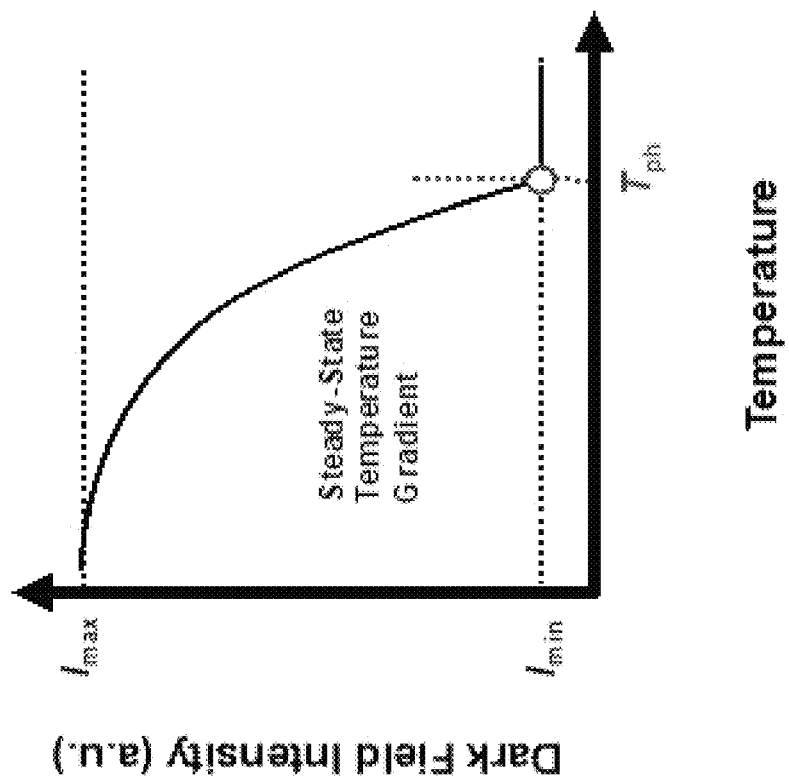
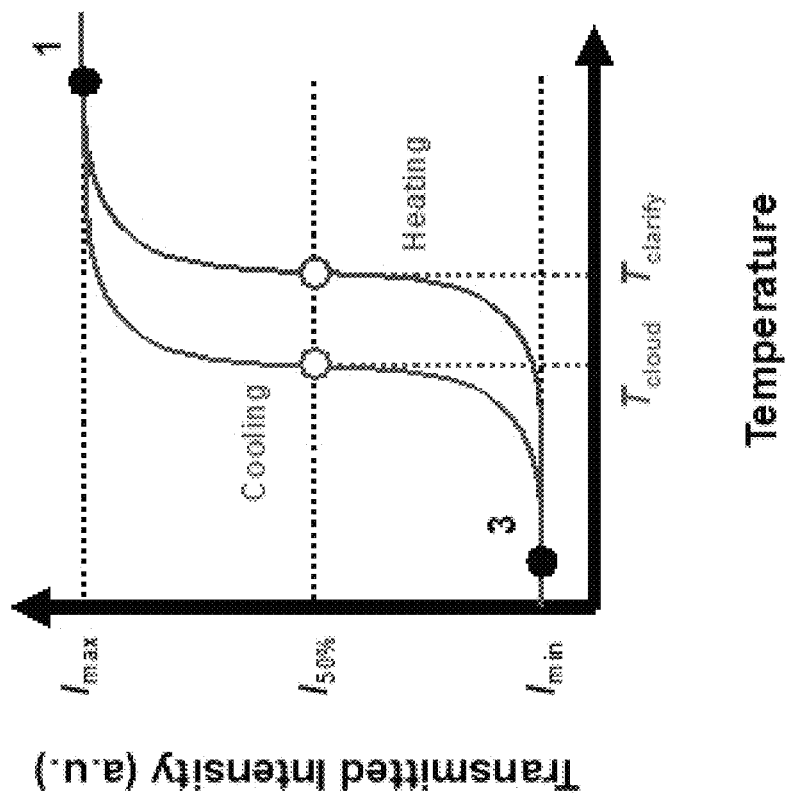
FIG. 23A
FIG. 23B $$y = (1 - s(x)) * f(x) + s(x) * g(x)$$
$$f(x) = m_1 * x + b_1$$
$$g(x) = m_2 * x + b_2$$
$$s(x) = 0.5 + 0.5 * \tanh\left(\frac{x - c}{w}\right)$$

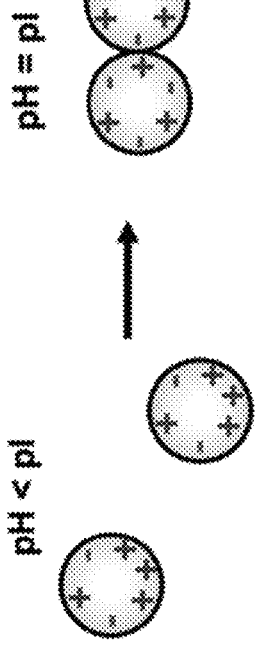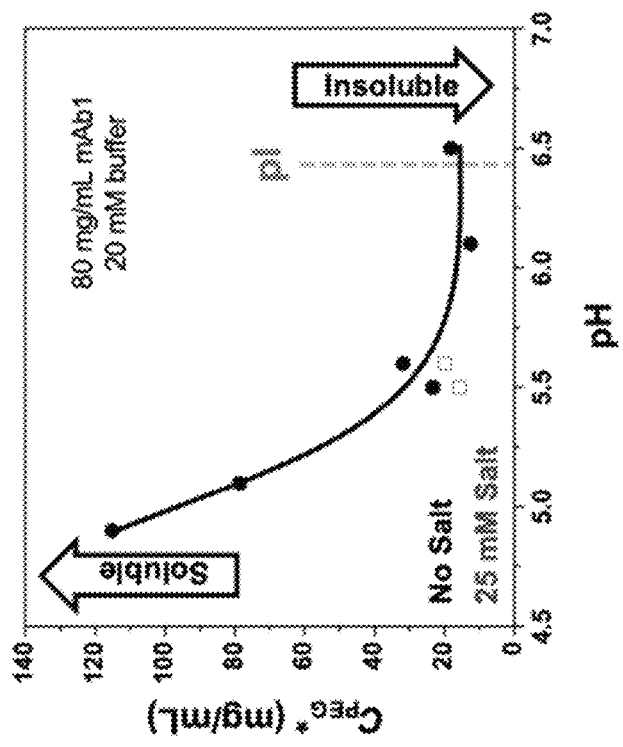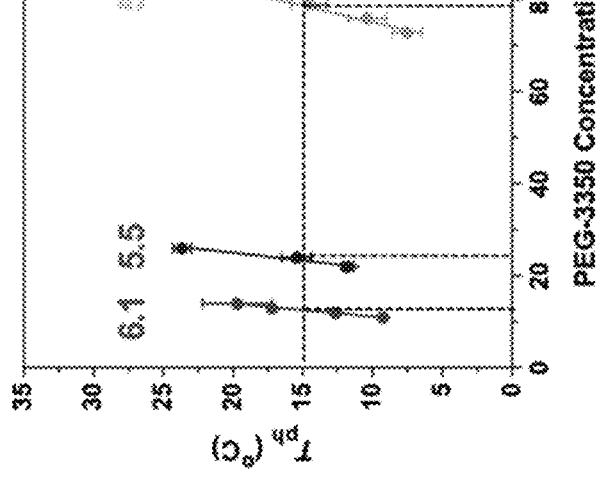
FIG. 42

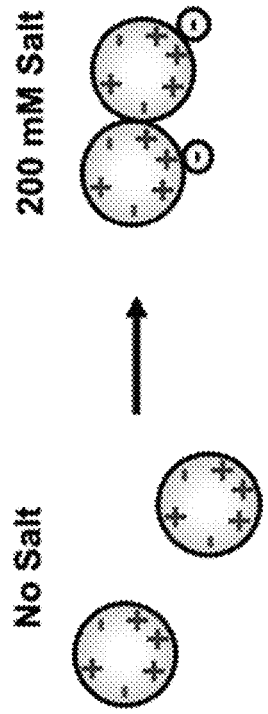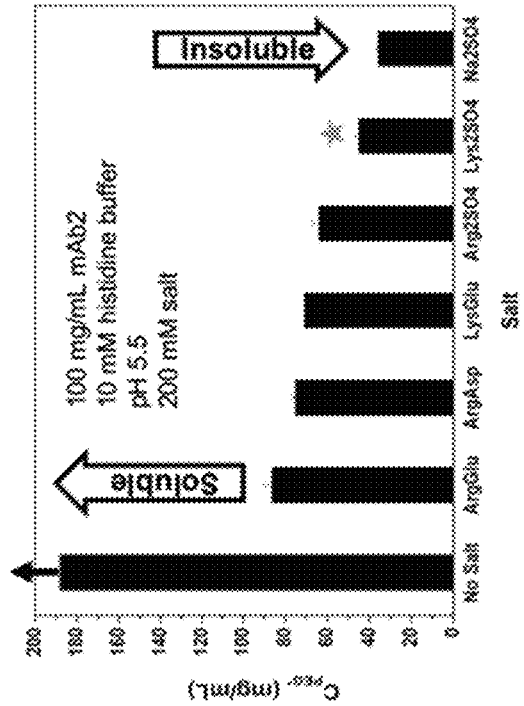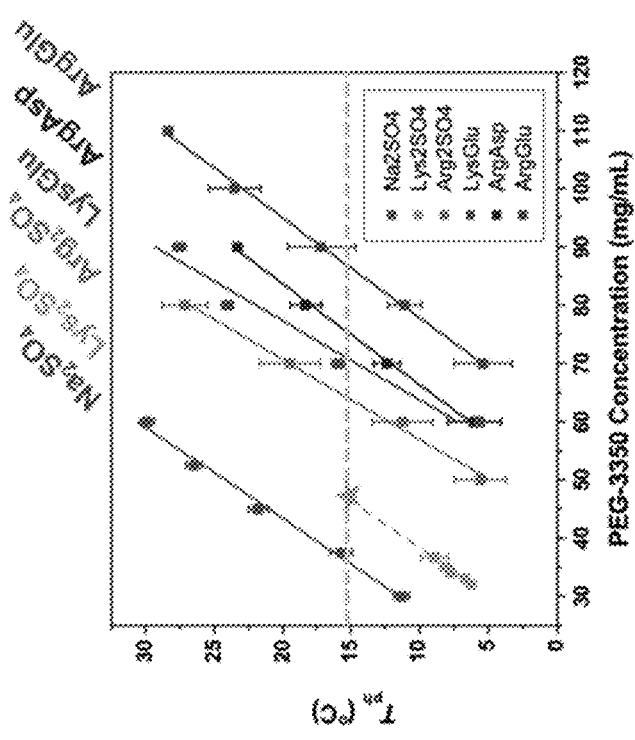
FIG. 43

METHODS FOR DETERMINING THE THERMODYNAMICS AND KINETICS OF COLLOIDAL PHASE SEPARATION ON A TEMPERATURE GRADIENT DEVICE

CROSS-REFERENCE TO RELATED APPLICATIONS

This application is a continuation-in-part of International Patent Application No. PCT/US19/66673, filed Dec. 17, 2019, which is entitled to priority under 35 U.S.C. § 119(e) to U.S. Provisional Patent Application No. 62/780,145, filed Dec. 14, 2018, the contents of which are each incorporated by reference herein in their entirety.

BACKGROUND OF THE INVENTION

Therapeutic monoclonal antibodies (mAbs) are often formulated in aqueous solutions at high concentrations, e.g., above 100 mg/mL, for small-volume subcutaneous injections. Concentrated protein solutions, however, are susceptible to colloidal instability, which includes crystallization, aggregation, and liquid-liquid phase separation (LLPS), all driven by attractive protein-protein interactions (Asherie N. Methods. 2004 Nov. 1; 34(3):266-72; Wang Y et al. Proceedings of the National Academy of Sciences. 2012 Aug. 14; 109(33):13359-61; Ahamed T et al. Biophysical journal. 2007 Jul. 15; 93(2):610-9; Trilisky E et al. Biotechnology progress. 2011 Jul. 1; 27(4):1054-67; Mason B D et al., Journal of pharmaceutical sciences. 2011 Nov. 1; 100(11): 4587-96; Dumetz A C et al. Biophysical journal. 2008 Jan. 15; 94(2):570-83; Lewus R A et al. Biotechnology progress. 2011 Jan. 1; 27(1):280-9). Preventing these events from occurring at high concentrations is a critical challenge for improving the stability of liquid mAb formulations. The situation is particularly complex as temperature, pH, salts, surfactants, and crowders can each have a profound influence on mAb solution behavior (Mason B D et al., Journal of pharmaceutical sciences. 2011 Nov. 1; 100(11):4587-96; Latypov R F et al. Journal of Biological Chemistry. 2012 Jan. 6; 287(2):1381-96; Budyak I L et al. Journal of pharmaceutical sciences. 2015 Apr. 1; 104(4):1543-7; Zhang L et al. Molecular pharmaceutics. 2012 Aug. 14; 9(9):2582-90; Mason B D et al. Biophysical journal. 2010 Dec. 1; 99(11): 3792-800). As such, understanding the mechanisms involved in protein condensation requires a detailed characterization of both the kinetics and thermodynamics of mAb phase behavior under a variety of solution conditions.

LLPS occurs below the phase separation temperature, $T_{ph}$, and leads to an opaque suspension of protein-rich droplets. In the final stage of LLPS, the droplets macroscopically partition into an aqueous two-phase system (ATPS) consisting of protein-rich and protein-poor phases. The thermodynamics of LLPS provides a valuable tool for investigating protein-protein interactions (Petsev D N et al. The Journal of Physical Chemistry B. 2003 Apr. 24; 107 (16):3921-6). Some proteins, however, undergo LLPS well below the freezing point of water (Wang Y et al. Molecular pharmaceutics. 2014 Apr. 15; 11(5):1391-402; Annunziata O et al. Proceedings of the National Academy of Sciences. 2003 Feb. 4; 100(3):970-4; Annunziata O et al. Biochemistry. 2005 Feb. 1; 44(4):1316-28; Wang Y et al. The Journal of Physical Chemistry B. 2007 Feb. 8; 111(5):1222-30). This experimental limitation can be circumvented by elevating $T_{ph}$ with nonionic crowding agents, like polyethylene glycol (PEG) (Wang Y et al. Molecular pharmaceutics. 2014 Apr. 15; 11(5):1391-402; Annunziata O et al. Proceedings of the National Academy of Sciences. 2003 Feb. 4; 100(3):970-4; Annunziata O et al. Biochemistry. 2005 Feb. 1; 44(4):1316-28; Wang Y et al. The Journal of Physical Chemistry B. 2007 Feb. 8; 111(5):1222-30; Annunziata O et al. Proceedings of the National Academy of Sciences. 2002 Oct. 29; 99(22): 14165-70; Wang Y et al. The Journal of chemical physics. 2013 Sep. 28; 139(12):09B604_1). High molecular weight PEG is typically believed to be excluded from the protein surface at low concentrations and therefore induces attraction by depleted volume effects (Wang Y et al. Molecular pharmaceutics. 2014 Apr. 15; 11(5):1391-402; Annunziata O et al. Proceedings of the National Academy of Sciences. 2002 Oct. 29; 99(22):14165-70; Wang Y et al. The Journal of chemical physics. 2013 Sep. 28; 139(12):09B604_1; Asakura S et al. The Journal of Chemical Physics. 1954 July; 22(7):1255-6; Asakura S et al. Journal of polymer science. 1958 December; 33(126):183-92; Bhat R et al. Protein Science. 1992 September; 1(9):1133-43; Arakawa T et al. Biochemistry. 1985 Nov. 1; 24(24):6756-62). The values of $T_{ph}$ have been routinely measured by the onset of turbidity as a solution is cooled (Thomson J A et al. Proceedings of the National Academy of Sciences. 1987 Oct. 1; 84(20): 7079-83; Liu C et al. Proceedings of the National Academy of Sciences. 1996 Jan. 9; 93(1):377-82; Wang Y et al. Proceedings of the National Academy of Sciences. 2011 Oct. 4; 108(40):16606-11). Alternatively, temperature quenching combined with centrifugation has also been employed (Mason B D et al. Biophysical journal. 2010 Dec. 1; 99(11): 3792-800). Unfortunately, such methods are impractical for temperature-dependent kinetic analysis, as they would require a very large number of cooling experiments to study the separation below $T_{ph}$.

Therefore, there is a need in the art for improved methods of characterizing kinetics and thermodynamics of solutions containing macromolecules over a range of concentrations and temperatures. The present invention addresses this need.

SUMMARY OF THE INVENTION

In one aspect, the present invention provides A method of characterizing aqueous two-phase system (ATPS) formation in a macromolecule solution, comprising the steps of: providing a temperature gradient device having a hot surface and a cold surface separated by a gap space; providing a sample holder having a first end, a second end, a length in-between, and at least one sample reservoir positioned within the length of the sample holder, wherein the length spans at least the gap space of the temperature gradient device to touch the hot surface and the cold surface; loading at least one macromolecule solution into the at least one sample reservoir; positioning the sample holder onto the temperature gradient device such that the first end and the second end touch the hot surface and the cold surface simultaneously to establish a temperature gradient across the length of the sample holder; imaging the length of the sample holder spanning the gap space over a time period to capture light scattering intensity as a function of temperature in the sample holder; and calculating a phase separation temperature ($T_{ph}$), a spinodal temperature ($T_{meta}$), and a gelation temperature ($T_g$) of the at least one macromolecule solution in each of the at least one sample reservoir.

In one embodiment, the positioning step establishes a linear temperature gradient across the length of the sample holder. In one embodiment, wherein $T_{ph}$ of the at least one macromolecule solution is calculated at a time point of temperature gradient stabilization at a position along the length of the sample holder wherein an onset of light scattering intensity begins in a sample reservoir containing the at least one macromolecule solution as detected by the imaging step. In one embodiment, wherein the time point of temperature gradient stabilization is about 1 minute after the positioning step.

In one embodiment, wherein $T_{meta}$ of the at least one macromolecule solution is calculated at a time point of phase separation completion below $T_{ph}$ at a position along the length of the sample holder wherein light scattering intensity reaches a minimum intensity in a sample reservoir containing the at least one macromolecule solution as detected by the imaging step. In one embodiment, wherein $T_g$ of the at least one macromolecule solution is calculated at a time point of phase separation completion below $T_{ph}$ at a position along the length of the sample holder wherein an onset of light scattering intensity begins in a sample reservoir containing the at least one macromolecule solution as detected by the imaging step.

In one embodiment, wherein the hot surface has a temperature of between about 300 and 350 K and the cold surface has a temperature of between about 250 and 300 K. In one embodiment, wherein the imaging step is performed using light field microscopy, dark field microscopy, fluorescence microscopy, raman microscopy, polarized light microscopy, phase-contrast microscopy, differential interference contrast microscopy, or multiphoton excitation microscopy. In one embodiment, wherein the sample holder is selected from the group consisting of: cuvettes, capillary tubes, and multi-well plates.

In one embodiment, a colloidal phase diagram is created by calculating the phase separation temperature ($T_{ph}$), the spinodal temperature ($T_{meta}$), and the gelation temperature ($T_g$) of a macromolecule solution over a range of concentrations to generate a bimodal curve, a spinodal curve, and a gelation line, respectively. In one embodiment, the bimodal curve and the spinodal curve meet at a single point corresponding to a critical temperature $T_{crit}$ and critical concentration $C_{crit}$.

In one embodiment, $T_{ph}$ of the at least one macromolecule solution is raised by the addition of a non-ionic crowding agent. In one embodiment, the non-ionic crowding agent is selected from the group consisting of: polyethylene glycol (PEG), Ficoll, and dextran. In one embodiment, $T_{ph}$ of the at least one macromolecule solution is lowered by the addition of a salt.

In one embodiment, ATPS formation kinetics at a low macromolecule concentration can be expressed as a first-order reaction $$N=N_0 \exp(-k_{1st}t)$$

wherein droplet number N decays from an initial number $N_0$ as a function of time t with a first-order rate constant $k_{1st}$.

In one embodiment, ATPS formation kinetics at a high macromolecule concentration can be expressed as a second-order reaction $$\frac{1}{N}-\frac{1}{N_0}=k_{2nd}t$$

wherein droplet number N decays from an initial number $N_0$ as a function of time t with a second-order rate constant $k_{2nd}$.

In one embodiment, ATPS formation can be modeled using a Kohlrausch-Williams-Watts (KWW) function $$I=\exp(-(k_{KWW}t)^{\beta_{KWW}})$$

wherein I is normalized scattering intensity, t is time, $\beta_{KWW}$ is a cooperativity index, and $k_{KWW}$ is an apparent ATPS formation rate constant.

In one embodiment, a maximum rate constant, $k_{max}$, occurs within a region of spinodal temperature $T_{meta}$. In one embodiment, crossover in cooperativity occurs within a region of gelation temperature $T_{gel}$ where $\beta_{KWW}=1$.

In one embodiment, a critical crowder concentration is obtained by adding a concentration of a crowding agent that produces a $T_{ph}$ of between about 0° C. and 30° C. In one embodiment, the critical crowder concentration is obtained by adding a concentration of a crowding agent that produces a $T_{ph}$ of 15° C. In one embodiment, the at least one macromolecule solution has a minimum critical crowder concentration at an isoelectric point (pI). In one embodiment, increasing the critical crowder concentration is configured to predict increased macromolecule stability. In one embodiment, the at least one macromolecule solution comprises one or more excipients selected to maintain or increase the critical crowder concentration.

BRIEF DESCRIPTION OF THE DRAWINGS

The following detailed description of embodiments of the invention will be better understood when read in conjunction with the appended drawings. It should be understood, however, that the invention is not limited to the precise arrangements and instrumentalities of the embodiments shown in the drawings.

FIG. 3A through FIG. 3I depicts dark-field images and schematics of phase separation on the temperature gradient device versus images of temperature quenches performed on macroscopic samples. The dark-field images of the temperature gradient experiments are provided at 5 time points (FIG. 3A through FIG. 3E) during the separation of a solution containing 90 mg/mL mAb and 20 mg/mL PEG-3350. Specifically, shown are (FIG. 3A) an image of a sample exposed to a constant temperature (318 K) versus a linear temperature gradient (278-318 K) at (FIG. 3B) 1 min, (FIG. 3C) 4 min, (FIG. 3D) 7 min, and (FIG. 3E) 60 min after sample introduction. The white circles in the schematics represent protein-rich droplets, which scatter light (FIG. 3B through FIG. 3E). The droplets coalesce to form the clear protein rich phase of an ATPS, as depicted by the large grey droplet (FIG. 3D, FIG. 3E). For comparison, images were also recorded of the phase separation process in centrifuge tubes upon temperature quenches at (Quench 1) 293 K and (Quench 2) 277 K, which reside in the spinodal and gel regions, respectively. Provided also are (FIG. 3F) an image recorded at 318 K, prior to the temperature quench, versus images captured at (FIG. 3G) 1 min, (FIG. 3H) 15 min, (FIG. 3I) 60 min after the temperature quench.

FIG. 4A through FIG. 4C depict line scans of scattering intensity as a function of temperature at 3 time points of phase separation for the 90 mg/mL mAb and 20 mg/mL PEG-3350 solution. The line scans were obtained from the dark field images shown in FIG. 3A through FIG. 3I. The line scans are given for (FIG. 4A) t=1 min, (FIG. 4B) t=7 min, and (FIG. 4C) t=60 min. The solid lines are provided as visual aids for the transition temperature determinations of $T_{ph}$, $T_{meta}$, and $T_{gel}$.

FIG. 6A through FIG. 6D depict 3-dimensional plots of light scattering intensity as a function of both temperature and time for (FIG. 6A) 90 mg/mL, (FIG. 6B) 60 mg/mL, (FIG. 6C) 40 mg/mL, and (FIG. 6D) 20 mg/mL mAb, all containing 20 mg/mL PEG3350. The plots are shown at a temporal resolution of 15 seconds for (FIG. 6A) and 5 seconds for (FIG. 6B through FIG. 6D).

(FIG. 7A) The line scans of a 10 mg/mL PNIPAM sample containing 0.8 M NaCl over time along a linear temperature gradient (278-318 K). The apparent LCST values determined from (FIG. 7A) are plotted in (FIG. 7B) (increasing data points) along with a direct measurement of the temperature by a thermocouple (decreasing data points) as a function of time. The shift of the LCST with time is illustrated schematically in (FIG. 7C). Pictures are provided to demonstrate the thermocouple measurement technique (FIG. 7D). (FIG. 7E through FIG. 7G) The sequential processing of raw data is shown for an isotherm at 293.3 K of a 90 mg/mL mAb and 20 mg/mL PEG-3350 solution. The light scattering intensity is plotted as a function of time in (FIG. 7E). Note in FIG. 7E, the vertical line denotes the time required to reach a steady-state temperature gradient. After discarding the first minute of raw data, the intensity was plotted as a function of shifted time in (FIG. 7F). The normalized data are provided in (FIG. 7G).

(FIG. 8A) 299.7-298.8 K, (FIG. 8B) 298.7-297.1 K, (FIG. 8C) 297.0-295.4 K, (FIG. 8D) 295.2-293.7 K, (FIG. 8E) 293.5-292.3 K, and (FIG. 8F) 292.2-290.1 K. The 60 mg/mL data are displayed in 4 plots with decreasing temperature: (FIG. 8G) 296.8-295.8 K, (FIG. 8H) 295.7-294.0 K, (FIG. 8I) 293.8-292.2 K, and (FIG. 8J) 292.0-288.7 K. The 40 mg/mL data are displayed in 2 plots with decreasing temperature: (FIG. 8K) 294.0-292.1 K and (FIG. 8L) 292.0-289.4 K.

(FIG. 9C) An Arrhenius plot of ln(k) versus 1000/T and (FIG. 9D) a VFT plot of ln(τ) vs. T were prepared from the KWW parameters. The data points in (FIG. 9A through FIG. 9D) are colored according to the mAb concentration of either 40 mg/mL (blue), 60 mg/mL (green), or 90 mg/mL (red). The solid lines in (FIG. 9D) represent fits to the VFT model.

(FIG. 11A) Binodal curve of the colloidal phase diagram. The initial protein concentration, $C_o$, and equilibrium concentration of the protein-poor phase, $C_{poor}$, used to calculate supersaturation at a final temperature, $T_{final}$, are illustrated by the dashed vertical lines. (FIG. 11B) The rate constant of ATPS formation versus the supersaturation for the 90 mg/mL mAb sample. The data in (FIG. 11B) represent the metastable (increasing points), spinodal (peak points), and gel (decreasing points) regions, respectively.

FIG. 12 lists the fitted parameters of the VFT model for various mAb concentrations.

(FIG. 13A) Dark-field images at time points ranging from t=1 to t=60 min during the experiment. The 2, short upward-pointing black arrows at the bottom of the image denote the temperatures at each of these 2 points, respectively, while the downward-pointing arrows denote the positions of the 3 transition temperatures. (FIG. 13B) Schematic diagrams of ATPS formation along the temperature gradient device corresponding to the time points in FIG. 13A. The schematics on the right are drawn from a side-on perspective of the rectangular capillary tube. The droplet cartoons on the far-right side depict more detailed structures corresponding, in descending order, to a protein-rich droplet, 2 coalescing droplets, an equilibrated ATPS, and the gel state, respectively. The protein molecules are depicted as gray spheres in each droplet cartoon. (FIG. 13C) Line scans of scattering intensity versus temperature. The line scans plotted in FIG. 13C correspond to the dashed horizontal lines in the images in FIG. 13A, which are color coded accordingly. The dashed vertical lines denote the 3 phase transition temperatures.

(FIG. 15A) The scattering intensity is plotted as a function of both time and temperature. The data are shown at 15-s time intervals for clarity. (FIG. 15B) Three isothermal decays of the normalized scattering intensity as a function of time from the 3 distinct kinetic regions along the temperature gradient. The open circles are data points and the solid lines are fits to the data using Eq. 10.

(FIG. 16A) The cooperativity exponent, $\beta$, is plotted as a function of temperature. The values of R are colored to indicate the gel region from 290.4 to 292.8 K (blue data points), the spinodal region from 293.0 to 295.8 K (green data points), and the metastable region from 295.9 to 299.9 K (red data points). (FIG. 16B) The natural log of the rate constants, ln(k), are presented in an Arrhenius plot. The ln(k) data points are colored according to the regions defined in FIG. 16A. The 2 solid black lines are linear fits to the data on either side of $T_{meta}$, which were used to determine the apparent activation energies, $E_{A,app}$, for ATPS formation in the metastable and spinodal regions.

(FIG. 19A) ATPS formation begins with droplet growth (Step 1 in A) involving the sequential, reversible association of protein monomers with protein-rich droplets, characterized by the association, $k_1$, and dissociation, $k_{-1}$. The circles represent folded protein monomers, several of which have been colored in black to highlight the growth mechanism. The number of monomers in the droplets, n, are not drawn to scale. The final stage of ATPS formation is the irreversible coalescence of droplets (Step 2 in FIG. 19A), characterized by the coalescence rate constant, $k_2$. (FIG. 19B) The reaction coordinate diagrams for ATPS formation at hot (top curve) and cold (bottom curve) temperatures relate the apparent activation energies measured in FIG. 16B to the 2-step mechanism in FIG. 19A. The activation energies for the elementary steps are not drawn to scale in FIG. 19B.

(FIG. 21A) Temperature ramping process and (FIG. 21B) schematic illustration. (FIG. 21C) Temperature jump experiments to study the kinetics of phase separation. (FIG. 21D) Schematic illustration of the temperature jump experiment.

(FIG. 22A) Light scattering from a cuvette. (FIG. 22B) Dark field microscopy of a temperature gradient sample.

FIG. 23A and FIG. 23B depict schematic illustrations of measuring the phase separation temperature. (FIG. 23A) Classical measurements, where the transmitted intensity is measured as a function of temperature. These experiments are performed by cooling a sample then reheating it. The average of the mid points of $T_{cloud}$ and $T_{clarify}$ is used as measure of $T_{ph}$. (FIG. 23B) Schematic illustration of a line scan from a temperature gradient. The value of $T_{ph}$ is determined from the onset of light scattering intensity relative to the minimum baseline at higher temperatures.

(FIG. 26A) The intensity of light scattering at a 90° angle from a cuvette can be monitored as a function of temperature during a cooling experiment. The inverse of this intensity, $1/I_{90}$, decreases as the sample is cooled. The spinodal temperature, $T_{sp}$, is obtained by extrapolation to the x-intercept, as depicted by the dashed vertical line. (FIG. 26B and FIG. 26C) Kinetic measurements of the spinodal transition. (FIG. 26B) The angle-dependent light scattering intensity contains information about the size of phase separated droplets in the sample. The intensity data are plotted as a function of q ($q=4\pi n_0 \sin(\theta/2)/\lambda$), where $\theta$ is the angle from the transmitted intensity, as shown in FIG. 22A and FIG. 22B, no is the viscosity of the solvent and $\lambda$ is the wavelength of the incident light. Peaks in the scattering data shift as a function of time due to the growth of droplets. (FIG. 26C) The peak maxima can be related to a characteristic length scale of droplets in the sample, which grows over time. If the sample grows via spinodal decomposition this plot should follow a power law with an exponent of ⅓.

(FIG. 27A) Schematic illustration of a set of images obtained during a temperature gradient experiment. The dark field intensity is tracked at a specific temperature, as illustrated by the dashed vertical line at $T_i$. (FIG. 27B) This intensity decays as a function of time due to the conversion of the droplet suspension into a clear aqueous two-phase system. (FIG.

Figure 27A:
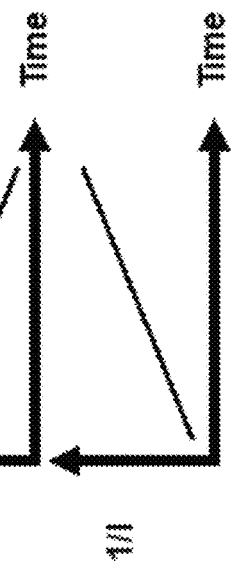
FIG. 27A through FIG. 27E depict temperature gradient methods to determine the spinodal curve.
Figure 27B:
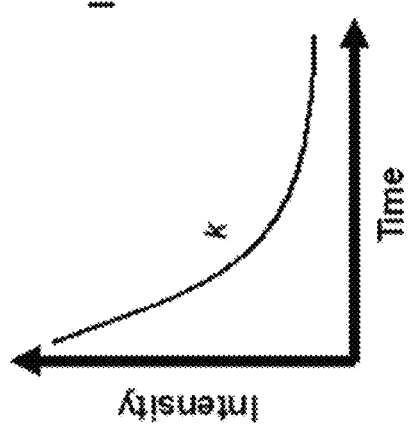
Figure 27C:
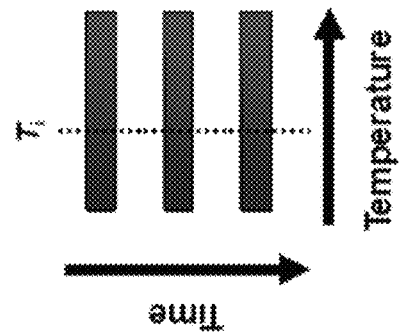
Figure 27D:
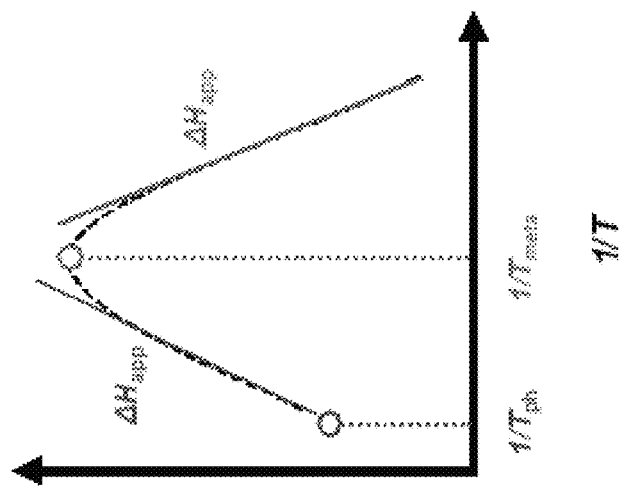
Figure 27E:
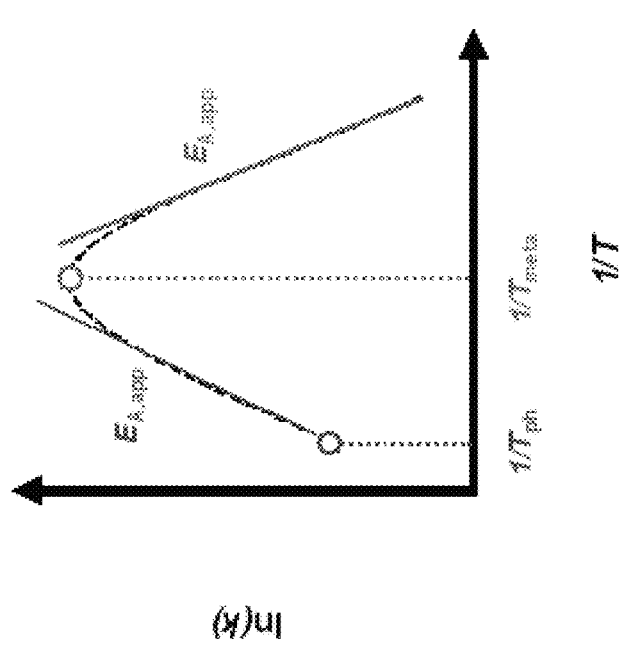

27C) The data can be analyzed to various rate laws to determine the order of the reaction and the rate constant, k. By repeating this process for various positions in (FIG. 27A), the value of k is then extracted from every temperature along the temperature gradient. The temperature-dependent kinetics are then analyzed via (FIG. 27D) Arrhenius or (FIG. 27E) Eyring theories. From the experiments, the data typically display a maximum value at intermediate temperatures. Using this feature, the metastable temperature is defined, $1/T_{meta}$, which serves as a novel metric for the spinodal temperature, $T_{sp}$. The derivative the Arrhenius plot in (FIG. 27D) contains information about the apparent activation energy, $E_{A,app}$ for aqueous two-phase system formation. The derivative of the Eyring plot in (FIG. 27E), on the other hand, can be related to the apparent enthalpy of aqueous two-phase system formation, $\Delta H_{app}$.

Figure 28B:
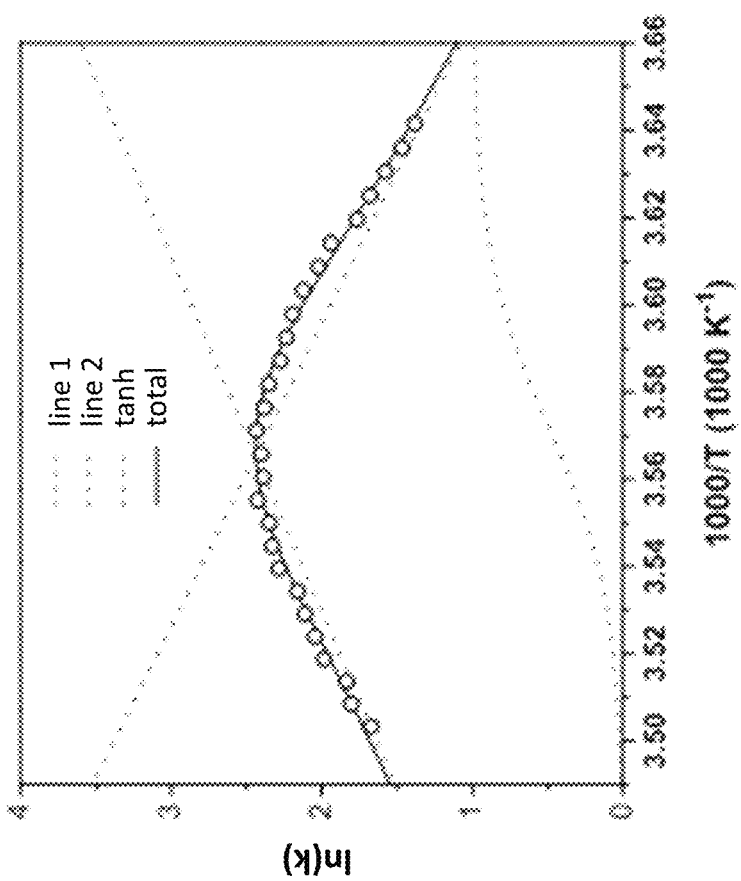
Figure 28A:
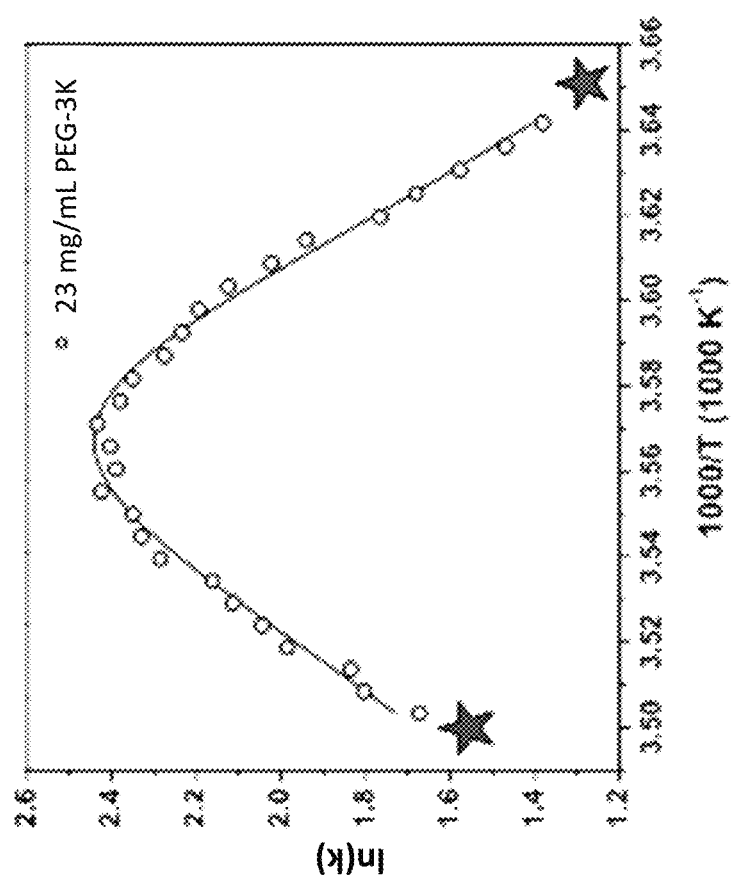
Figures 28C, 28D:
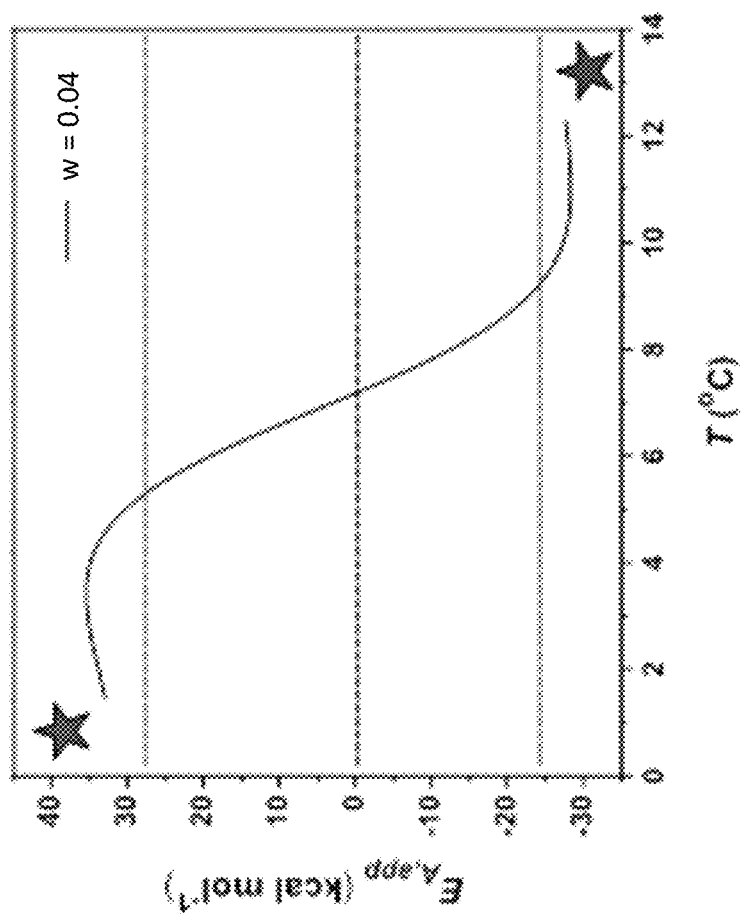
Figure 29A:
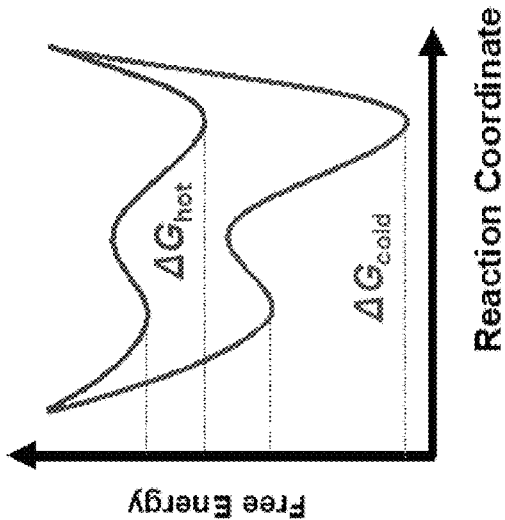
Figure 29B:
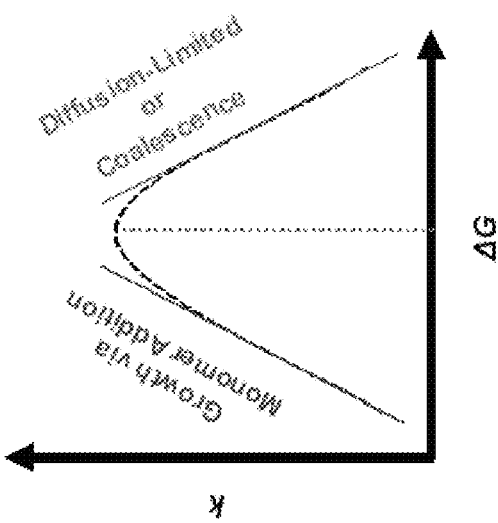
Figure 29C:
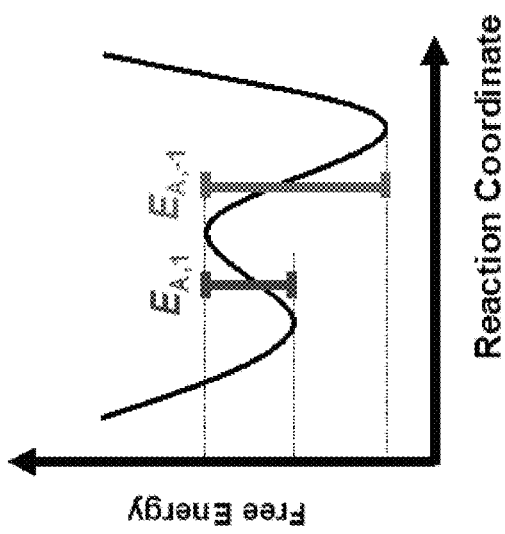
Figure 29D:
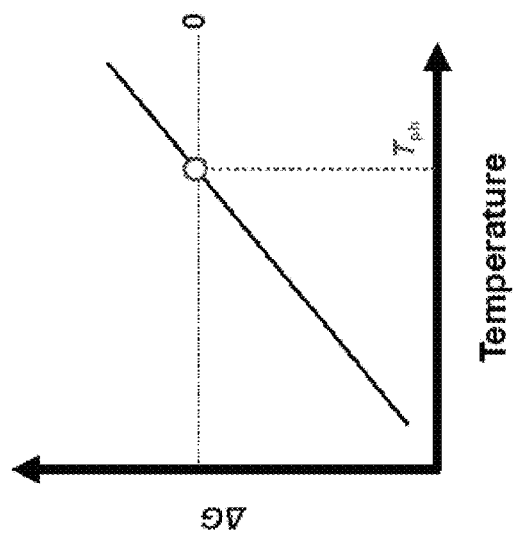

FIG. 28A through FIG. 28D depict methods and analysis to extract the temperature-dependence of the apparent activation energy for aqueous two-phase system formation. (FIG. 28A) Arrhenius plot of 100 mg/mL mAb with 23 mg/mL PEG-3350 at pH 6.4, where the fit to the data is plotted as a solid black curve. The blue and red stars are provided to mark cold and hot temperatures, respectively. The tan h fit comprises three functions. This idea is illustrated schematically in (FIG. 28B), where the individual components have been included with the data from (FIG. 28A). This model assumes that the data follow a linear function at high temperature (dashed red line) and another linear function at colder temperature (dashed blue line). The tan h function exhibits a transition from one function to another at a specific value of 1000/T. This transition is achieved by the dashed black function at the bottom of (FIG. 28B). (FIG. 28C) The derivative of the tan h function fit can be converted to an apparent activation energy as a function of temperature. The exact mathematical functions used for the model are summarized in (FIG. 28D), where y=ln(k) and x=1000/T.

FIG. 29A through FIG. 29D depicts interpretations of the negative value for the apparent activation energy of aqueous two-phase system formation. (FIG. 29A) Reaction coordinate diagram for a reversible, one-step reaction. The apparent activation energy for the forward reaction will be equal to the forward minus the reverse activation energy, which would give rise to a negative number. (FIG. 29B) Alternatively, the shape of the reaction coordinate diagram can vary with temperature. In this case, the free energy of demixing, $\Delta G_{demix}$, becomes more negative with decreasing temperature. This free energy driving force can be approximated by the supersaturation. (FIG. 29C) The value of $\Delta G$ should be zero at $T_{ph}$ and become negative with cooling. (FIG. 29D) The rate constant of aqueous two-phase system formation, k, correlates with $\Delta G$ in the metastable region consistent with the kinetics being dominated by the later stages of growth via monomer addition. At lower temperature, where the value of $\Delta G$ continues to decrease, the kinetics deviate. This deviation may be a signature of spinodal decomposition, which is dominated by the coalescence of droplets or diffusion-limited monomer addition.

Figure 30:
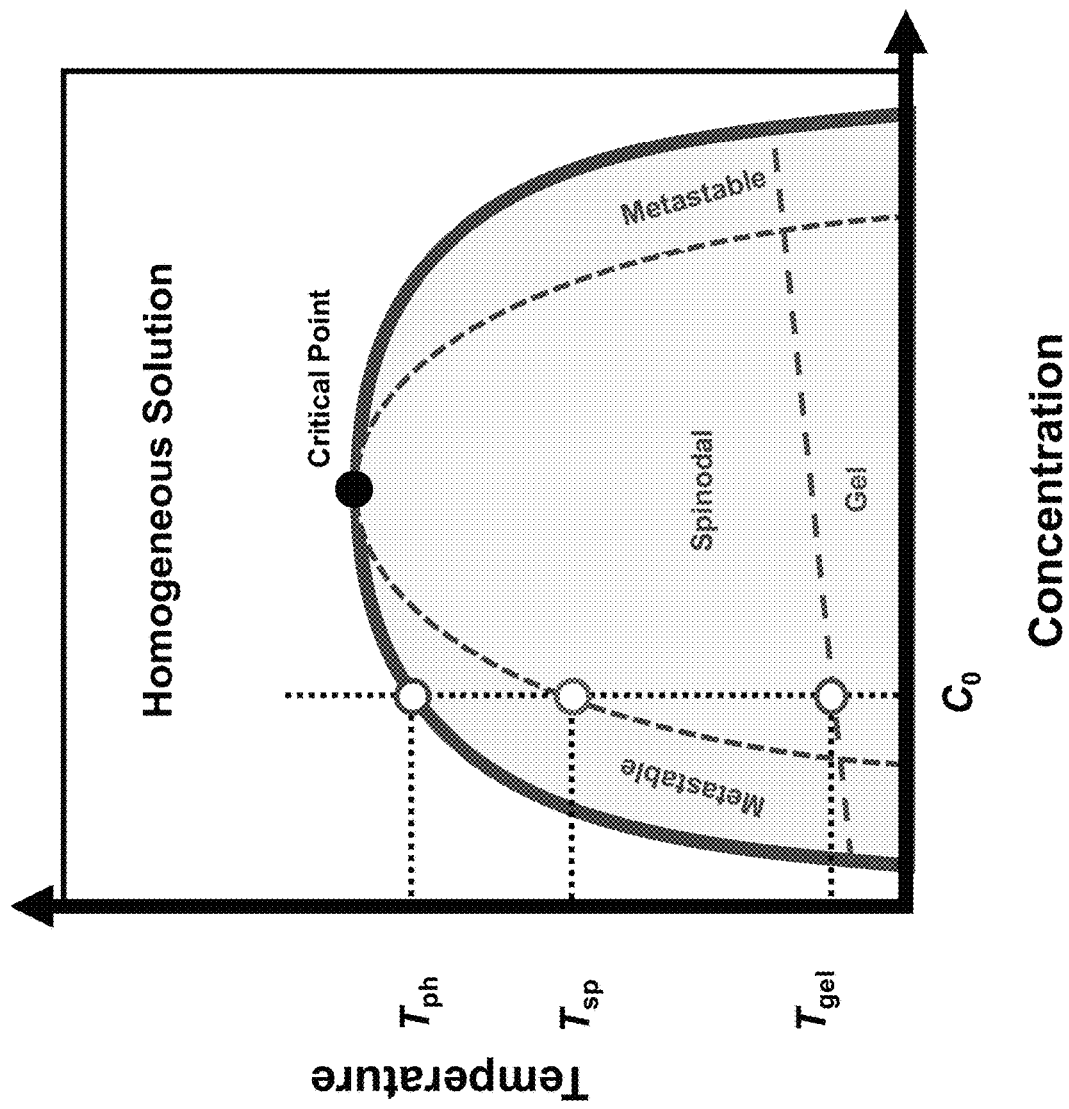

FIG. 30 is a colloidal phase diagram exhibiting the metastable, spinodal, and gel regions. The gel region is a kinetically trapped state that forms at cold temperature below a gelation temperature, $T_{gel}$.

Figure 31A:
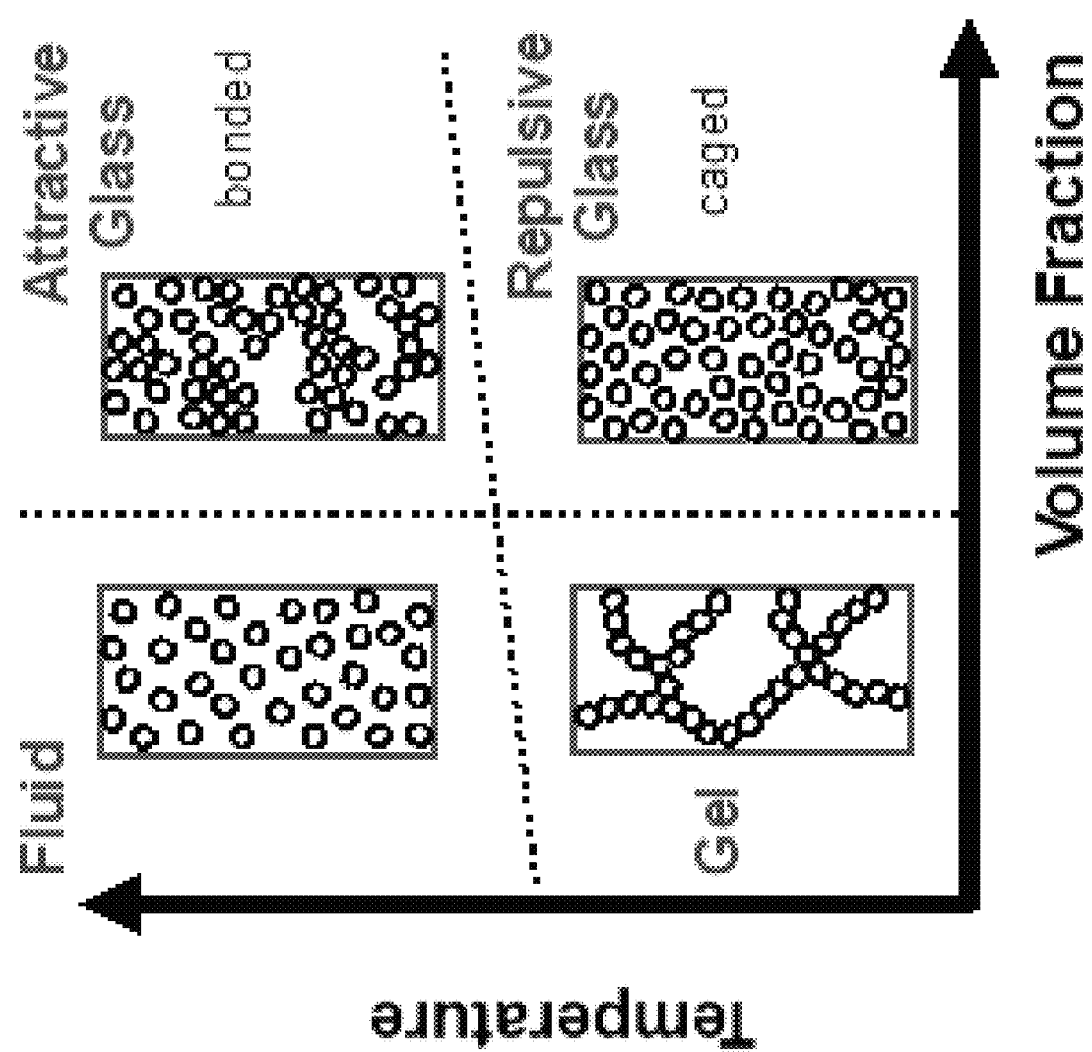
Figure 31B:
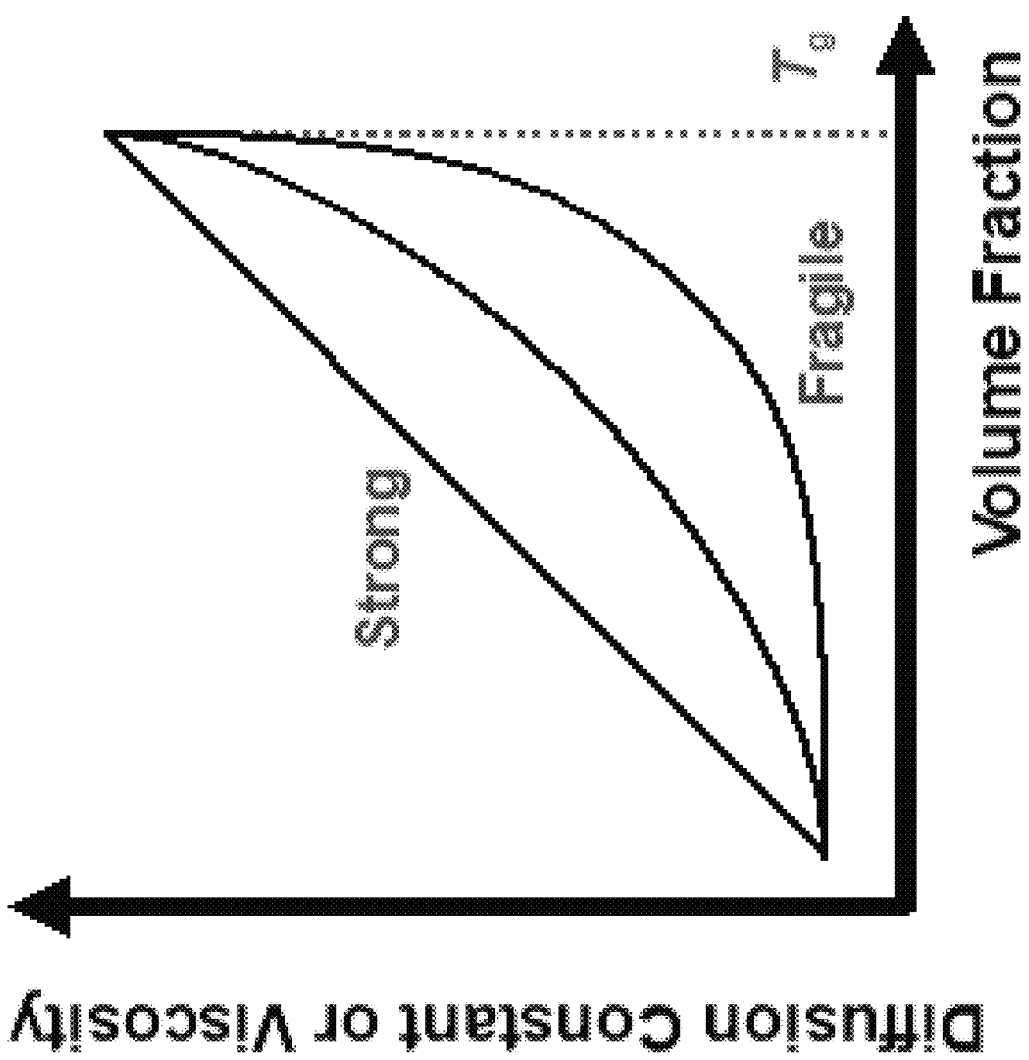

FIG. 31A and FIG. 31B depict classical ideas and characterizations of gels and glass transitions. (FIG. 31A) Accepted phase diagram of gels and glasses. (FIG. 31B) Schematic illustration of measurements of glass transition temperatures, $T_g$. The dynamics, e.g. diffusion constant, or macroscopic rheological properties, e.g. viscosity, increase dramatically as the volume fraction of colloid or protein is increased toward the gel conditions. The abruptness of the transition can be related to the mechanical strength of the arrested state. Glasses and gels with a sharp concentration dependence are fragile, while those that do not depend as strongly are considered strong.

Figure 32A:
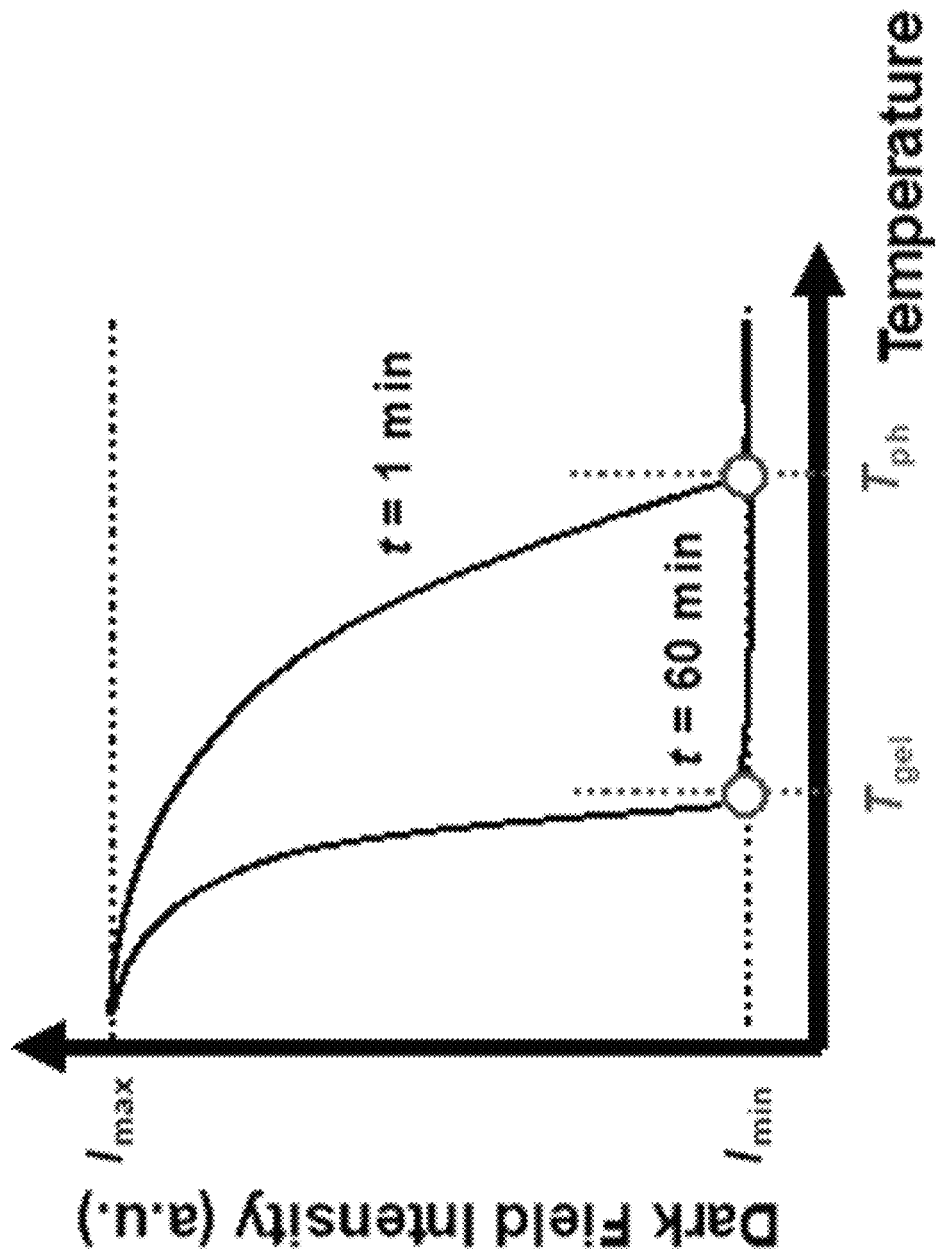
Figure 32C:
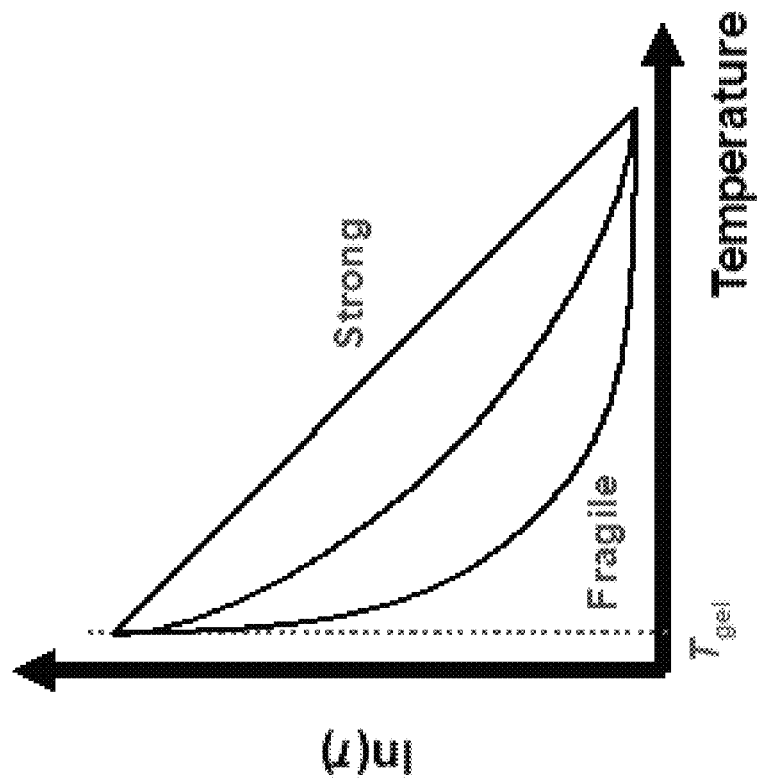
Figure 32B:
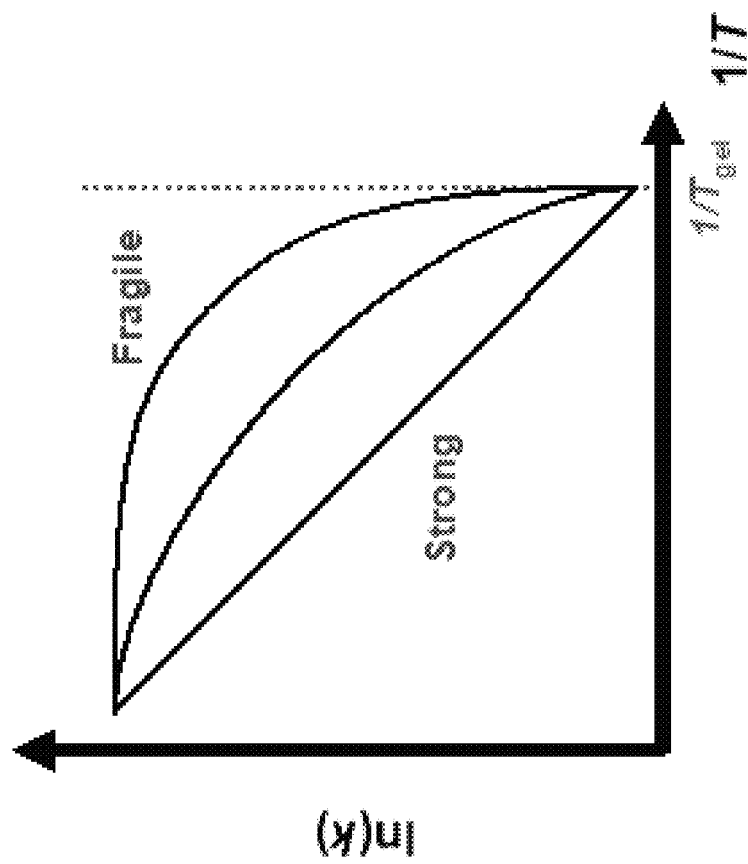
Figure 33C:
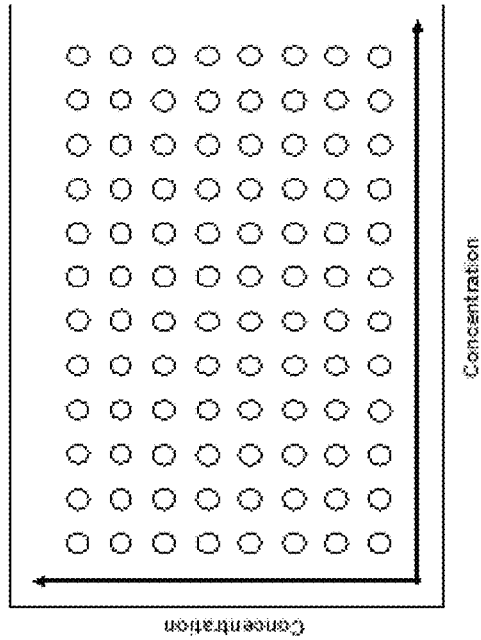
Figure 33D:
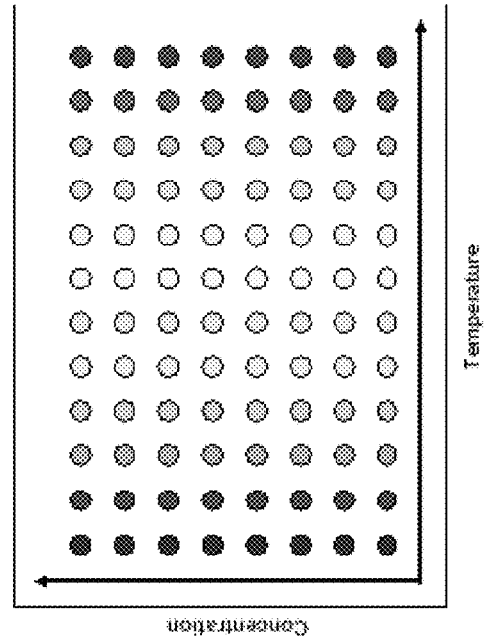
Figure 33A:
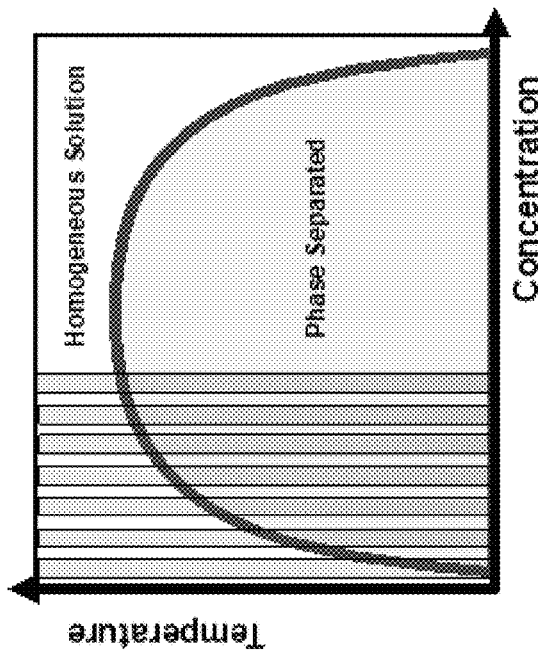
Figure 33B:
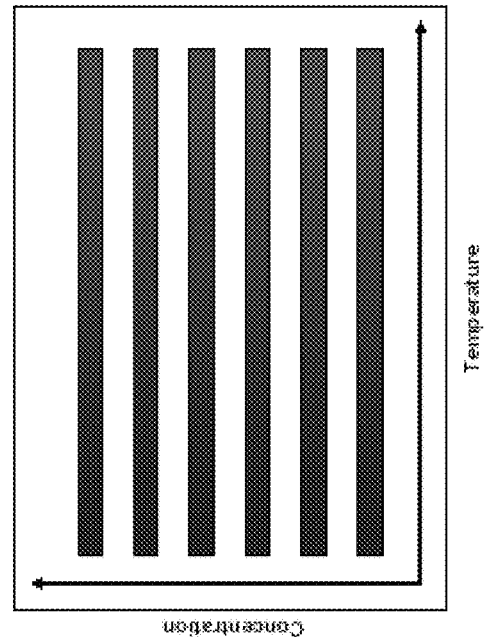

FIG. 32A through FIG. 32C depict temperature gradient approaches to characterizing gels and glasses. (FIG. 32A) Schematic illustrations of the line scans of dark field intensity as a function of time during a temperature gradient experiment. The first profile measured at 1 minute is used to extract the phase separation temperature, $T_{ph}$. At longer times, e.g. 60 minutes, the gelation temperature, $T_{gel}$ as marked by the dashed blue line, can be determined, which delineates conditions that form an aqueous two-phase system formation from those that become kinetically trapped in a gel at lower temperature. Importantly, the mechanical strength of the gel states can be assessed by the change in the kinetics as the temperature approaches the gelation temperature. (FIG. 32B) The Arrhenius plots for gelation exhibit curvature when the gel state is fragile, but linearity when it is strong. (FIG. 32C) The kinetic information in (FIG. 32B) can be replotted as a time constant on the y-axis, τ, and temperature on the x-axis. This representation of the data more closely resembles the changes in viscosity due to glass or gel formation with decreasing temperature. Again, the samples with sharp temperature dependence are characterized as fragile because their arrested structure can be melted with just small changes in temperature.

FIG. 33A through FIG. 33D depict illustrations of the high-throughput nature of temperature gradient microfluidics for characterizing colloidal phase behavior. (FIG. 33A) Colloidal phase diagram with superimposed temperature gradient channels, depicted as vertical bars. (FIG. 33B) The geometry of a channel-based temperature gradient chip facilitates single-experiment characterization of phase diagrams. (FIG. 33C) Classical high-throughput measurements employ 96 well plate style assays that contain different compositions in each well. The entire well can then be cooled or heated to probe the phase diagram. (FIG. 33D) An alternative method using a well-based array and the temperature gradient technology offers a new platform to obtain more parameters of the phase diagram.

Figure 34A:
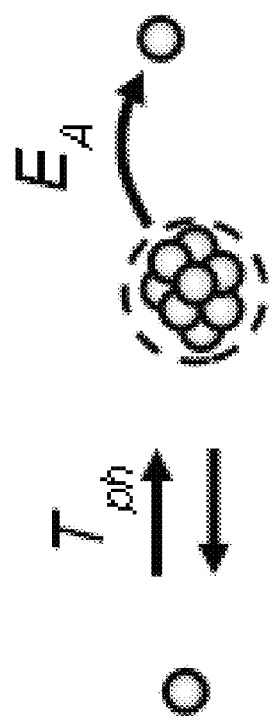
Figure 34B:
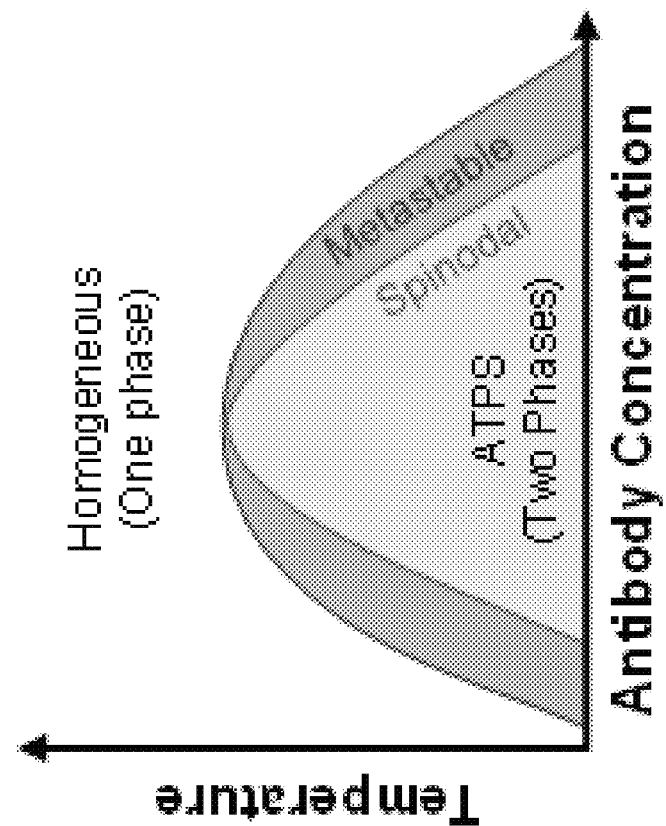

FIG. 34A is a schematic for the reversible association of proteins (gray spheres) as measured by $T_{ph}$ (left) and the reversible association of protein monomers into droplets (right), measured by $E_{A,app}$. FIG. 34B is a model phase diagram for a protein that undergoes LLPS. The red curve denotes the binodal and the green line denotes the spinodal.

Figure 35B:
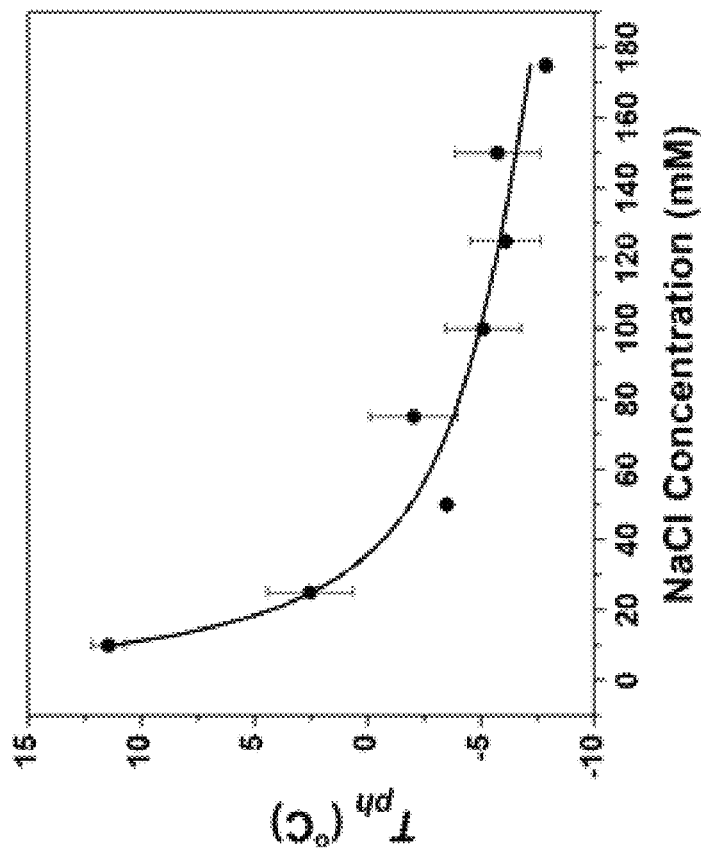
Figure 35A:
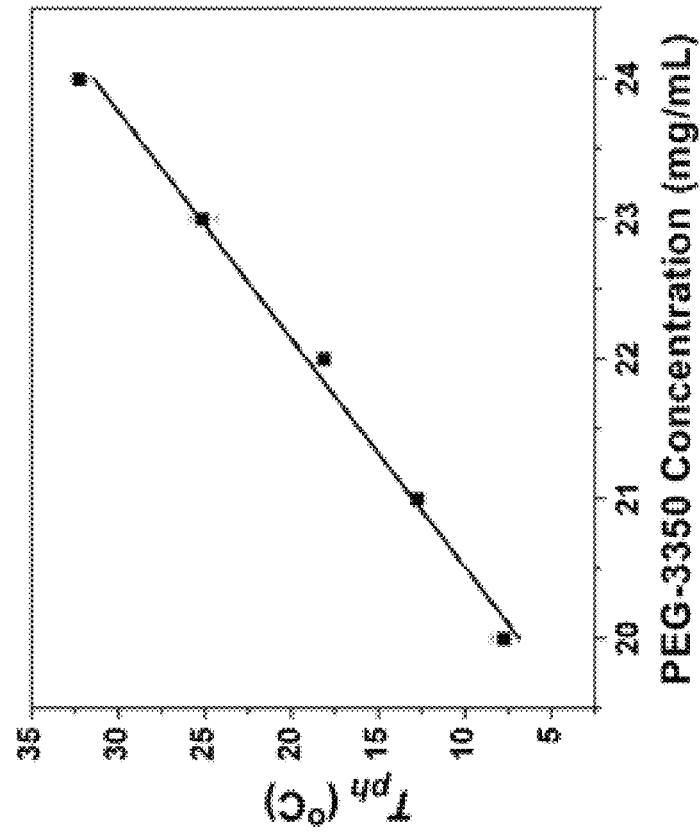

FIG. 35A PEG titration of 100 mg/mL mAb1 at pH=6.4 with 40 mM His buffer. Solid line is a linear fit to the data. FIG. 35B NaCl titration of 100 mg/ml mAb1 at pH=6.4 with 40 mM His buffer and 24 mg/mL PEG-3350. Black curve is a fit to the data using a Langmuir binding isotherm.

Figure 36:
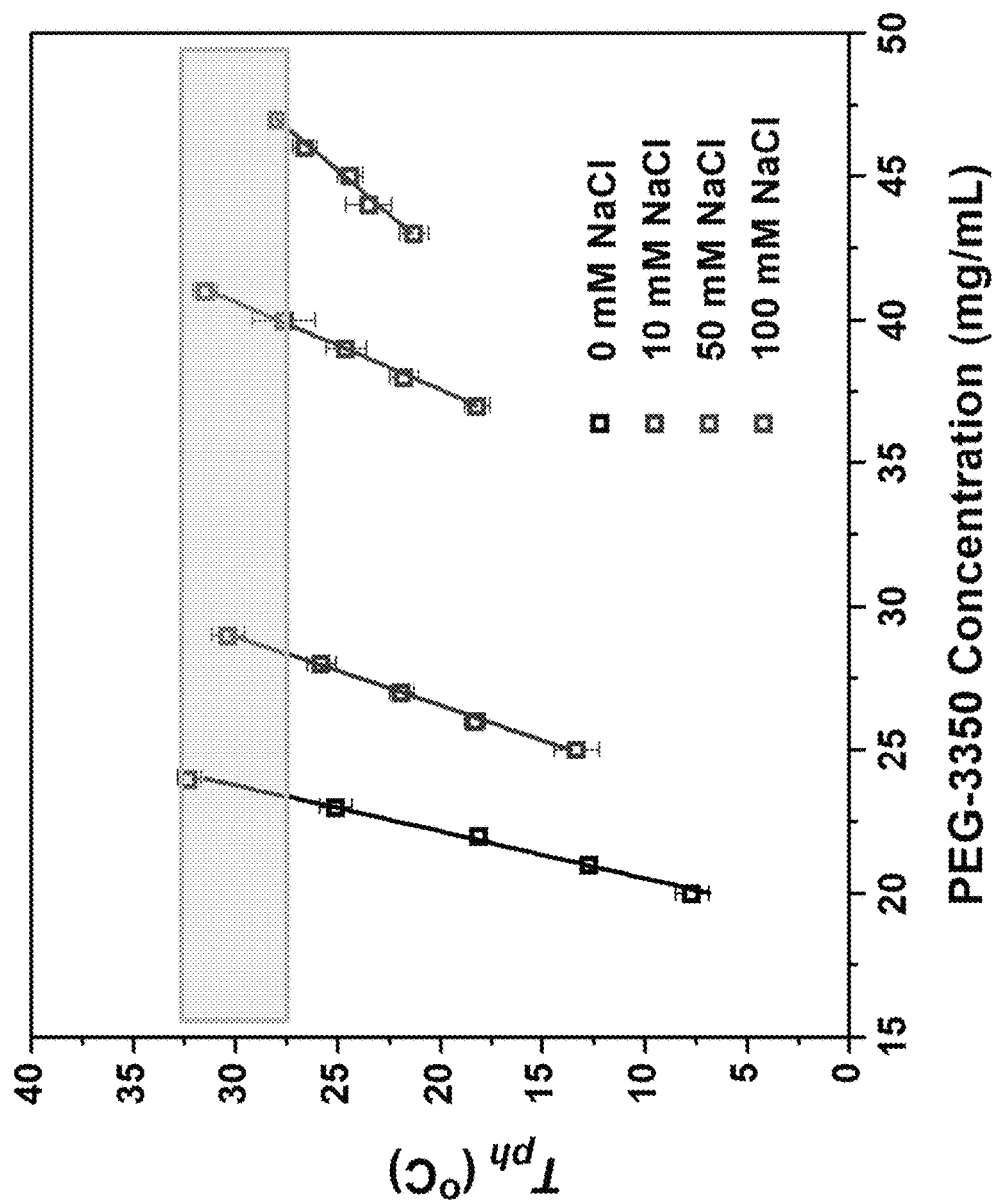

FIG. 36 depicts PEG titrations of 100 mg/mL mAb1 solutions at pH=6.4 with increasing NaCl concentration. Solid lines are linear fits to the data. Grey region indicates conditions which exhibit similar $T_{ph}$.

Figure 37A:
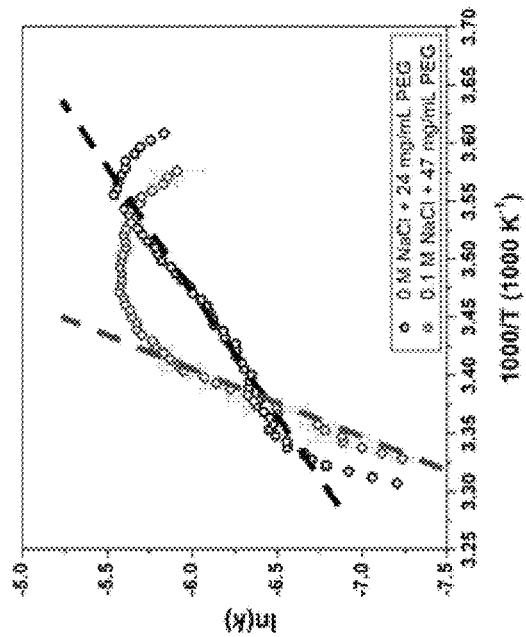
Figure 37B:
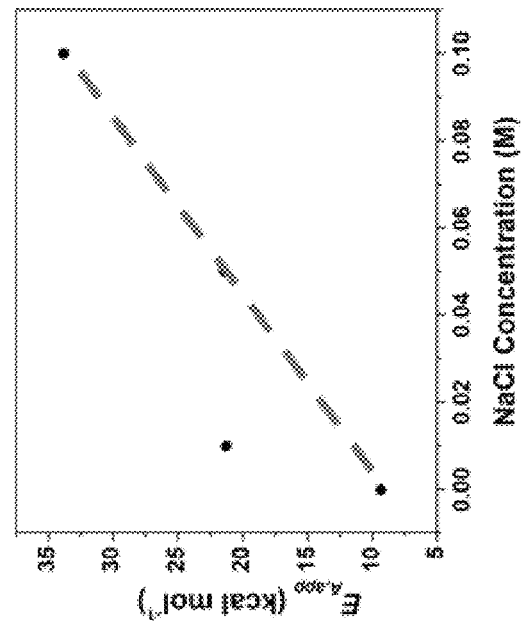
Figure 37C:
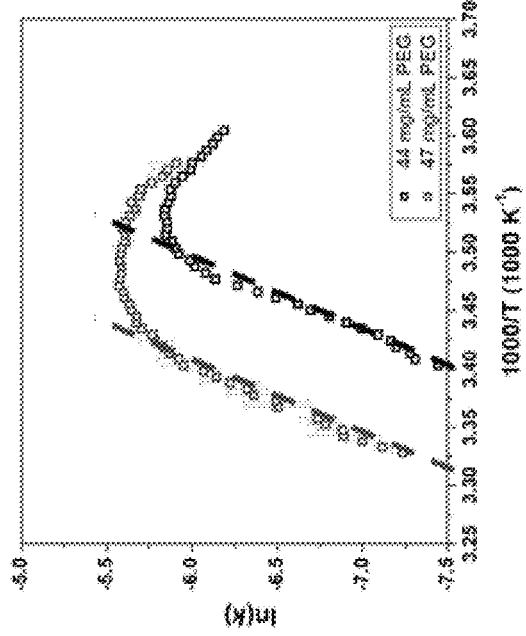
Figure 37D:
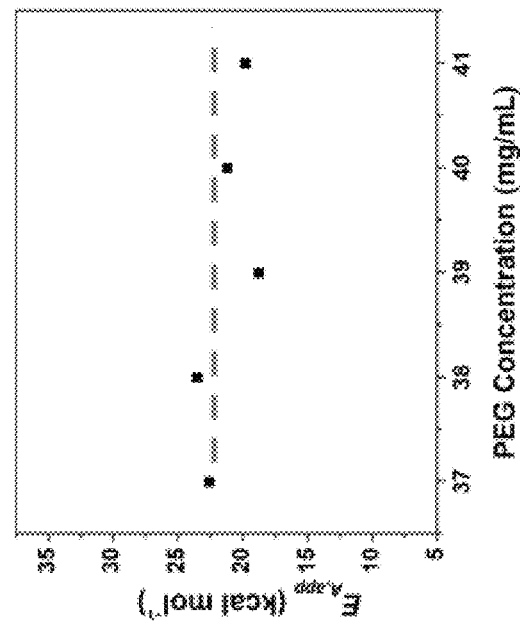

FIG. 37A through FIG. 37D depict kinetic data obtained by TGM experiments with mAb1. (FIG. 37A) & (FIG. 37B): Arrhenius plots of mAb1 solutions phase separating at constant salt and titrating PEG (FIG. 37A) and constant $T_{ph}$ and titrating NaCl and PEG (B). Dashed lines are guides to the eye. Error bars are included in one representative data set for each plot. (FIG. 37C) & (FIG. 37D): Apparent activation energies from varying PEG (FIG. 37C) and varying NaCl (FIG. 37D). (FIG. 37C) 100 mg/mL mAb1 in 40 mM His buffer (pH=6.4) and 50 mM NaCl with variable PEG. Note that $T_{ph}$ increases with added PEG. (FIG. 37D) 100 mg/mL mAb1 in 40 mM His buffer (pH=6.4) with variable NaCl (increasing left to right) and $T_{ph}$~30° C. Note that the PEG concentration also increases with added salt. (FIG. 37C) & (FIG. 37D): Gray dashed lines are guides to the eye.

Figure 38A:
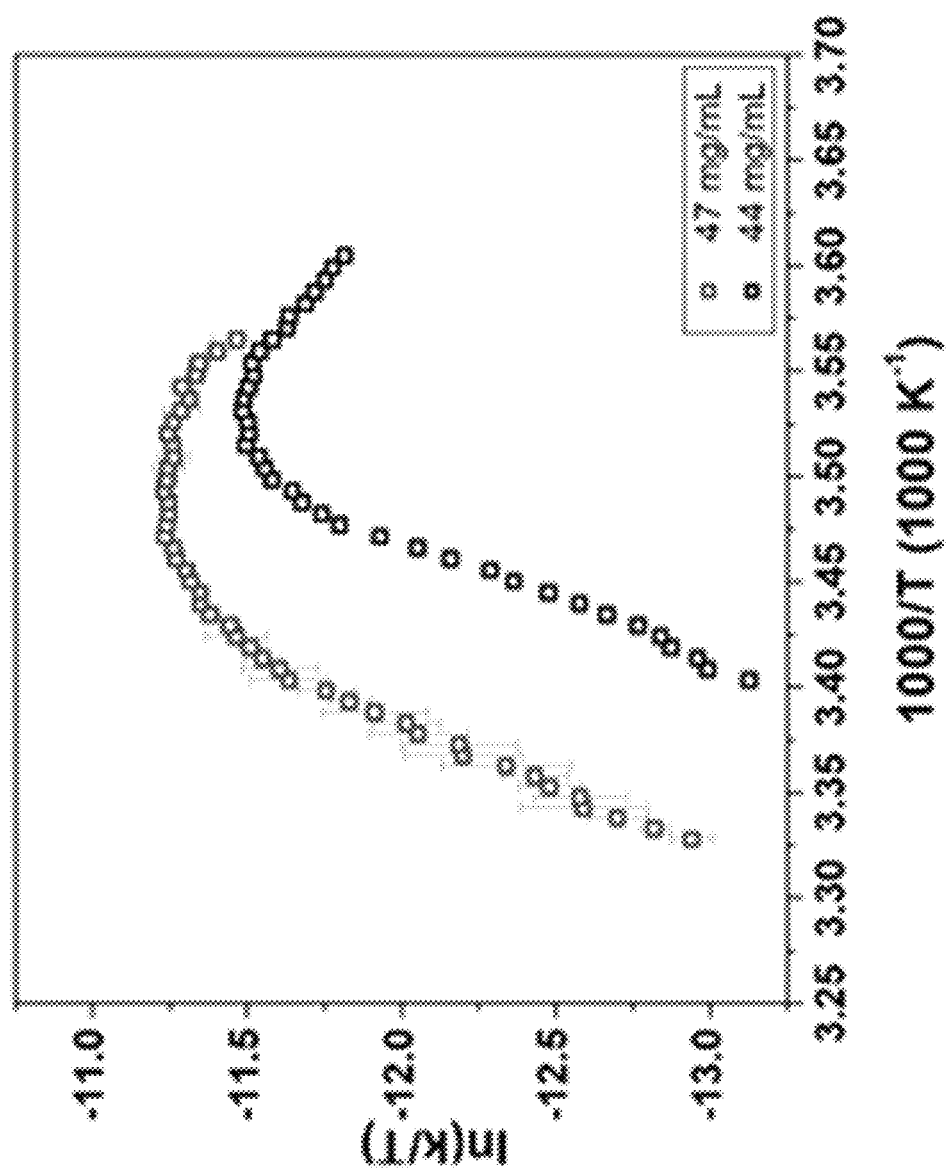
Figure 38B:
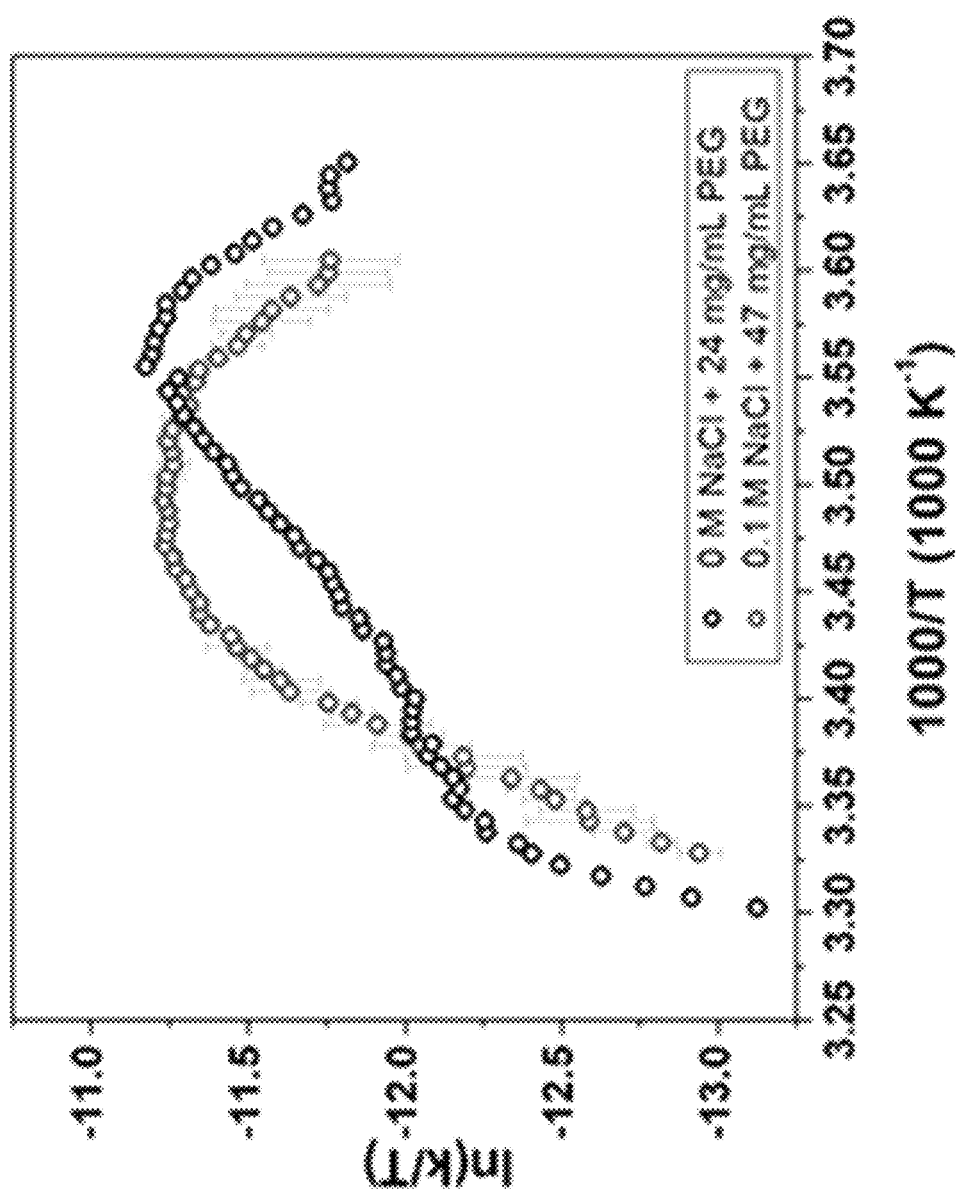
Figure 38C:
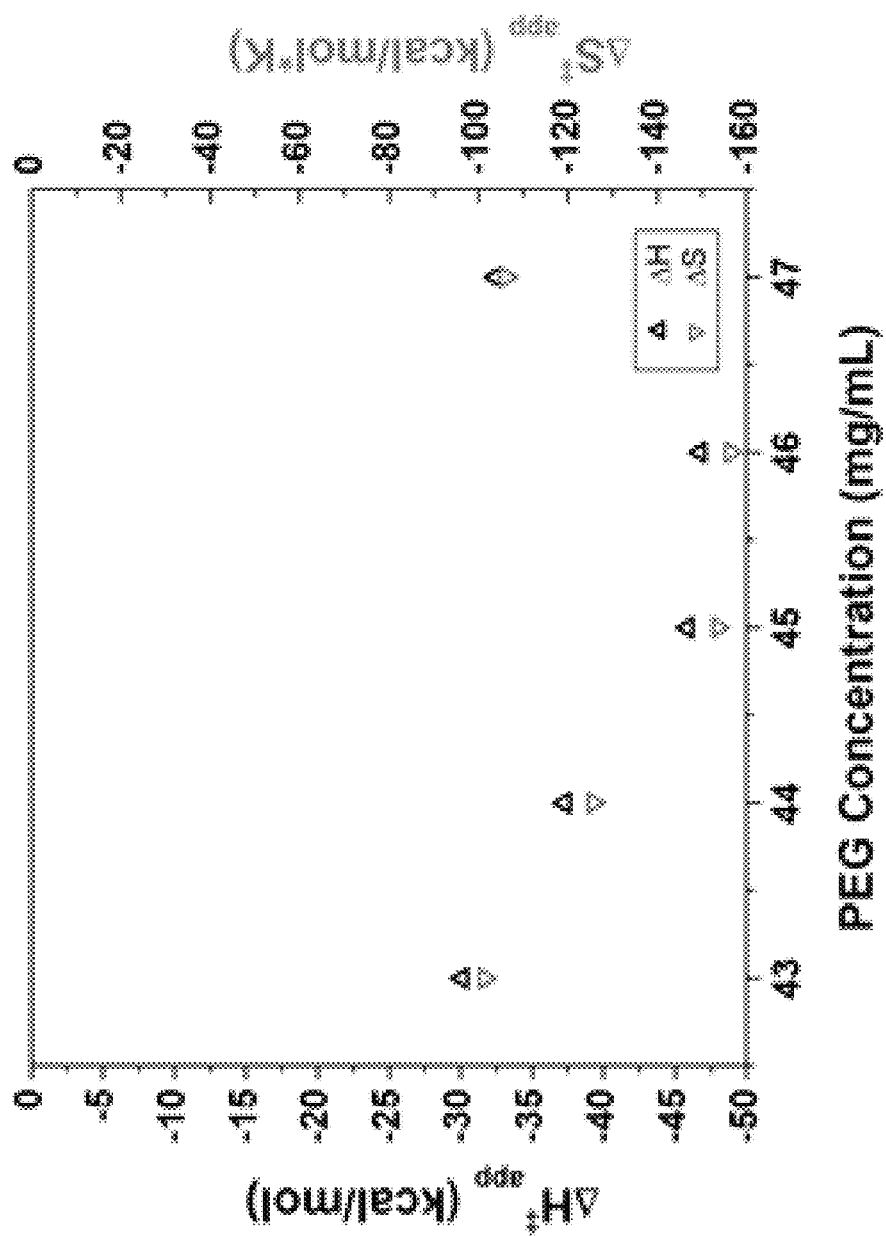
Figure 38D:
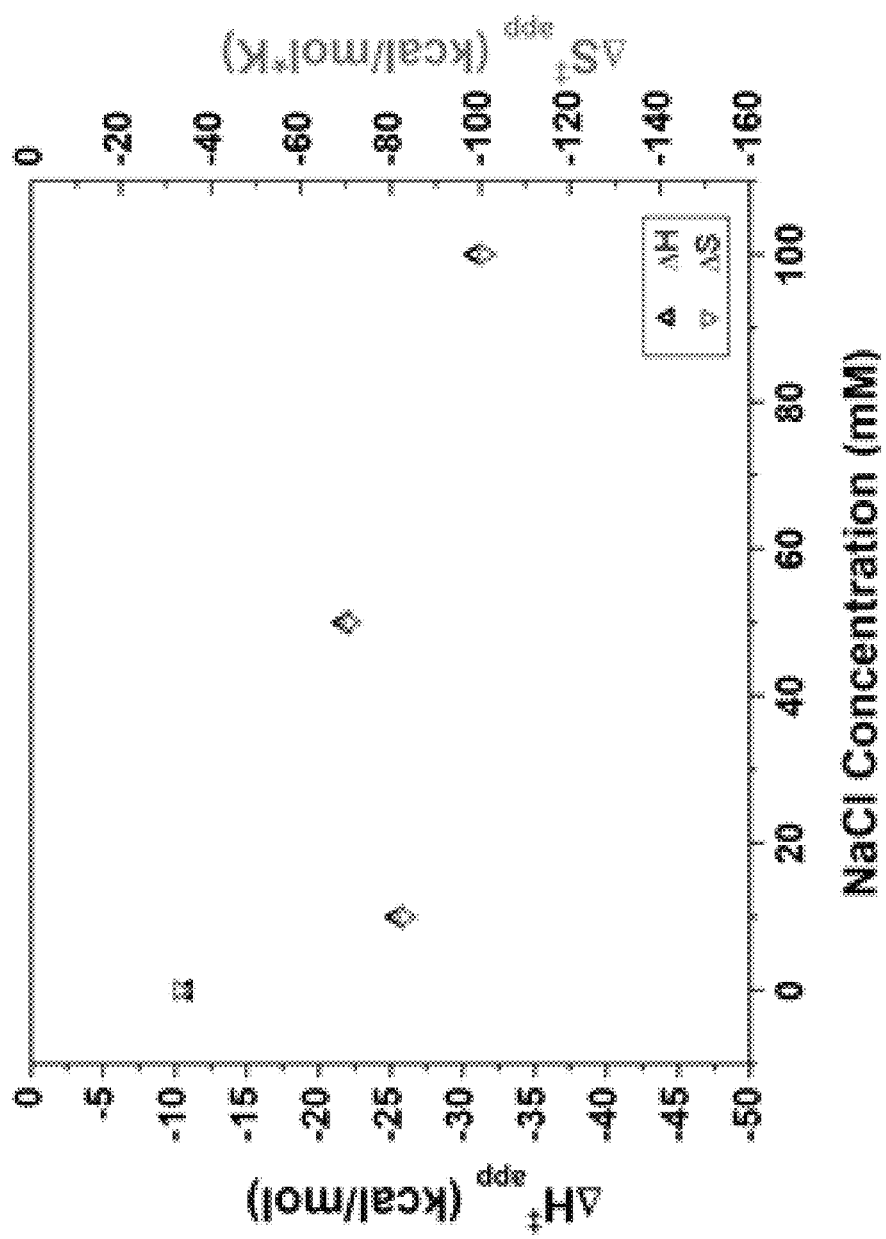

FIG. 38A through FIG. 38D depict kinetic data fit to the Eyring equation. (FIG. 38A) & (FIG. 38B): Eyring plots of mAb1 solutions with constant NaCl and increasing PEG (FIG. 38A) and constant $T_{ph}$ and increasing NaCl and PEG (FIG. 38B). Error bars are included in one representative data set for each plot. (FIG. 38C) & (FIG. 38D): Apparent enthalpies and entropies of activation as a function of PEG concentration (FIG. 38C) and NaCl concentration (FIG. 38D).

Figure 39:
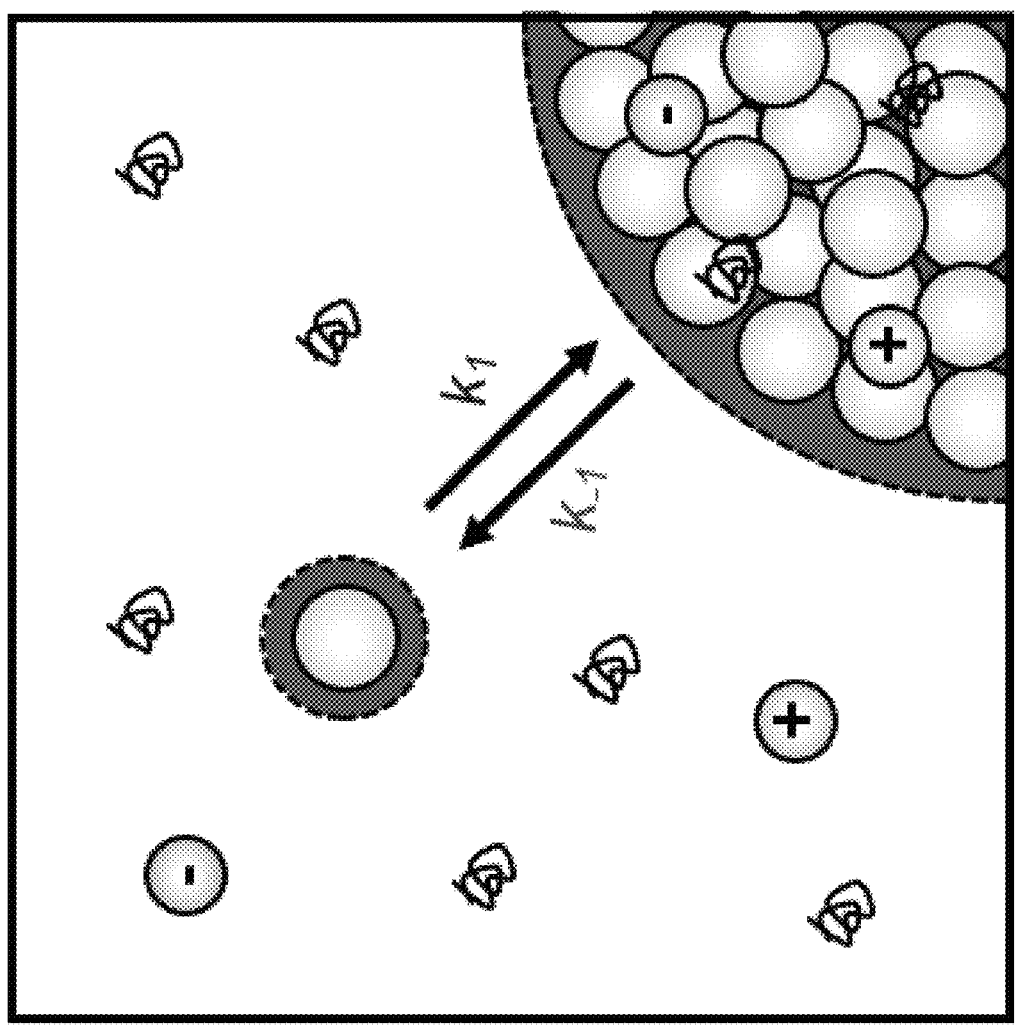

FIG. 39 is a schematic for cosolute partitioning in the protein-poor and protein-rich phases. Gray spheres are protein monomers, green are cations, and red are anions. Black coils are PEG molecules and blue circles are hydration shells.

Figure 40:
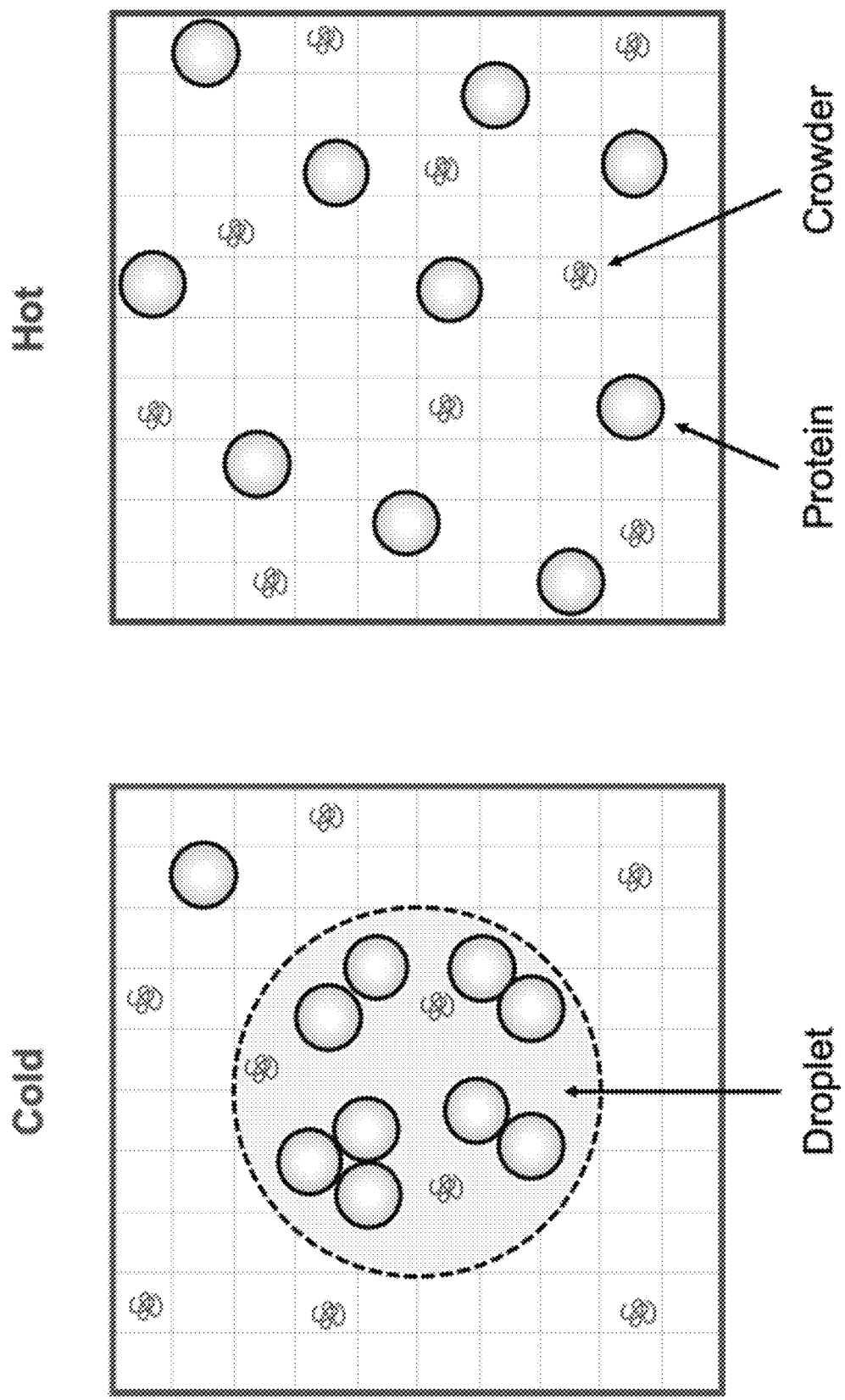

FIG. 40 is a diagram depicting temperature-dependent solubility of a protein in the presence of a polymer crowder. The protein is soluble at higher temperature (right), but phase separates into a protein-rich droplet at lower temperature (left). The lattice model is drawn to quantitatively illustrate the initial concentration of 0.1 volume fraction (~100 mg/mL) and the phase separation into a droplet containing 0.3 volume fraction of protein (~300 mg/mL). The size of the crowder, relative to the protein, is drawn to scale based on their effective radii of hydration PEG-3350 (~2 nm) and a mAb (~6.5 nm).

Figure 41:
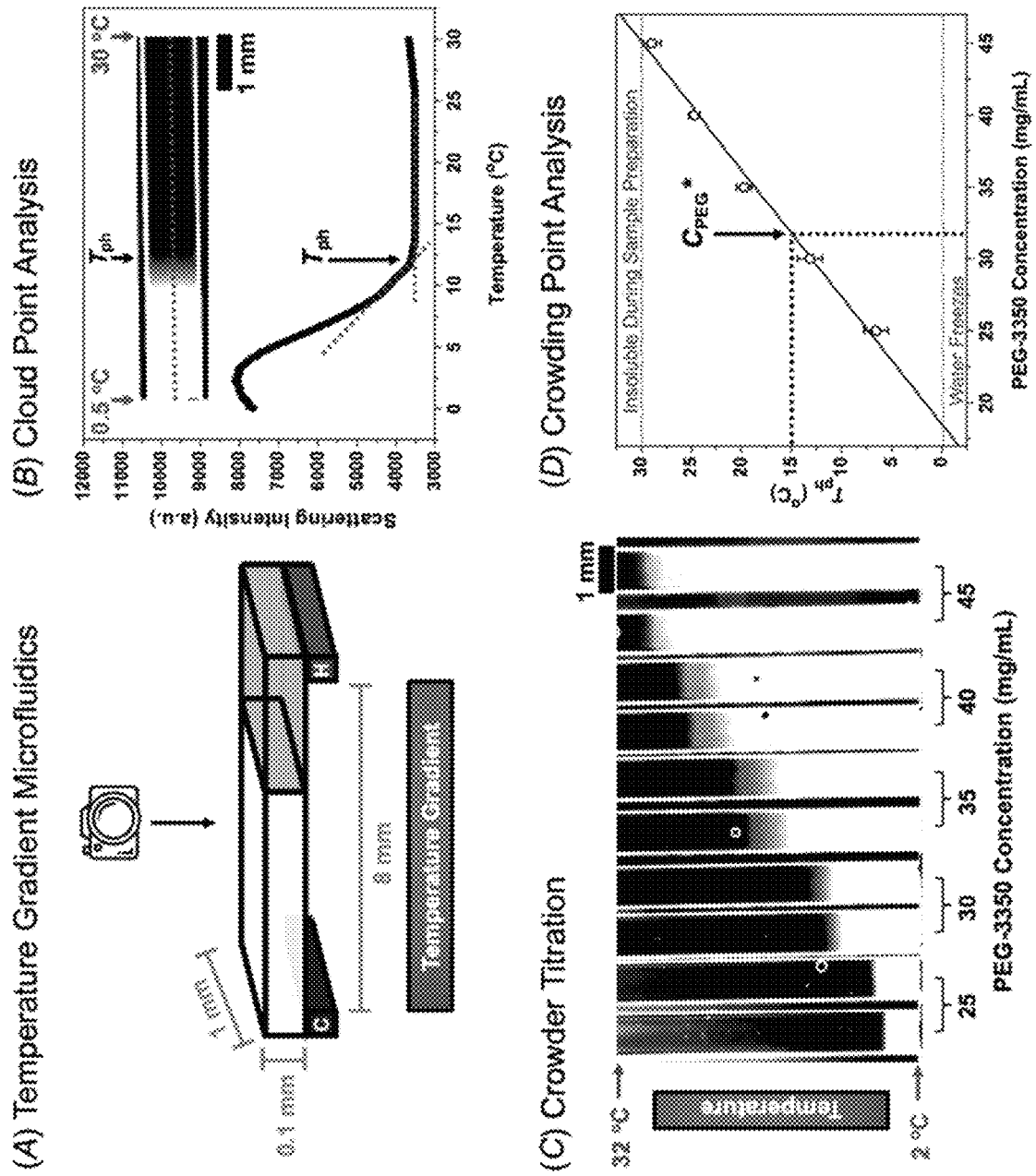

FIG. 41 A through D depict a crowding-induced precipitation assay for solutions containing 80 mg/mL mAb1 at pH 5.6 in 20 mM histidine buffer. (A) Schematic of a rectangular capillary placed on top of a cold sink (left block) and heat source (right block). More light is scattered from the cooler side of the temperature gradient (white region) than the warmer side (grey region). Images are acquired from above. (B) Dark-field image and line scan analysis for measuring the cloud point temperature, $T_{ph}$, (black arrow) of a sample containing 30 mg/mL PEG-3350. (C) Dark-field image of a PEG-3350 titration on the temperature gradient. (D) Analysis of the crowding phase diagram to measure the critical crowder concentration, $C_{PEG}^*$, (black arrow).

FIG. 42 A through C depict the relationship of solution pH and crowding point for mAb1. (A) Schematic illustration of protein charge and protein-protein interactions below and near the pI. (B) Overlay of the crowder titrations at various solution pH values. (C) The crowding point concentration ($C_{PEG}^*$) versus the solution pH value.

FIG. 43 A through C depict apparent solubility of mAb2 under various salt formulations. (A) Schematic for the enhanced colloidal interactions in 200 mM salt. (B) Crowding phase diagrams in the presence of six different salts. (C) Critical crowder concentrations extracted from the phase diagrams in (B).

Figure 44:
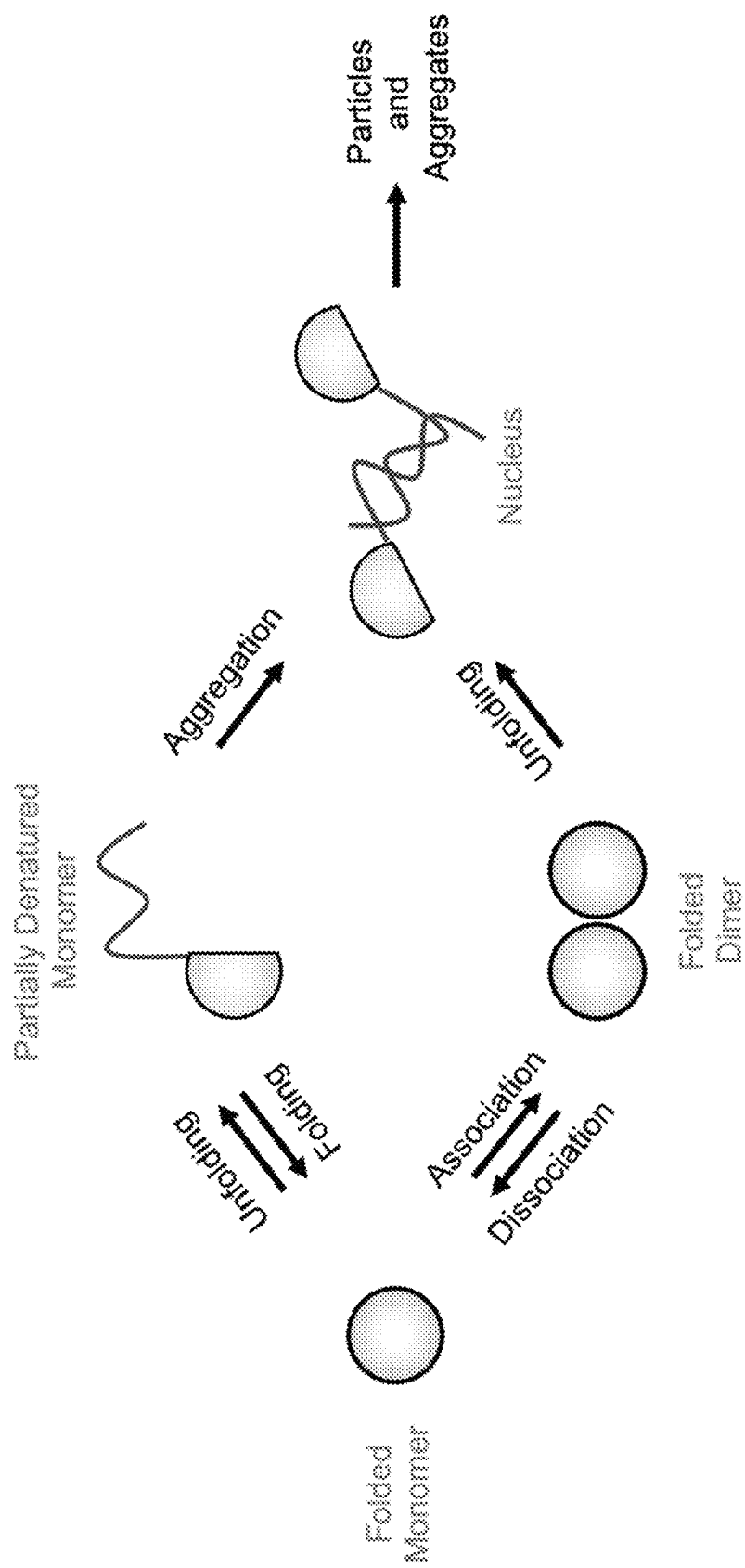

FIG. 44 depicts a schematic for the potential mechanisms of aggregation and particle formation (adapted from Roberts C J et al., Trends Biotechnol 2014, 32 (7), 372-380).

DETAILED DESCRIPTION

It is to be understood that the figures and descriptions of the present invention have been simplified to illustrate elements that are relevant for a clear understanding of the present invention, while eliminating, for the purpose of clarity, many other elements typically found in the art. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined elsewhere, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6, and any whole and partial increments therebetween. This applies regardless of the breadth of the range.

Characterizing Thermodynamic and Kinetic Properties of Solutions

The present invention provides methods for characterizing the thermodynamic and kinetic properties of colloidal phase separation in solutions. The methods are adaptable for high throughput processing of solutions for simultaneous characterization of a plurality of solutions at varying concentrations and temperature ranges.

Figure 1:
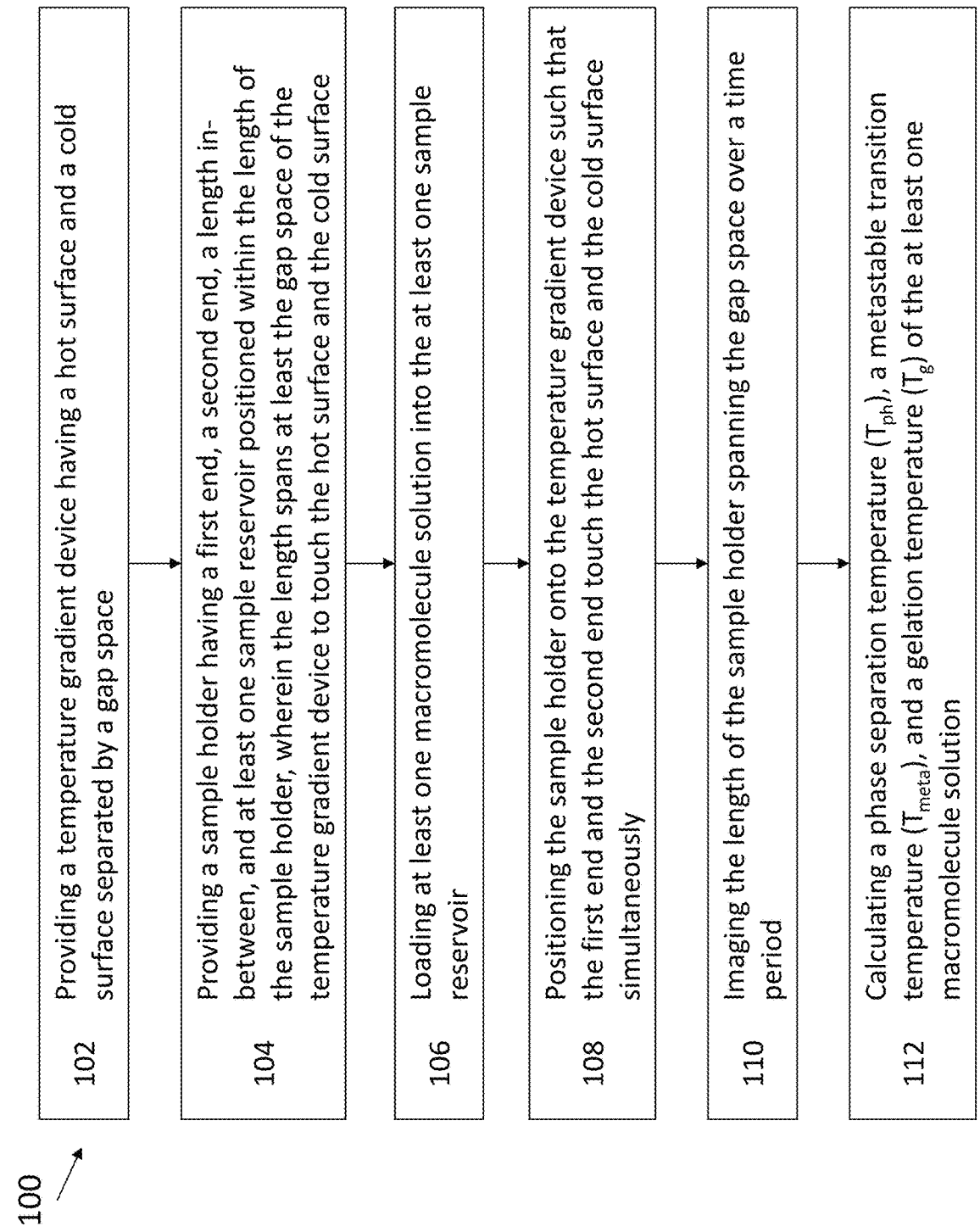
FIG. 1 is a flowchart depicting an exemplary method of characterizing aqueous two-phase system (ATPS) formation in a macromolecule solution.

Referring now to FIG. 1, an exemplary method 100 of characterizing the thermodynamic and kinetic properties of aqueous two-phase system (ATPS) formation in a macromolecule solution. Method 100 begins with step 102, wherein a temperature gradient device is provided, the temperature gradient device having a hot surface and a cold surface separated by a gap space. In step 104, a sample holder is provided, the sample holder having a first end, a second end, a length in-between, and at least one sample reservoir positioned within the length of the sample holder, wherein the length spans at least the gap space of the temperature gradient device to touch the hot surface and the cold surface. In step 106, at least one macromolecule solution is loaded into the at least one sample reservoir. In step 108, the sample holder is positioned onto the temperature gradient device such that the first end and the second end touch the hot surface and the cold surface simultaneously to establish a temperature gradient across the length of the sample holder. In step 110, the length of the sample holder spanning the gap space is imaged over a time period to capture light scattering intensity as a function of temperature in the sample holder. In step 112, a phase separation temperature ($T_{ph}$), a spinodal temperature ($T_{meta}$), and a gelation temperature ($T_g$) of the at least one macromolecule solution in each of the at least one sample reservoir.

The sample holder can be selected from cuvettes, capillary tubes, multi-well plates, and combinations thereof, wherein the at least one sample reservoir can comprise the internal volume of a cuvette, a capillary tube, or the wells of a multi-well plate. Sample reservoirs can be loaded by injection or by capillary action and can be sealed using a permanent or a removable plug, such as an amount of a wax, a sealant, a glue, a stopper, a cap, a cover, and the like. The macromolecule solutions can comprise any molecule of interest, including but not limited to antibodies, proteins, nucleic acids, oils, food formulations, polymers, and the like.

By touching the hot surface and the cold surface simultaneously, a temperature gradient is established across the length of the sample holder, wherein the temperature decreases about linearly from the end touching the hot surface to the end touching the cold surface. In some embodiments, the sample holder can be coupled to or comprise a material having high thermal conductivity, such that upon touching the hot surface and the cold surface, heat is transferred quickly to establish the temperature gradient across the sample holder. Suitable materials include but are not limited to aluminum, copper, tungsten, zinc, and their respective alloys as would be understood by those having skill in the art.

In some embodiments, the sample holder comprises a transparent or translucent material, such as a glass or plastic, permitting the imaging step to capture images of the macromolecule solution held within. The imaging step can be performed using any suitable technique, including but not limited to light field microscopy, dark field microscopy, fluorescence microscopy, raman microscopy, polarized light microscopy, phase-contrast microscopy, differential interference contrast microscopy, and multiphoton excitation microscopy.

As described elsewhere herein, as a macromolecule solution cool, phase separation occurs when the macromolecules begin to form into droplets that eventually coalesce into a protein-rich phase separate from a protein-poor phase. Distinct regions of droplets and protein phases are visible over time that can be quantitatively delineated by discontinuities in line scans of light scattering intensity versus temperature. The location within a sample reservoir of the onset of light scattering adjacent to the end of the sample holder touching the hot surface can thereby indicate the phase separation temperature $T_{ph}$ of droplet formation due to the established linear temperature gradient in the prior steps. As the macromolecule solution is further cooled, the droplets coalesce into a protein rich phase separate from a protein-poor phase that scatters less light than the droplets. The location within a sample reservoir adjacent to the $T_{ph}$ where light scattering intensity reaches a minimum intensity relative to the length of the sample holder thereby indicates the spinodal temperature $T_{meta}$. Eventually at a later time point, the macromolecule solution is cooled to the point where gelation occurs, a network of packed proteins that scatters light. At this time point, the location within a sample reservoir of the onset of light scattering adjacent to the end of the sample holder touching the cold surface indicates the gelation temperature $T_g$. In some embodiments (such as at low macromolecule concentrations), the macromolecule solution exhibits a pattern of light scattering over time that indicates only a phase separation temperature $T_{ph}$ and a gelation temperature $T_g$.

In some embodiments, the macromolecule solutions can be modified such that LLPS and other temperature phase phenomena are observable within the temperature ranges attainable by the first and second temperature elements. For example, phase phenomena that occur at temperatures that are difficult to reach or cause evaporative, freezing, or other effects in a macromolecule solution that may interfere with imaging. Excipients may be added to a macromolecule solution to raise or lower the temperature at which a phase phenomena occurs without changing the phase change profile of the sample. Non-limiting examples of excipients include acids, bases, salts, surfactants, crowders, buffers, and the like. Salts can include but are not limited to sodium chloride (NaCl), lithium chloride (LiCl), barium chloride ($BaCl_2$), potassium (KCl), calcium chloride ($CaCl_2$)), magnesium chloride ($MgCl_2$) and cesium chloride (CsCl). In one embodiment, sodium chloride is used. In some embodiments, the addition of a salt lowers the phase separation temperature $T_{ph}$. Crowding agents generally refer to reagents or molecules which alter the properties of other molecules in a solution. Examples of molecular crowding reagents include, but are not limited to, polyethylene glycol (PEG), Ficoll, dextran, and the like. In some embodiments, the crowding reagents can be selected based on molecular weight, such as PEG-3350, PEG-4000, PEG-6000, Ficoll PM70, Ficoll PM400, and the like. Generally, the crowding agents have high molecular weight or bulky structure which generates a crowded environment in a solution that includes other molecules. The crowding agents reduce the volume of solvent available for other molecules in the solution, which results in molecular crowding. The molecular crowding may alter the rates or equilibrium constants of the reactions. In some embodiments, the addition of a crowding agent raises the phase separation temperature $T_{ph}$.

In some embodiments, the addition of a crowding agent can be selected to raise the phase separation temperature $T_{ph}$ to a specified temperature in the range of 0° C. and 30° C., wherein the concentration of the crowding agent is identified as the critical crowder concentration. In some embodiments, the critical crowder concentration is a concentration of crowding agent configured to obtain a phase separation temperature $T_{ph}$ of 15° C. The critical crowder concentration can be used as a measure and predictor of stability in a macromolecule solution, wherein a lower critical crowder concentration trends towards an insoluble solution that is more likely to precipitate over time, and a higher critical crowder concentration trends towards a soluble solution that is less likely to precipitate over time. The critical crowder concentration can also be used to screen excipients. Excipients may be evaluated in a crowding assay, wherein the critical crowder concentration of a solution is calculated before and after the addition of an excipient, and the effect of the excipient on long term stability of the solution is determined based on the change in the critical crowder concentration. As stated before, lowering the critical crowder concentration may decrease stability. Accordingly, screened excipients may be ranked in order of their effect on stability. In some embodiments, critical crowder concentration can also be used to screen ideal pH for long term stability. In some embodiments, a macromolecule solution has a minimum critical crowder concentration at an isoelectric point (pI), which can be characterized at a specific pH.

Accordingly, shifting pH away from the pI is configured to increase the critical crowder concentration.

Figure 2:
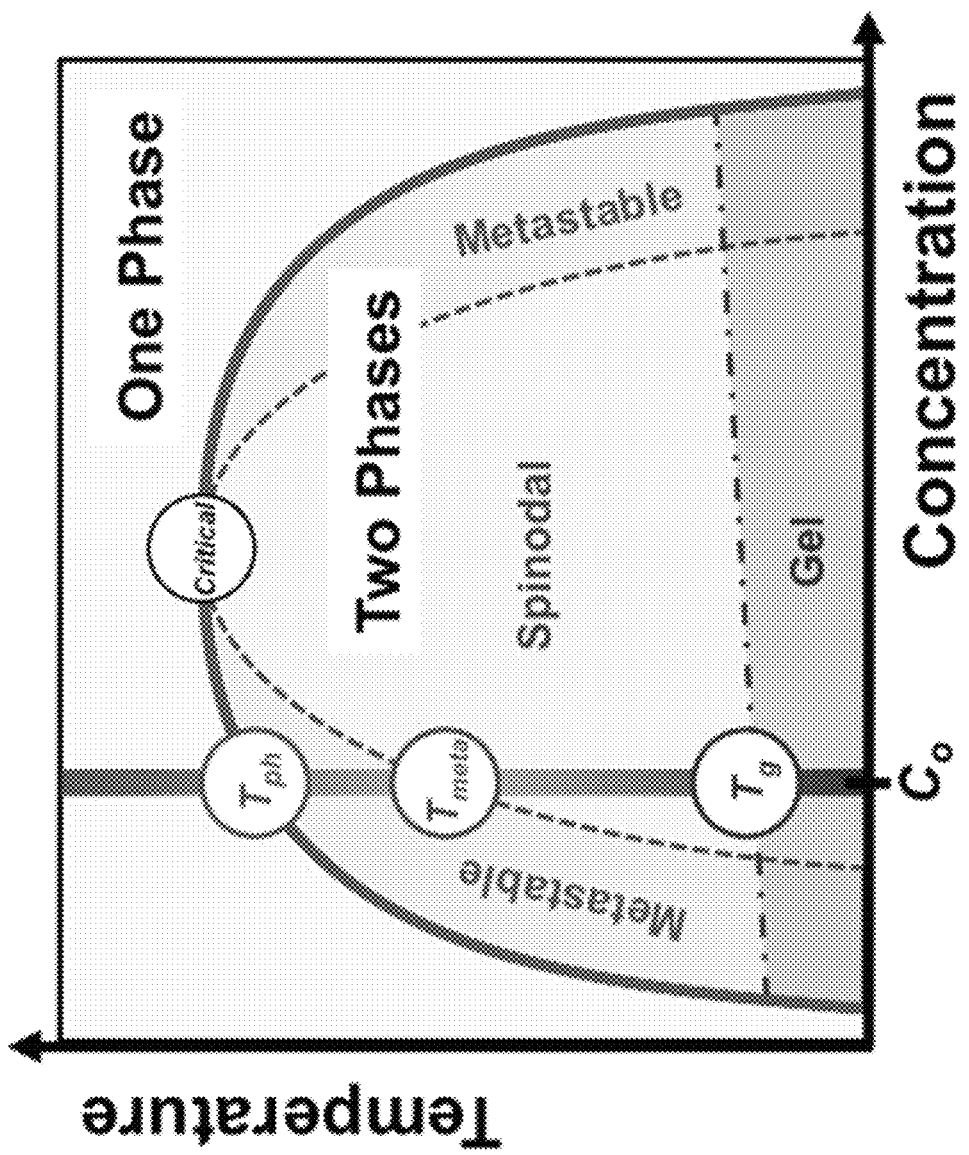
FIG. 2 is a schematic phase diagram of a colloidal system with attractive interactions displaying an upper critical solution temperature. The binodal (solid curve), spinodal (dashed curve), and gelation (dashed line) curves delineate the various regions of the diagram. Temperature gradient experiments were performed at concentrations below the critical point (open black circle at the top of the binodal and spinodal curves), as illustrated by the vertical bar at $C_o$ (red to blue gradient with decreasing temperature). $T_{ph}$, $T_{meta}$, and $T_{gel}$ values were extracted from each experiment and are denoted by open colored circles.

In various embodiments, the thermodynamics of colloidal phase separation in the macromolecule solutions can be further characterized by performing an array of temperature gradient assays on solutions of different concentrations. Each macromolecule solution exhibits a different phase separation temperature $T_{ph}$, spinodal temperature $T_{meta}$, and gelation temperature $T_g$. Combining the transition temperatures across a range of solution concentrations generates a colloidal phase diagram as shown in FIG. 2, having a bimodal curve corresponding to the phase separation temperatures $T_{ph}$, a spinodal curve corresponding to the spinodal temperatures $T_{meta}$, and a gel line corresponding to the gelation temperatures $T_g$. The bimodal curve and the spinodal curve meet at a single point that indicates the critical temperature $T_{crit}$ and critical concentration $C_{crit}$. Used together, the critical temperature $T_{crit}$ and critical concentration $C_{crit}$ can be used model macromolecule concentration and phase separation temperature $T_{ph}$ using the formula $$T_{ph} = T_{crit}\left[1 - A\left(\frac{C_{crit} - C}{C_{crit}}\right)^{1/\beta}\right],$$

where A and β are empirical parameters that determine the shape of the phase boundary. The gel line has a linear relationship that can be modeled by a slope of $$\frac{\partial T_{gel}}{\partial C}.$$

As described elsewhere herein, the transition temperatures of a macromolecule solution can be adjusted using excipients. Accordingly, a macromolecule solution can have a transition temperature $T_{i,0}$ under initial conditions before any excipients are added. In some embodiments, the effect of an excipient on a transition temperature is linear, such as in the case of a crowder, wherein the excipient induced slope can be expressed as $$m_{i,excipient} = \frac{\partial T_i}{\partial C}.$$

In some embodiments, the effect of an excipient on a transition temperature is not linear, such as in the case of a salt, wherein the fit is closer to a Langmuir model (Langmuir binding isotherm) that can be expressed as $$T_{ph} = T_{i,0} + ac + \frac{B^{max} K_A c}{1 + K_A c},$$

where a is a linear term related to the surface tension at the macromolecule/water interface (for uncharged molecules), c is the concentration of excipient/salt, $B^{max}$ represents changes in $T_{ph}$ as ion binding saturates at the protein surface, and $K_A$ can be interpreted as the binding constant of the salt's anions to the protein.

In various embodiments, the kinetics of colloidal phase separation in the macromolecule solutions can be characterized by determining the order of kinetics at individual temperatures and temperature-dependent kinetics of ATPS formation. ATPS formation is caused by the coalescing of droplets. Depending on the macromolecule solution, ATPS formation can be a zero-order reaction, a first-order reaction, or a second-order reaction. A zero-order reaction, being independent of concentration, can have a rate constant of $k_{0th}$. A first-order reaction, which may occur at higher concentrations due to the rupture of the interfacial water film between adjacent droplets being a rate-limiting step, can be expressed as $N=N_0 \exp(-k_{1st}t)$, where the droplet number N decays from an initial number No as a function of time t with a first-order rate constant $k_{1st}$. A second-order reaction, which may occur at lower concentrations due to the collision rate between droplets as the rate-limiting step, can be expressed as $$\frac{1}{N} - \frac{1}{N_0} = k_{2nd}t,$$

with the second-order rate constant $k_{2nd}$. The separation of a cloudy droplet dispersion into a clear equilibrated APTS can also be modeled using a Kohlrausch-Williams-Watts (KWW) function $I=\exp(-(k_{KWW}t)^{\beta_{KWW}})$, wherein I is the normalized scattering intensity, t is time, $\beta_{KWW}$ is the cooperativity index, and $k_{KWW}$ is an apparent ATPS formation rate constant.

Temperature-dependent kinetics of ATPS formation can be described in several ways. The maximum rate constant, $k_{max}$, occurs within the region of spinodal temperature $T_{meta}$. The crossover in cooperativity occurs within the region of gelation temperature $T_{gel}$, where $\beta_{KWW}=1$. An Arrhenius plot using $y=\ln(k)$ and $x=1000/T$ can be used to fit a tan h function $y=(1-s(x))*f(x)+s(x)*g(x)$ to fit two lines with a gradual modifiable transition width, where f(x) and g(x) are equal to $$m_i * x + b_i,$$
$$s(x) = 0.5 + 0.5 * \tanh\left(\frac{x-c}{w}\right),$$

where i is f or g, respectively, x is temperature, c is some constant and w defines the width of the transition. To obtain apparent activation energy $E_{A,app}$, the first derivative is taken for each of the fits, and an average of the first four and last four points of data along these curves is calculated, close to where the slopes plateau. The first four points lie along the cold temperature side and should be informative about coalescence, whereas the last four data points lie along the hot side and should report on metastability.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out exemplary embodiments of the present invention, and are not to be construed as limiting in any way the remainder of the disclosure.

Example 1: A Stepwise Mechanism for Aqueous Two-Phase System Formation in Concentrated Antibody Solutions The following study applies temperature gradient microfluidics (Mao H et al. Journal of the American Chemical Society. 2002 Apr. 24; 124(16):4432-5; Mao H et al. Analytical Chemistry. 2002 Oct. 1; 74(19):5071-5; Zhang Y et al. Journal of the American Chemical Society. 2003 Dec. 17; 125(50):15630-5; Zhang Y et al. Biomacromolecules. 2006 Jul. 10; 7(7):2192-9) to measure the kinetics of ATPS formation for mAb formulations in the presence of PEG.

A model colloidal phase diagram displaying an upper critical solution temperature is shown in FIG. 2. Each of the experiments described herein provides continuous temperature-dependent information for a fixed mAb concentration, e.g., the vertical line at $C=C_o$ in FIG. 2. The phase separation temperature is located on the binodal curve (solid curve in FIG. 2), above which the solution is homogeneous. Below $T_{ph}$, LLPS is spontaneous and the solution separates into 2 phases. Just below $T_{ph}$, however, ATPS formation is slow because the homogeneous solution is metastable with respect to LLPS (the metastable region discussed in this work is distinct from the metastability of the phase-separated state with respect to crystallization or irreversible aggregation). The lower temperature limit of the metastable region, $T_{meta}$, occurs on the spinodal curve (dashed curve in FIG. 2), below which ATPS formation proceeds more rapidly. At even cooler temperatures, below the gel line (dashed straight line in FIG. 2), ATPS formation becomes arrested due to the assembly of proteins into a kinetically trapped gel state.

By measuring ATPS formation along a temperature gradient, the 3 regions of the colloidal phase diagram below $T_{ph}$ are simultaneously visualized. Each region can be identified by its unique kinetics for ATPS formation. The regions are quantitatively delineated by discontinuities in the line scans of light scattering intensity versus temperature, as well as in the temperature dependence of the rate constant for ATPS formation. Using the Arrhenius law, an apparent activation energy was determined, $E_{A,app}$, for ATPS formation in the metastable region ($E_{A,app} \sim -35$ kcal mol$^{-1}$) and in the spinodal region ($E_{A,app} \sim 1$ kcal mol$^{-1}$). A 2-step model, involving reversible droplet growth followed by irreversible droplet coalescence, is proposed to explain the effects of temperature on $E_{A,app}$. In fact, the kinetics of ATPS formation is demonstrated to be governed by the thermodynamics of supersaturation in the metastable region but becomes rate-limited by droplet coalescence in the spinodal region. Furthermore, the Vogel-Fulcher-Tammann law is employed to characterize the astoundingly fragile structure of the mAb gel state (fragility index value of D=0.05), which is consistent with a fractal-like network held together by weak protein-protein interactions. Significantly, the measurements show that gelation can occur below either the metastable or the spinodal region of the colloidal phase diagram, depending on the mAb concentration. Such results contradict the notion that gelation can only occur via arrested spinodal decomposition.

The materials and methods are now described.

Sample Preparation

An IgG1 mAb with a pI of 8.2 was produced, purified, and formulated at 116 mg/mL in 10 mM sodium acetate at pH 4.8. Samples were diluted from this stock solution. NaCl (EMD Millipore), Na$_2$HPO$_4$ and NaH$_2$PO$_4$ (Sigma Aldrich) were at least 99% pure. PEG-3350 was purchased from Spectrum Chemical. All salts as well as PEG were used as received. 18.2 MΩ·cm purified water from a Barnstead Nanopure water purification system (Thermo Scientific) was used to prepare solutions. Concentrated stock solutions were mixed volumetrically to achieve the desired concentrations. The samples were then incubated in a water bath at 318 K for 30 minutes along with periodic mixing to ensure homogeneity. To make temperature gradient measurements, the solutions were loaded into 12 mm×1 mm×0.1 mm rectangular borosilicate glass capillary tubes (VitroCom, Inc.), by capillary action and sealed with wax to avoid sample evaporation and convection.

Liquid formulations of therapeutic mAbs are typically prepared under conditions where the protein bears a net positive charge. As such, phosphate buffer was employed to achieve a pH of 6.8, which was below the pI. It is noted, however, that histidine and acetate buffers are more commonly employed in mAb formulations. NaCl was added to screen long-range electrostatic repulsions between the net positively charged mAbs. The PEG-3350 concentration was adjusted to induce phase separation at temperatures between 278 and 308 K.

Controlling the pH of mAb Solutions

The final pH of mixed solutions was found to be dependent on the mAb concentration, due to the protein's buffer capacity. As such, 0.5 M phosphate buffer stock solutions were employed to maintain pH 6.8±0.1 for all mAb concentrations. pH was adjusted by mixing 2 sodium phosphate solutions, a 0.5 M NaH$_2$PO$_4$ solution and a 0.5 M Na$_2$HPO$_4$ solution, at various ratios to generate a series of buffer stock solutions and choosing the ratio that matched the desired final pH upon mixing with the other solution components. In this method, appropriate amounts of H$_3$O$^+$ and OH$^-$ were added to the sample to achieve the desired pH, while maintaining constant phosphate and chloride concentrations. This avoided tedious small volume additions of a strong acid (HCl) or base (NaOH). It should be noted that the total Na$^+$ ion concentration changed by less than ~ 7 mM between the 20 and 100 mg/mL mAb. In other words, the pH and ionic strength were held essentially constant for all of the solutions.

Calibrating the Temperature Gradient

For each experiment, the temperature gradient was calibrated by placing 2 reference solutions alongside the mAb samples of interest. Both of the reference solutions contained 10 mg/mL poly(N-isopropyl acrylamide) (PNIPAM) and a given NaCl concentration in H$_2$O. The PNIPAM was purchased from Polymer Source and had a MW=1.868×10$^5$ g/mol. The lower critical solution temperature (LCST) of each reference solution was obtained with a melting point apparatus that measured light scattering intensity as the temperature was increased at a rate of 0.5 K/min. Specifically, the LCST was determined at the onset of scattering intensity relative to the flat, low intensity baseline observed at lower temperatures. When placed onto the temperature gradient device, the reference solutions became cloudy at temperatures above the LCST. The pixel position of the LCST was obtained by the onset of light scattering intensity relative to the low intensity baseline on the cold side of the capillary. The temperature gradient was calculated using the pixel positions and the LCST values of the 2 samples, assuming a linear relationship between position and temperature (Mao H et al. Journal of the American Chemical Society. 2002 Apr. 24; 124(16):4432-5). It is noted that the temperature gradient was imposed on a 6 mm portion of the 12 mm glass capillary tube. This is half of the distance employed for the temperature gradient in previous studies (Mao H et al. Journal of the American Chemical Society. 2002 Apr. 24; 124(16):4432-5), which displayed a linear temperature dependence. The linearity of the temperature gradient device used in this work was confirmed by calibrating the instrument as described above and then measuring the LCST of PNIPAM in 0.8 M NaCl. The value determined on the temperature gradient was similar to the value determined with a melting point apparatus.

Side-on Imaging of ATPS Formation and the Thermodynamics of the Colloidal Phase Diagram Imaging ATPS Formation on a Temperature Gradient Device Versus Under Isothermal Conditions In a control experiment, the 90 mg/mL mAb solution with 20 mg/mL PEG-3350, 15.5 mM NaCl, and 22.7 mM phosphate buffer at pH 6.8 was introduced onto the gradient at a constant temperature of 318 K, which is above $T_{ph}$ (FIG. 3A). The image appeared dark across the entire sample, confirming that the homogeneous solution did not scatter very much light. In comparison, there was significant light scattering from the droplets that formed below $T_{ph}$, at t=1 min, after being introduced onto a linear temperature gradient of 278 to 318 K (FIG. 3B). As can be seen at 4 and 7 min, ATPS formation above $T_{gel}$ resulted in a reduction of light scattering intensity (FIG. 3C, FIG. 3D). Eventually, the ATPS formation yielded a completed ATPS above $T_{gel}$, e.g. 60 min (FIG. 3E).

Throughout this study, the reduction in light scattering intensity with time was attributed to the growth of droplets and the formation of a clear ATPS within the sample capillary. To confirm this interpretation, side-on images were acquired for macroscopic phase separation in a 1.5 mL microcentrifuge tube at constant temperature. These constant temperature experiments were also performed on a 90 mg/mL mAb solution with 20 mg/mL PEG-3350, 15.5 mM NaCl, 22.7 mM phosphate buffer at pH 6.8. The sample was incubated and periodically mixed for 30 min at 318 K (FIG. 3F). To initiate a temperature quench, the sample was removed from the water bath (318 K) and placed at room temperature (293 K) or in a cold room (277 K). The images for the 293 K and 277 K quench experiments are shown in the upper and lower images of FIG. 3F through FIG. 3I, respectively. The images were obtained over time to follow the macroscopic phase separation at 1, 15, and 60 minutes in FIG. 3G, FIG. 3H, and FIG. 3I, respectively. As expected, the 293 K quench resulted in the formation of a clear ATPS after 60 minutes, while the deeper quench at 277 K formed a gel that did not macroscopically phase separate, even after several weeks.

Measuring Transition Temperatures on the Temperature Gradient

The 3 transition temperatures were obtained quantitatively from line scans of scattering intensity as a function of temperature. The phase separation temperature, $T_{ph}$, was determined just after the temperature gradient stabilized, t=1 min. The value of $T_{ph}$ was defined as the onset of intensity, relative to the region of low and flat scattering intensity at high temperature, as shown by the intersection of the 2 red tangent lines in FIG. 4A. The metastable transition temperature, $T_{meta}$, was determined at the first time point where ATPS formation came to completion below $T_{ph}$. This time point occurred when the light scattering reached a minimum in intensity and did not change as more time passed. In most cases, the time point for the metastable transition determination was around t=7 min. The metastable transition temperature was determined by the onset of light scattering intensity, relative to the nearly completed ATPS at lower temperatures, as shown by the intersection of the 2 tangents shown with green lines in FIG. 4B. Finally, the gelation temperature, $T_{gel}$, was determined from the line scan at t=60 min, where ATPS formation had been completed or became kinetically trapped at all temperatures below $T_{ph}$. Specifically, the gelation transition temperature was determined by the onset of light scattering, relative to the completed ATPS baseline, as shown by the intersection of the 2 solid blue tangent lines in FIG. 4C. It is noted that the 4 line scans provided in the main text, FIG. 2, have been normalized to the highest and lowest intensities observed in temperature and time during the experiment. Specifically, the data for all 4 line scans were normalized by subtracting the lowest intensity data point and then dividing the line scan data by the difference between the highest and lowest intensity data points. As such, the normalized line scans have values that ranging from 1 to 0.

Constructing a Colloidal Phase Diagram in the Presence of PEG

Figure 5:
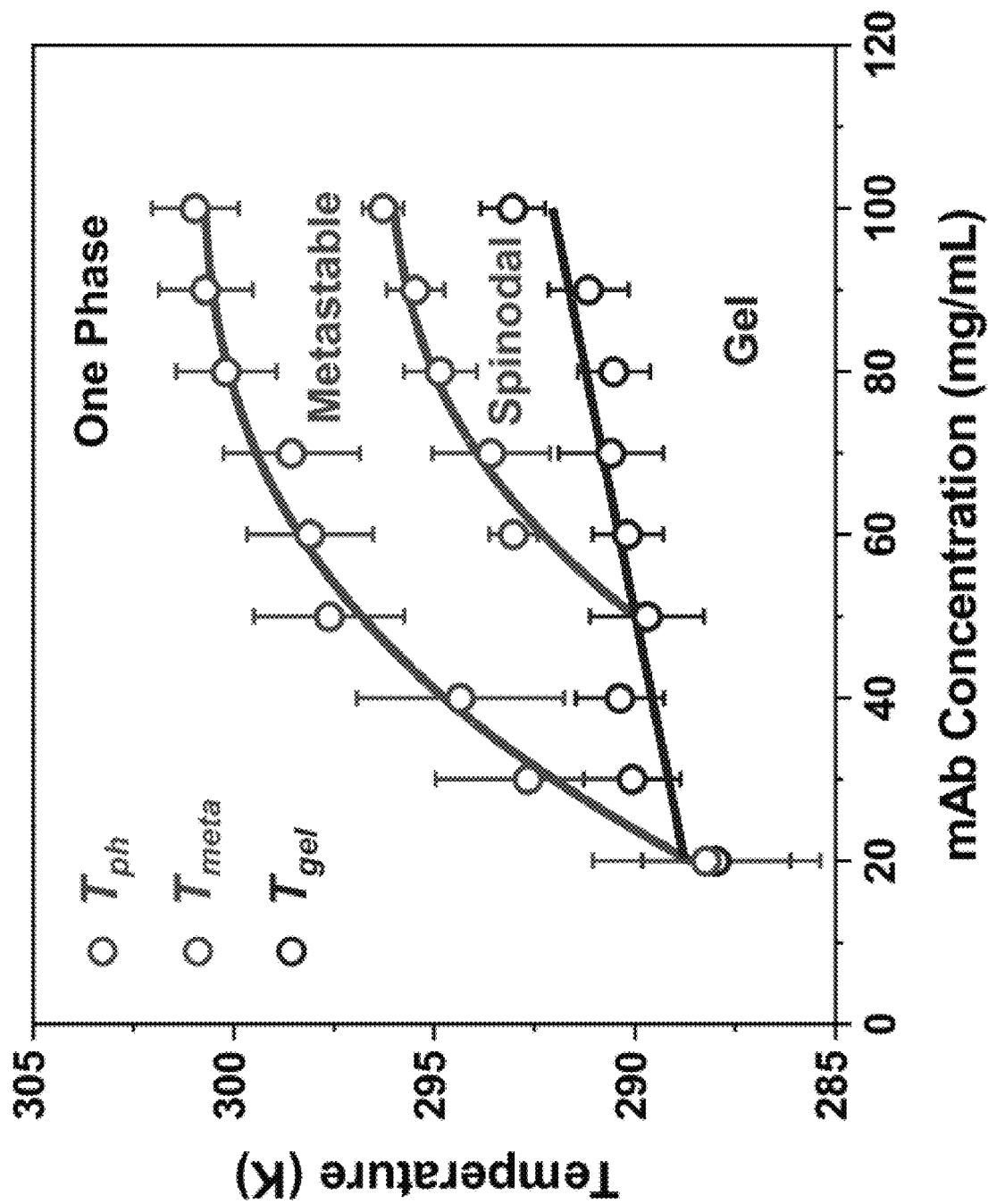
FIG. 5 depicts a colloidal phase diagram measured at 20 mg/mL PEG-3350. $T_{ph}$ (top metastable data points) and $T_{gel}$ (bottom gel data points) were measured at t=1 min and t=60 min, respectively; while $T_{meta}$ (middle spinodal data points) was measured at the first time point when ATPS formation had come to completion below $T_{ph}$. The metastable and spinodal curves are guides to the eye, while the gel curve is a linear fit to the $T_{gel}$ data.

The 3 transition temperatures were measured as a function of mAb concentration at 20 mg/mL PEG-3350 to construct the phase diagram shown in FIG. 5. As can be seen, $T_{ph}$ increased sharply at low concentration, but began leveling-out by 100 mg/mL (top data points labeled Metastable in FIG. 5). Below the binodal curve, a metastable region was observed that was bound by $T_{meta}$ at low temperature (middle data points labeled Spinodal in FIG. 5) for solutions containing more than 50 mg/mL mAb. $T_{meta}$ increased with mAb concentration in a similar fashion to the binodal curve up to 100 mg/mL mAb and defined the spinodal curve (middle curve in FIG. 5). The spinodal should meet the binodal at the critical point, as shown schematically in FIG. 2. This intersection was not observed in the employed concentration range, which may indicate that the critical concentration, $C_{crit}$, was located at higher mAb concentration. The presence of PEG, however, makes the system ternary, consisting of water, protein, and PEG. The ternary nature of the system could cause the phase diagram to have an asymmetric shape or move the critical point away from the binodal maximum (Annunziata O et al. Proceedings of the National Academy of Sciences. 2002 Oct. 29; 99(22): 14165-70; Wang Y et al. The Journal of chemical physics. 2013 Sep. 28; 139(12):09B604_1; Liu C et al. Proceedings of the National Academy of Sciences. 1996 Jan. 9; 93(1): 377-82; Wang Y et al. Proceedings of the National Academy of Sciences. 2010 Jul. 27; 107(30):13282-7). At lower concentrations, $T_{meta}$ was not measurable due to gelation. Indeed, $T_{meta}$ should be below $T_{gel}$ for mAb concentrations between 20 and 50 mg/mL. $T_{gel}$ was measured at all mAb concentrations to chart the gelation line, below which separation became arrested (bottom curve labeled Gel in FIG. 5). For all samples, gelation occurred at or below $T_{ph}$ and $T_{gel}$ increased only slightly with mAb concentration, with a linear slope of 0.05 K*(mg/mL)$^{-1}$. These results demonstrate that the kinetic barrier associated with arrested ATPS formation is relatively independent of mAb concentration.

Kinetic Analysis of ATPS Formation

3-Dimensional Plots of the Light Scattering Data Obtained from the Temperature Gradient Experiments To visualize the data obtained on the temperature gradient device, plots of light scattering intensity were constructed as a function of both temperature and time for various mAb concentrations. These 3-dimensional plots are provided for 90, 60, 40, and 20 mg/mL mAb conditions in FIG. 6A through FIG. 6B.

Establishing a Stable Temperature Gradient

Figure 7A:
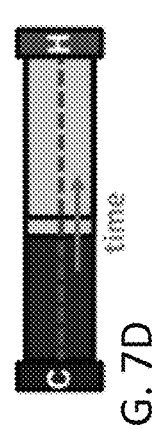
FIG. 7A through FIG. 7G depict the results of control experiments on the establishment of a temperature gradient and a demonstration of the procedure for processing the light scattering kinetic data.

The time required to establish a steady-state linear temperature gradient across the sample capillary was estimated using 2 independent methods. First, the apparent position for the lower critical solution temperature (LCST) of PNIPAM was monitored as a function of time. A 10 mg/mL PNIPAM sample in 0.8 M NaCl was loaded into a capillary tube and then incubated at 4° C., where the polymer was soluble. The sample was then introduced onto a pre-equilibrated temperature gradient (278-318 K) and line scans of the light scattering intensity were measured across the capillary as a function of time (FIG. 7A). At each time point, the line scans showed weak light scattering at lower pixel numbers (cold temperatures) and an onset of light scattering at the LCST located at higher pixel numbers (hot temperatures). The spatial position of the LCST shifted to a higher pixel position as time progressed and the sample capillary established a steady-state temperature gradient.

Figure 7B:
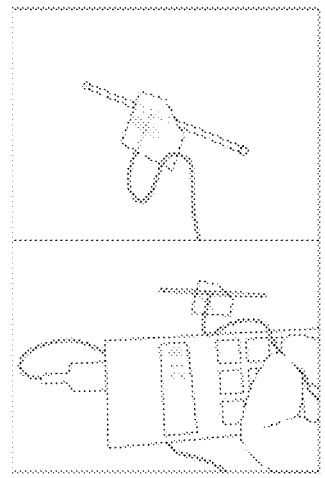
Figure 7C:
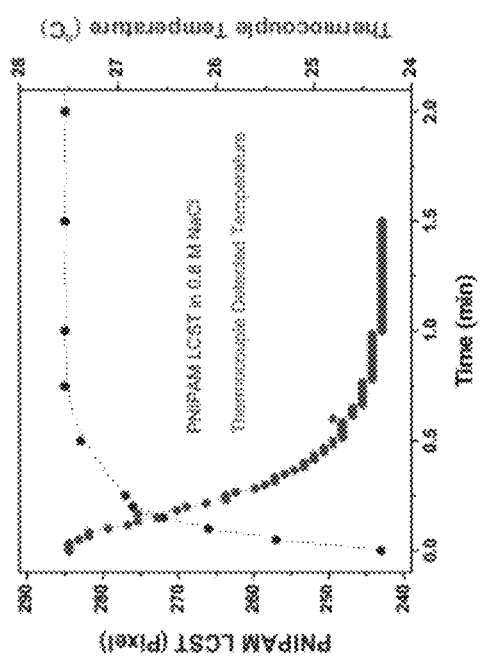
Figure 7D:
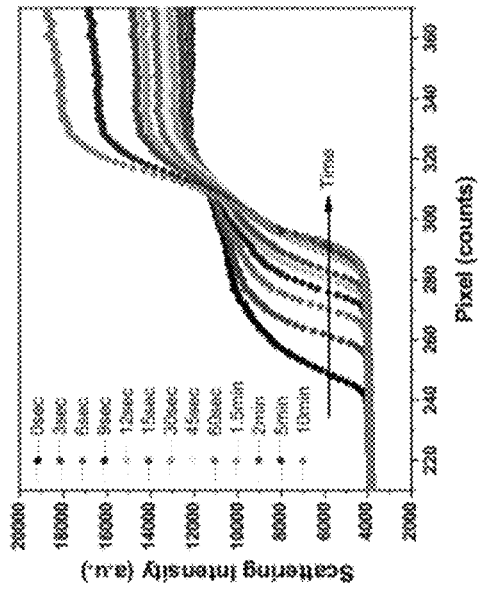

The apparent LCST pixel position is plotted as a function of time in FIG. 7B (data points increasing in value). A schematic illustration of the PNIPAM experiment is provided in FIG. 7C. In a separate experiment, a thermocouple was used to acquire direct measurements of the external temperature of a capillary filled with DI water. The thermocouple was fastened to the capillary with a piece of scotch tape as shown in FIG. 7D. After introduction of the sample onto the temperature gradient, the temperature read out of the thermocouple was recorded at 1 second intervals. The temperature measured by the thermocouple (data points decreasing in value) is plotted as a function of time in FIG. 7B. These 2 measurements provide an estimate of about 1 minute for the temperature equilibration of samples on the temperature gradient device.

Processing the Time-Dependent Light Scattering Data

Figure 7E:
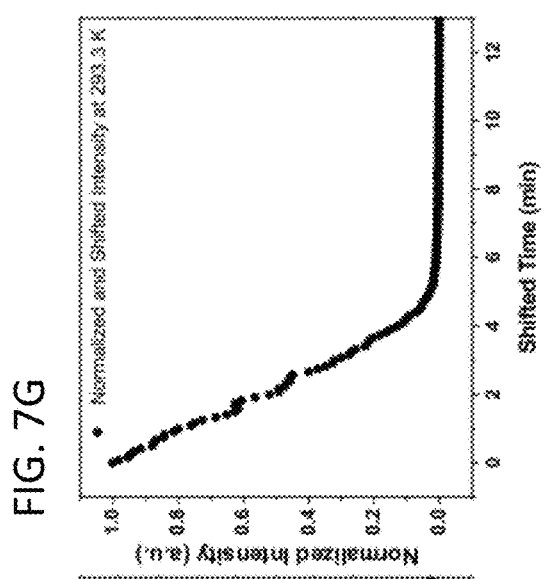
Figure 7F:
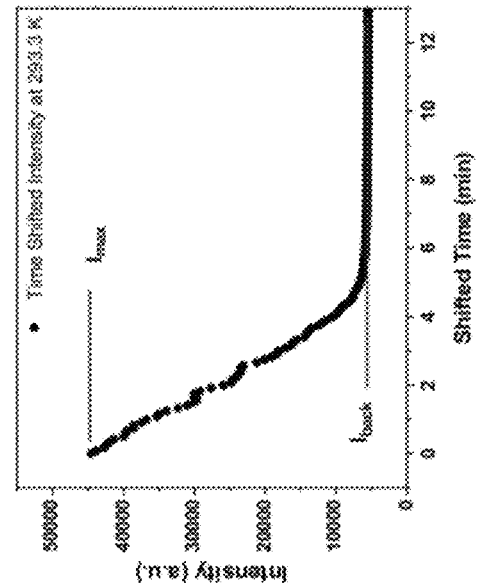
Figure 7G:
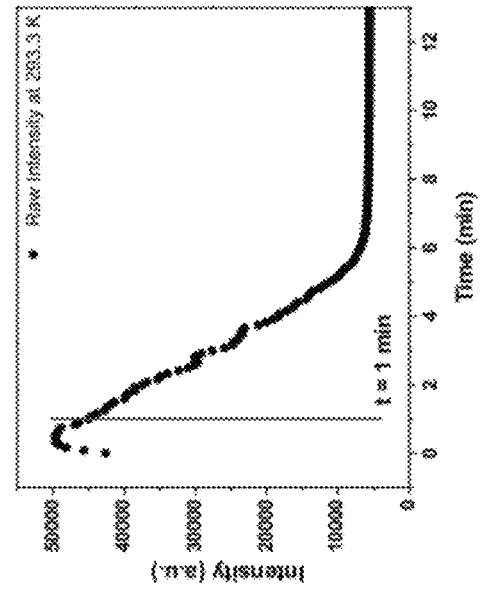
Figure 8A:
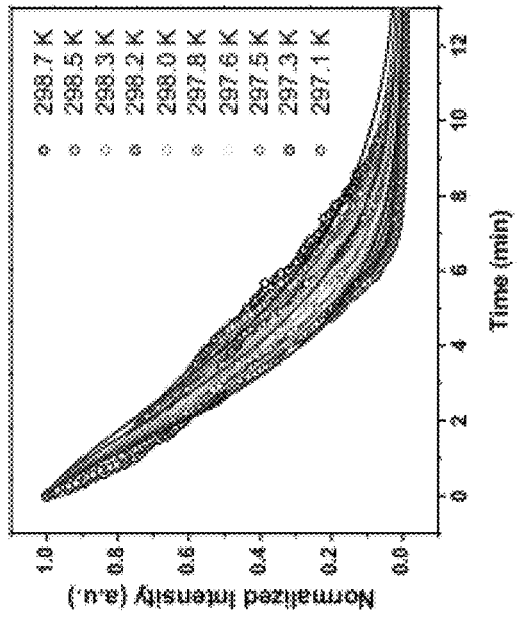
FIG. 8A through FIG. 8L depict the results of normalized light scattering isotherms and KWW fits. The data are grouped into 3 panels corresponding to (FIG. 8A through FIG. 8F) 90 mg/mL, (FIG. 8G through FIG. 8J) 60 mg/mL, and (FIG. 8K through FIG. 8L) 40 mg/mL mAb concentrations all at 20 mg/mL PEG-3350. The 90 mg/mL data are displayed in 6 plots with decreasing temperature.
Figure 8B:
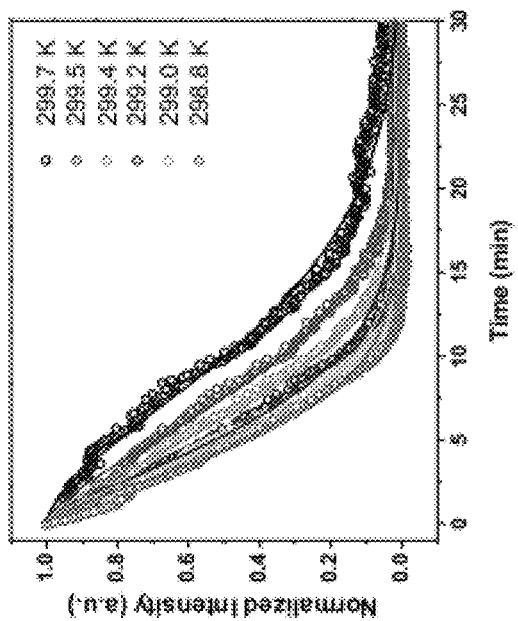
Figure 8C:
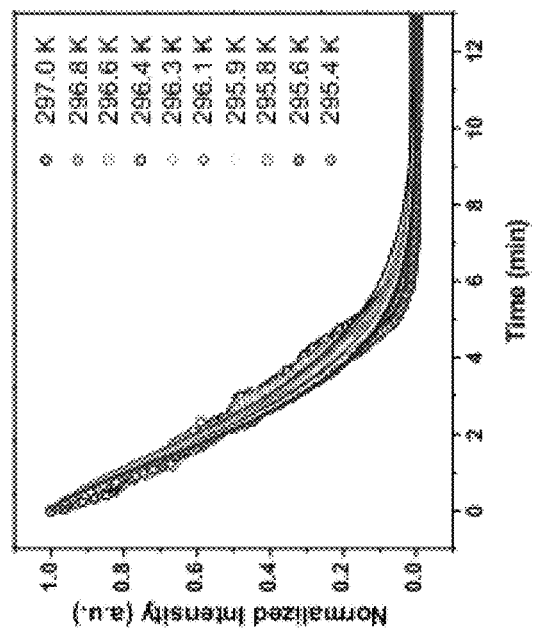
Figure 8E:
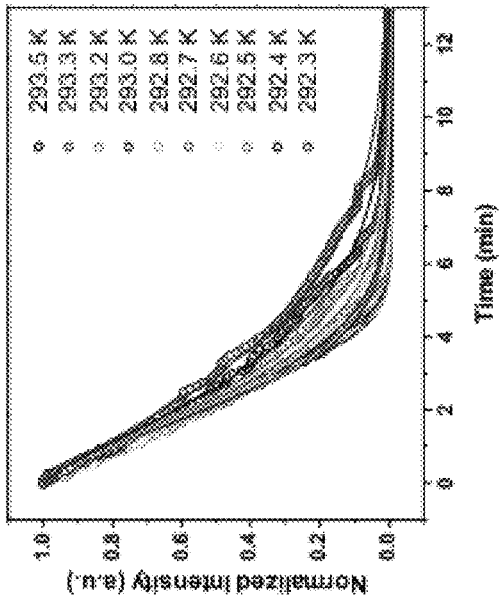
Figure 8D:
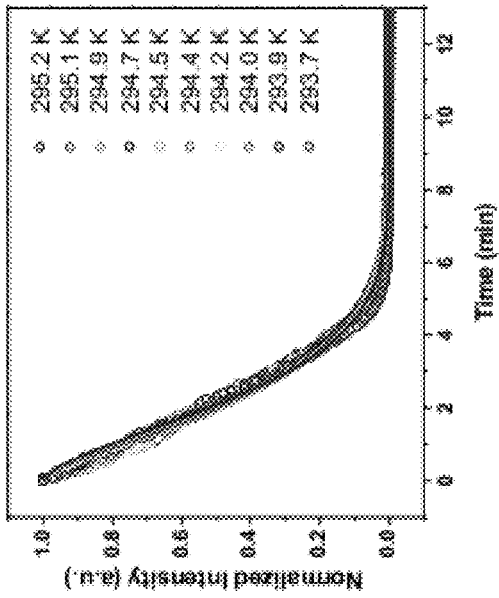
Figure 8F:
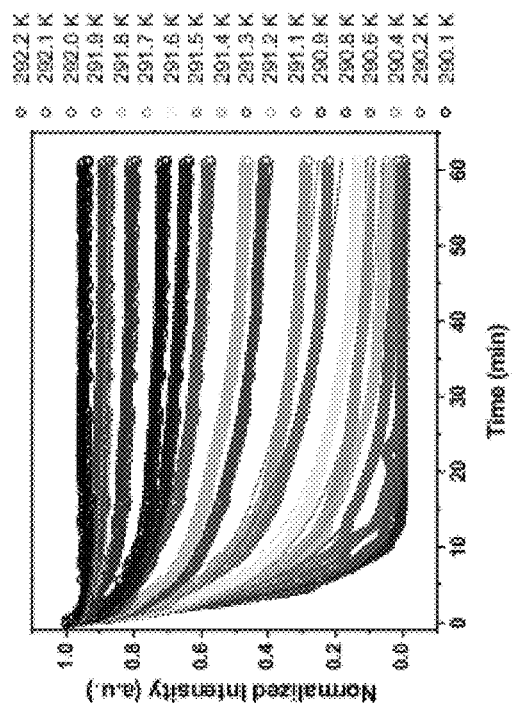
Figures 8G, 8H, 8K:
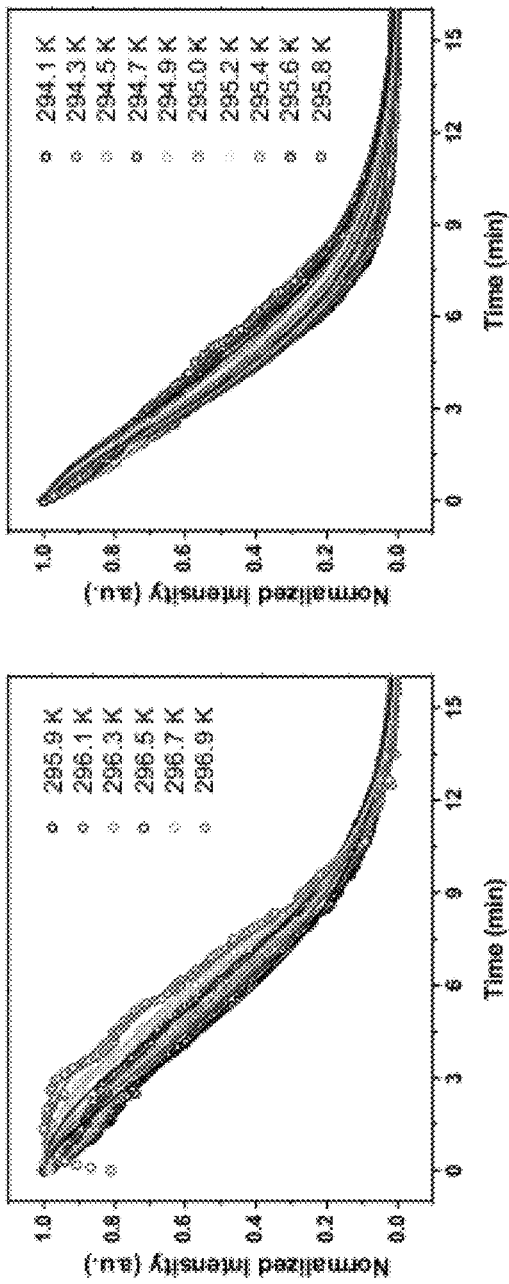
Figure 8J:
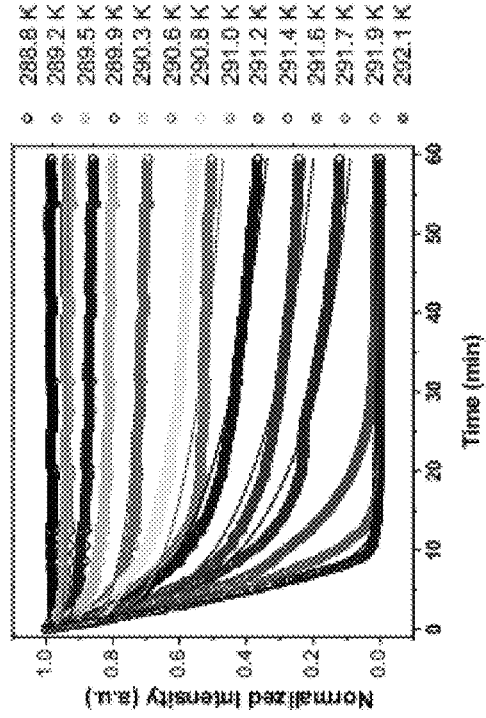
Figure 8I:
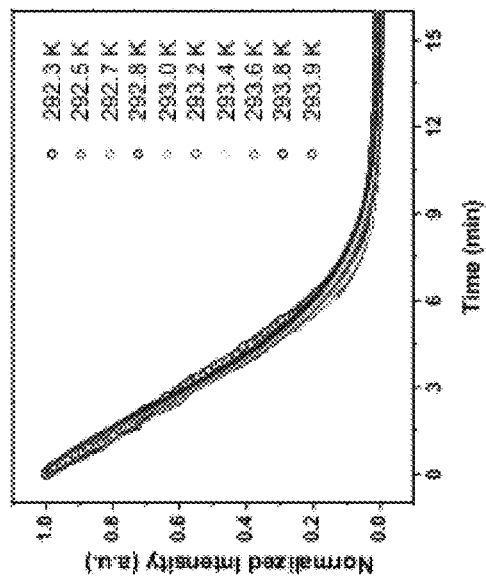
Figure 8L:
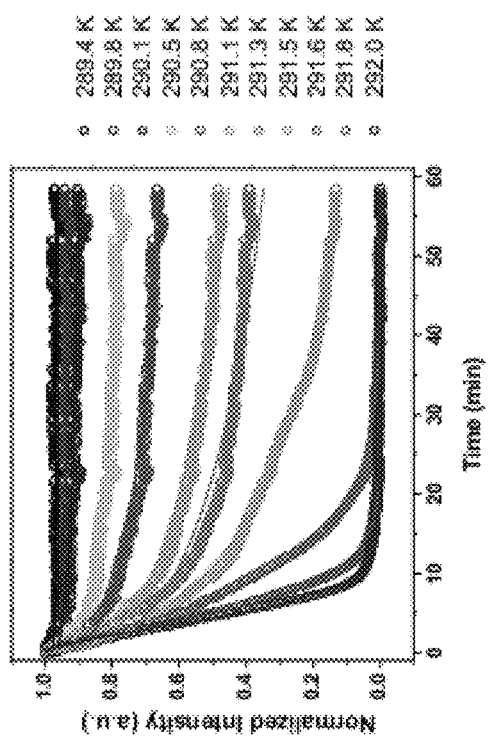

The isothermal light scattering decays, i.e. intensity versus time at a specific temperature along the temperature gradient, were processed by a standardized procedure prior to kinetic modeling. Provided herein is a sequential demonstration of this procedure for an isotherm measured at 293.3 K for the 90 mg/mL mAb sample with 20 mg/mL PEG-3350. The light scattering intensity, I, was plotted as a function of time, t, after placing the sample onto the temperature gradient (FIG. 7E). The solid vertical line denotes the equilibration time t=1 min that was required to establish a steady-state heat flow and a stable, linear temperature gradient. The data within this equilibration time window, i.e. t<1 min, was discarded. Next, the remaining intensity data points were plotted as a function of shifted time, $t_{shifted}$, as shown in FIG. 7F. The shifted time accounts for the discarded data by subtracting a temporal shift of 1 minute along the time axis, as shown in Eq. 1. In the last step of data processing, the shifted time intensity data were background corrected by subtracting the residual scattering intensity, $I_{back}$, and normalized by division by the maximum intensity, $I_{max}$, as shown in Eq. 2. The fully processed data (FIG. 7G), which was used in the fitting analyses, begins at a normalized intensity, $I_{norm}$, of 1 at and decays to 0.

$$t_{shifted} = t - 1 \text{ min} \qquad \text{Eq. 1}$$

$$I_{norm} = \frac{(I - I_{back})}{(I_{max} - I_{back})}$$

Mechanism and Kinetic Models of ATPS Formation

The process by which a thermodynamically unstable dispersion (i.e. droplets of densely packed mAbs) could proceed toward an equilibrated ATPS generally should follow 1 of 2 possible mechanisms: coalescence or Ostwald ripening. For coalescence, there are 2 extreme cases. First, in a very dilute suspension of droplets, the collision rate between the droplets can be the rate-limiting step. In this situation, coalescence should resemble a second-order process. At higher concentrations of the droplets, however, the rupture of the interfacial water film between 2 droplets is the rate-limiting step. Under these circumstances, which are valid at the concentrations employed in the present experiments, the kinetics of droplet coalescence become first-order and follow a first-order reaction equation, Eq. 3 (Florence A T et al. Journal of Pharmacy and Pharmacology. 1971 April; 23(4):233-51; Buscall R. Emulsions 1978 (pp. 15-26). Steinkopff, Heidelberg):

$$N = N_0 \exp(-kt) \qquad \text{Eq. 3}$$

where the droplet number, N, decays from an initial number, $N_0$, as a function of time, t, with a first-order rate constant, k.

By contrast, Ostwald ripening is the growth of large droplets at the expense of smaller ones. The origins of this mechanism are understood by changes in solubility, C(r), of a solute with the curvature of the droplet/solution interface or droplet radius, r. Specifically, there is a surface effect that decreases protein solubility with increasing particle radius, r, as can be shown through the Gibbs-Thompson equation, Eq. 4 (Talapin D V et al. The Journal of Physical Chemistry B. 2001 Dec. 13; 105(49):12278-85; Kabalnov A S et al. Advances in colloid and interface science. 1992 Mar. 23; 38:69-97; Taylor P. Advances in colloid and interface science. 1998 Apr. 16; 75(2):107-63).

$$r = C_\infty \exp\left(\frac{2\gamma V_m}{rRT}\right) \approx C_\infty\left(1 + \frac{2\gamma V_m}{rRT}\right) \qquad \text{Eq. 4}$$

Here, $C_\infty$ is the protein solubility in the protein-poor phase of the completed ATPS, γ is the surface tension of the droplet/water interface, $V_m$ is the molar volume of the protein in the protein-rich phase, r is the radius of a droplet, R is the ideal gas constant, and T is the absolute temperature. A decreasing concentration gradient in the radial direction extends out from the surface of sufficiently small droplets, while an increasing gradient exists near larger droplets (Fortelný I et al. Journal of Polymer Science Part B: Polymer Physics. 1999 Feb. 1; 37(3):181-7). Such gradients ultimately lead to diffusive transfer of material from small droplets to larger ones. Throughout this process, the average droplet radius increases with time as sufficiently large ones release fewer and fewer proteins per unit surface area into the bulk. The droplet number, N, in a system undergoing Ostwald ripening should follow second-order kinetics described by Eq. 5 (Taylor P. Advances in colloid and interface science. 1998 Apr. 16; 75(2):107-63; Taylor P. Advances in colloid and interface science. 1998 Apr. 16; 75(2):107-63).

$$\frac{1}{N} - \frac{1}{N_0} = kt \qquad \text{Eq. 5}$$

The idea that droplets grow via an Ostwald-like ripening process has been proposed for cluster growth in a variety of protein systems (Pan W et al. The Journal of Physical Chemistry B. 2010 Apr. 27; 114(22):7620-30; Li Y et al. The Journal of Physical Chemistry B. 2012 Aug. 27; 116(35): 10657-64; Streets A M et al. Physical review letters. 2010 Apr. 26; 104(17):178102).

Fits to the KWW Model

The scattering decays were best fit to the Kohlrausch-Williams-Watts, KWW, model described by Eq. 10. The normalized light scattering data and KWW fits for each isotherm are provided in FIG. 8A through FIG. 8L. The data are organized into 3 panels corresponding to the 90, 60, and 40 mg/mL mAb samples. The KWW fits provided an apparent rate constant for ATPS formation, k. The exponent β accounts for cooperative (β>1) and anti-cooperative (β<1) features of the decays observed at high and low temperatures, respectively.

Time Scale of the Temperature Gradient Measurements

For the experiments presented in this work, the sample-containing capillary is placed in contact with the hot and cold sides of the device at t=0 s. As protein-rich droplets form, the light scattering is expected to increase. However, a time period of ~60 s is required to form a steady-state temperature gradient across the sample. As such, the kinetic analysis was only performed on data collected after 60 s, after which the intensity decreases monotonically. This slow time scale ($\sim10^1$-$10^3$ s) should be too slow to report on nucleation events ($\sim10^{-2}$-$10^0$ s) (Shah M et al. The Journal of chemical physics. 2004 Oct. 15; 121(15):7505-12). As such, it is expected that changes in scattering intensity report on droplet growth and coalescence, which is discussed in more detail below.

Scattering Intensity Reports on Both Droplet Size and Concentration

The scattering intensity measured on an optical dark-field microscope depends on both the concentration and size of the droplets inside of the sample-containing capillary. At early times after a sample has been cooled below $T_{ph}$, droplets should nucleate until a steady-state number of droplets have formed. By 60 s, it is expected that the changes in the light scattering intensity should report on the growth rate of a steady-state concentration of droplets and their coalescence into an ATPS.

The effect of droplet size on the light scattering intensity depends on the ratio of the droplet radius, r, relative to the wavelength of the incident light, λ~350-720 nm. Scattering from small droplets with r<~25 nm should be weak and governed by Raleigh scattering, which dominated when the value of r/λ is less than 5. The light scattering from large droplets with a r>~2.5 m should also be weak and governed by the geometric scattering, which is relevant for values of r/λ that are greater than 5. Based on these factors, the homogeneous state, consisting mostly of protein monomers with r~5 nm, and the equilibrated ATPS with r~ 5 m should both be nearly optically transparent. Thus, the intensity in TGM experiments should be dominated by Mie scattering, which dominates for values of r/λ ~ 0.5, demonstrating that droplets ranging from r~ 25 nm to 2.5 m produce the signal observed in the TGM kinetics data. Indeed, nucleation events, which involve monomer, dimers, trimer, and higher order oligomers are small and should not scatter much light.

Additional Considerations for the Kinetic Analysis

The mechanistic interpretations are simplified and rely on the assumption that the scattering intensity reports on the number of droplets, N. In reality, however, the intensity depends on both the concentration and size of protein-rich droplets, as discussed above. It is noted that additional complications could arise from non-spherical droplet geometry (e.g. networks formed in the gel state), variations in ensemble size distributions, multiple scattering, the collection of light over integrated scattering angles, and the use of a continuum light source.

Estimates for Diffusion Along the Temperature Gradient

Another important point of concern is the diffusion of material (e.g. proteins or droplets) along the sample capillary during an experiment. The diffusion coefficient of particle, $D_{SE}$, can be approximated by the Stokes-Einstein equation, provided in Eq. 6, $$D_{SE} = \frac{k_B T}{6\pi\eta r} \qquad \text{Eq. 6}$$

where $k_B$ is the Boltzmann constant, T is the temperature, η is the viscosity, and r is the radius of the particle.

The value of DSE at 295 K for a mAb monomer is $\sim5\times10^{-7}$ cm²/s, assuming r=5 nm and the viscosity is that of pure water, $8.9\times10^{-4}$ Pa*s. Under the same solution conditions, a droplet with r=1 m is expected to diffuse at a slower rate, $D_{SE}=2.4\times10^{-9}$ cm²/s. The mean displacement, $\langle\Delta^2 x\rangle^{1/2}$, of these particles at various time points during the experiment can be estimated using Eq. 7.

$$\langle\Delta^2 x\rangle^{1/2} = (6D_{SE}t)^{1/2} \qquad \text{Eq. 7}$$

The values of $\langle\Delta^2 x\rangle^{1/2}$ for the monomer at 1, 15, and 60 min were 0.132, 0.512, and 1.024 mm. The values of $\langle\Delta^2 x\rangle^{1/2}$ for the droplet at 1, 15, and 60 min were 0.009, 0.036, and 0.072 mm. Displacement along the temperature gradient has also been considered by multiplying the mean displacement by the temperature gradient (6.66 K/mm). The temperature displacement for the monomer at 1, 15, and 60 min were 0.881, 3.414, and 6.827 K. The temperature displacements for the droplet at 1, 15, and 60 min were 0.062, 0.241, and 0.483 K. As can be seen, the mAb monomer shows considerable diffusion during the experiment, while the droplets are more localized. Since droplets form within 1 minute and ATPS formation is completed in about 15 minutes, only the lower end of these ranges need to be considered. Indeed, a growing droplet would probably experience less than a quarter of a degree temperature change before ATPS is completed.

Further Discussion of the 2-Step Mechanism

The simplified reaction scheme in Eq. 3 is complicated by the fact that ATPS formation should resemble the reaction scheme in FIG. 7A. Indeed, droplet growth should involve a large number of sequential associations, rather than a single pre-equilibrium step. Droplets might contain a numbers of proteins, n, ranging from a few to many millions. If the rate constant of monomer association, $k_n$, is assumed to be diffusion-limited, then it should not depend on the size of the droplet. On the other hand, the rate constant of monomer dissociation, $k_{-n}$, should vary with droplet size due to surface curvature effects. The value of $k_{-n}$ is expected to be enhanced for oligomers and small droplets, where the droplet surface is more curved and less protein-protein interactions have to be broken to dissociate a monomer into the bulk solution. For large droplets, however, $k_{-n}$ is expected to approach a limiting value as the local curvature of the droplet surface becomes flat. The values of $k_n$ and $k_{-n}$ are expected to be size-independent for the larger droplets that are relevant for the temperature gradient measurements. As such, the use of single parameters is advocated to describe the rate constants of the forward, $k_1$, and reverse steps, $k_{-1}$, of late-stage growth.

A more detailed reaction equation for ATPS formation and a conversion of intensity to droplet number or size would be necessary to quantitatively account for these complications. Nevertheless, the simplified model provided in Eq. 3 offers a qualitative explanation for the effects of temperature on the apparent rate constant of ATPS formation determined from the fits to the KWW model.

Temperature Dependence of the KWW Parameters

Figure 9A:
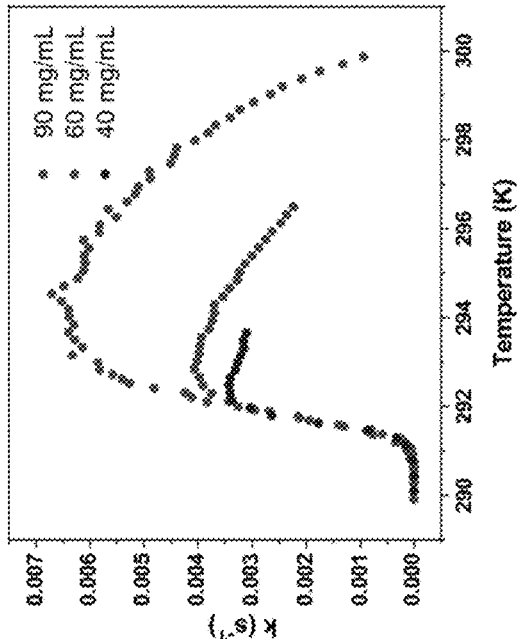
FIG. 9A through FIG. 9D depict summaries of (FIG. 9A) the KWW cooperativity exponents and (FIG. 9B) the rate constants as a function of temperature for 3 mAb concentrations in 20 mg/mL PEG-3350.
Figure 9B:
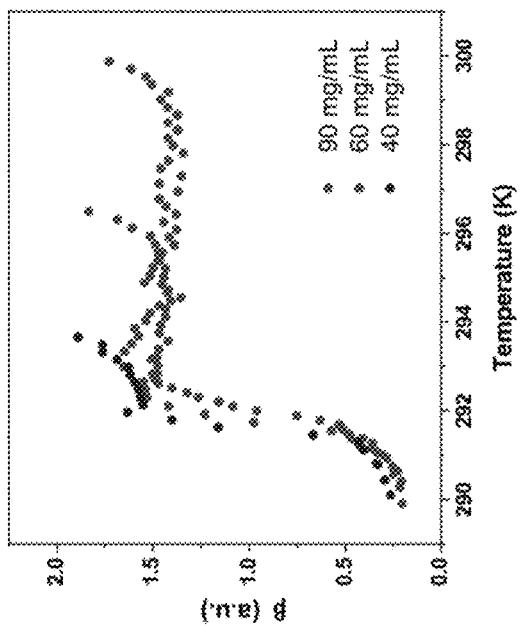

The cooperativity exponents, $\beta$, and apparent rate constants, k, determined for the 90, 60, and 40 mg/mL mAb solutions with 20 mg/mL PEG-3350 are plotted as a function of temperature in FIG. 9A and FIG. 9B, respectively. Moreover, Arrhenius plots constructed from the measurements of k are provided in FIG. 9C. Several generic features of the kinetics data were observed for all mAb concentrations: k became moderately slower near $T_{ph}$, k was enhanced at intermediate temperatures, and k became arrested near $T_{gel}$.

Interestingly, k slows down near $T_{ph}$ most dramatically under the 90 mg/mL conditions (upper dot plot in FIG. 9B). The hindrance of ATPS formation at the highest temperature is consistent with an accelerated rate of dissociation. Indeed, $T_{ph}$ occurs at a lower temperature for the 60 and 40 mg/mL mAb conditions, which prohibits measurements of ATPS formation at higher temperature where dissociation would be accelerated further. The attenuation of k near $T_{ph}$, is mirrored by an increase in $\beta$. For the 90 mg/mL sample, the nearly constant value of $\beta \sim 1.5$ at intermediate temperatures (293-299 K) increased slightly near Tph (T>299 K). The more pronounced cooperativity in ATPS formation may indicate a prolonged lifetime of droplets due to enhanced dissociation. The rate of ATPS formation was faster at higher mAb concentrations for all temperatures that did not gel (plotted data in FIG. 9B above T~292 K). At lower mAb concentrations, the time required for droplet growth should be longer, thereby prolonging ATPS formation.

The natural log of the time constant for ATPS formation, $\ln(\tau)$, obtained from the negative of $\ln(k)$, represents a characteristic time scale for processes that contribute to ATPS formation. These time constants were found to lengthen dramatically as the temperature was lowered into the gel state for all mAb concentrations. The time constants are plotted on a natural log scale for the 3 protein concentrations in FIG. 9D. It should be noted that the range of temperatures used in the VFT analysis were characterized by $\beta<1$. The fitted parameters of gelation determined from fitting to the VFT model are provided in FIG. 12. It would be informative to compare the fragility index (D) of the gels formed in mAb solutions to other soft colloidal systems. However, measurements of the fragility index for colloids are commonly based on concentration-dependent particle dynamics, rather than the temperature dependence of ATPS formation kinetics employed in this work (Mattsson J et al. Nature. 2009 November; 462(7269):83; Van Der Scheer P et al. ACS nano. 2017 Jul. 3; 11(7):6755-63). It should be noted that the values of $\beta$ for the 40 mg/mL sample lack a region of intermediate temperatures where $\beta$ is constant. This provides an additional indication that gelation occurs in the metastable region of the phase diagram at lower mAb concentrations.

Figure 9C:
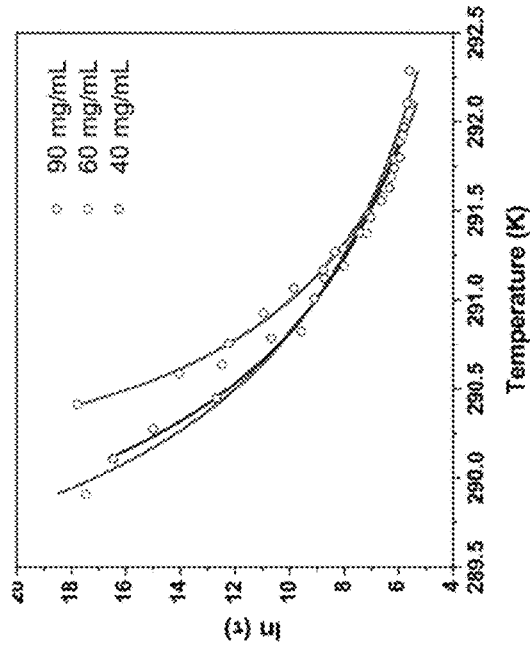
Figure 9D:
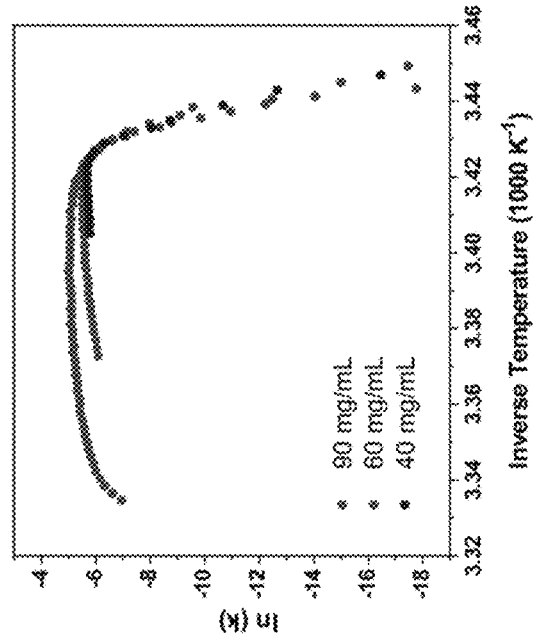
Figure 10B:
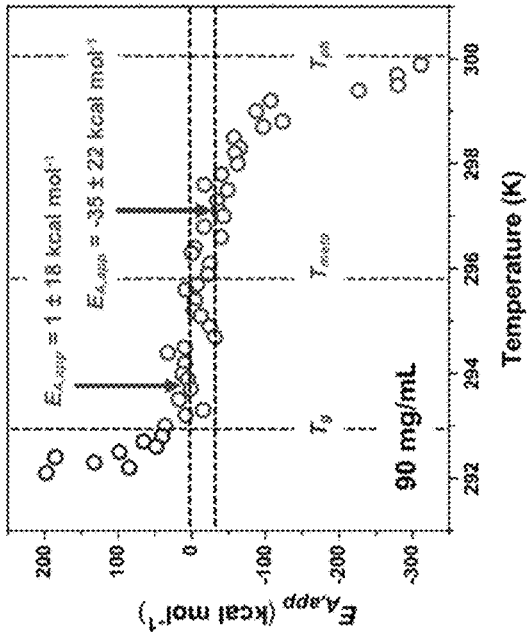
FIG. 10A through FIG. 10D depict apparent activation energies for ATPS formation, $E_{A,app}$, obtained from the Arrhenius plot in FIG. 9C. The values of $E_{A,app}$ are plotted a function of temperature for 90 (circles), 60 (squares), and 40 mg/mL mAb concentration (triangles) in (FIG. 10A). The 2 dashed horizontal black lines in (FIG. 10A) are guides to the eye and represent average values of $E_{A,app}$ determined in the spinodal (1 kcal $mol^{-1}$) and metastable (−35 kcal $mol^{-1}$) regions of the 90 and 60 mg/mL mAb samples. The $E_{A,app}$ values for the (FIG. 10B) 90, (FIG. 10C) 60, and (FIG. 10D) 40 mg/mL mAb concentrations are plotted separately for clarity. In (FIG. 10B through FIG. 10D), the data are divided into the metastable (between $T_{meta}$ and $T_{ph}$), spinodal (between $T_g$ and $T_{meta}$), and gel (left of $T_g$) regions, which are demarcated by dashed vertical colored lines at $T_{ph}$, $T_{meta}$, and $T_{gel}$. The dashed horizontal black lines in (FIG. 10B through FIG. 10D) represent the average values of $E_{A,app}$ determined for the spinodal (middle) and metastable (right) regions. For the 90 mg/mL mAb sample in (FIG. 10B), the $E_{A,app}$ for the metastable region was determined only from the data between 295.9-298.3 K.
Figure 10D:
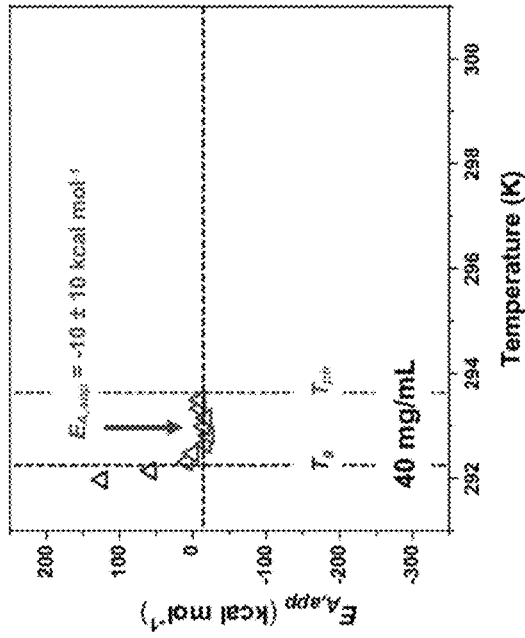
Figure 10A:
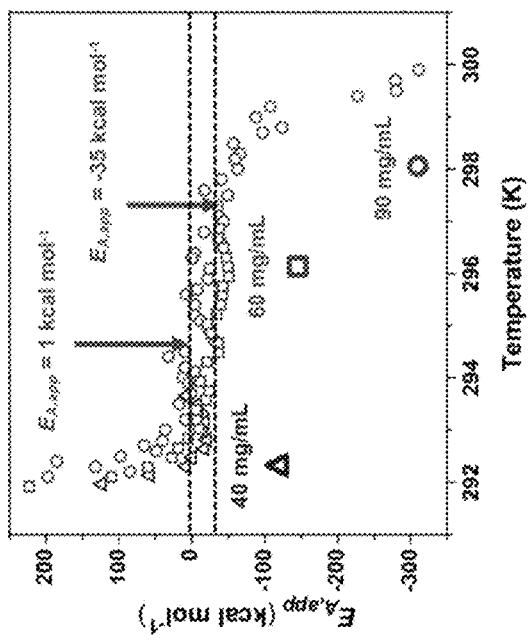
Figure 10C:
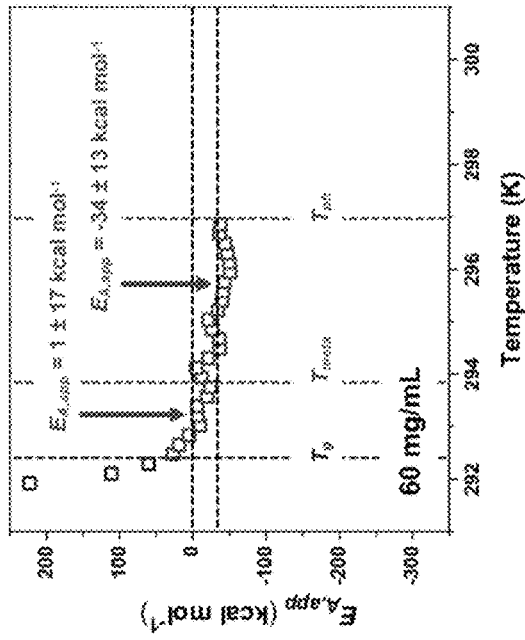

The apparent activation energies for ATPS formation, $E_{A,app}$, were obtained from the Arrhenius plots in FIG. 9C. The values for $E_{A,app}$ were calculated by multiplying the first derivative of the Arrhenius plot by the negative of the ideal gas constant. The results are plotted as a function of temperature in FIG. 10A through FIG. 10D. As can be seen in FIG. 10A, $E_{A,app}$ shows similar temperature dependence for all 3 mAb concentrations. At temperatures below 293 K, ATPS formation is hindered by a large positive $E_{A,app}$ due to gelation. On the other hand, at intermediate temperatures, $E_{A,app}$ shows an average close to 1 kcal mol$^{-1}$. With increasing temperature, $E_{A,app}$ clearly becomes negative with an average of $\sim -35$ kcal mol$^{-1}$. For clarity, the data are also plotted separately for each mAb concentration in FIG. 10B through FIG. 10D. For each concentration, the average and standard deviation of the $E_{A,app}$ values are provided for the spinodal (middle) and metastable (right) regions.

Connection Between the Thermodynamics and Kinetics of Phase Separation in the Metastable Region Droplet growth is expected to dominate the kinetics of ATPS formation in the metastable region, where a negative $E_{A,app}$ was measured. Below, 2 possibilities are considered for the observed negative $E_{A,app}$.

Case 1 is that the free energy of the thermodynamic states in FIG. 7B changes with temperature. Classical nucleation theory predicts that the kinetics in the metastable region are controlled by Case 1. In particular, the theory predicts that the steady-state growth rate increases linearly with supersaturation, while the rate of nucleation should increase exponentially (Vekilov P G. Journal of Physics: Condensed Matter. 2012 Apr. 11; 24(19):193101; Berthoud A. Journal de Chimie Physique. 1912; 10:624-35; Valeton J J. Zeitschrift für Kristallographie-Crystalline Materials. 1924 Nov. 1; 60 (1-6): 1-38). The supersaturation at each temperature was estimated from the phase diagram to test the validity of Case 1 and also to test the idea that the apparent rate constants of ATPS formation, k, report on droplet growth, rather than nucleation. Supersaturation, s, was estimated using Eq. 8, $$s = \ln\left(\frac{c_0}{c_{poor}}\right) \qquad \text{Eq. 8}$$

where $C_0$ is the initial protein concentration, and $C_{poor}$ is the equilibrium concentration of the protein-poor phase after a temperature quench. The values for $C_{poor}$ were obtained at each temperature by fitting the binodal phase diagram ($T_{ph}$ vs C) to Eq. 9, where $T_{crit}$ and $C_{crit}$ are the critical temperature and concentration, while A and $\beta$ are empirical parameters that determine the shape of the phase boundary (Petsev D N et al. The Journal of Physical Chemistry B. 2003 Apr. 24; 107(16):3921-6; Heller P. Reports on Progress in Physics. 1967 July; 30(2):731; Broide M L et al. Proceedings of the National Academy of Sciences. 1991 Jul. 1; 88(13): 5660-4; Muschol M et al. The Journal of chemical physics. 1997 Aug. 8; 107(6):1953-62). It should be emphasized that $T_{crit}$ and $C_{crit}$ are nominal values as the measurements were only made up to 100 mg/mL and Eq. 9 assumes that the binodal curve is symmetric despite the ternary nature of the system, which has been shown to influence the shape of colloidal phase diagrams (Annunziata O et al. Proceedings of the National Academy of Sciences. 2002 Oct. 29; 99(22): 14165-70; Wang Y et al. The Journal of chemical physics. 2013 Sep. 28; 139(12):09B604_1; Liu C et al. Proceedings of the National Academy of Sciences. 1996 Jan. 9; 93(1): 377-82; Wang Y et al. Proceedings of the National Academy of Sciences. 2010 Jul. 27; 107(30):13282-7; Petsev D N et al. The Journal of Physical Chemistry B. 2003 Apr. 24; 107(16):3921-6; Broide M L et al. Proceedings of the National Academy of Sciences. 1991 Jul. 1; 88(13):5660-4). Nevertheless, the data below 100 mg/mL was well-modeled by Eq. 9.

$$T_{ph} = T_{crit}\left[1 - A\left(\frac{C_{crit} - C}{C_{crit}}\right)^{1/\beta}\right] \quad \text{Eq. 9}$$

Figure 11A:
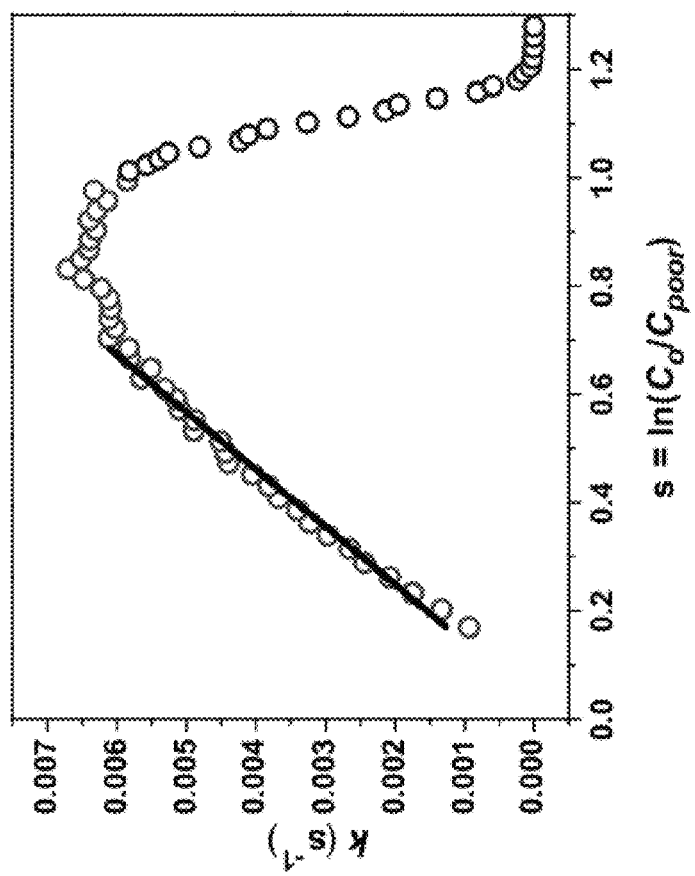
FIG. 11A and FIG. 11B depict the relationship between supersaturation and the kinetics of ATPS formation.
Figure 11B:
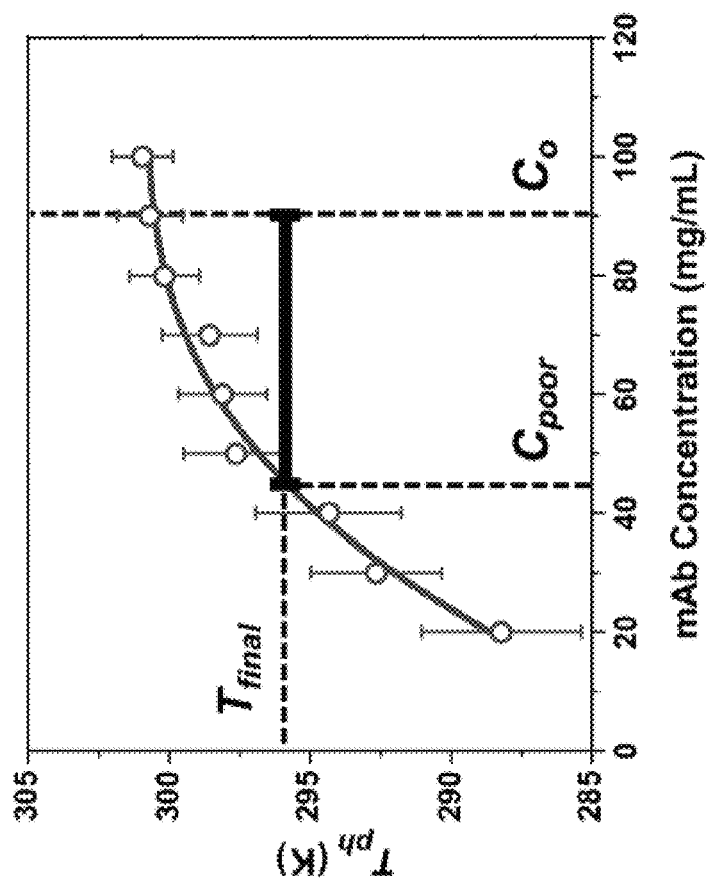

This analysis for estimating the supersaturation is depicted schematically in FIG. 11A and FIG. 11B. Remarkably, the dependence of k on s, provided in FIG. 11B, is approximately linear in the metastable region (data points overlaid with a black line in FIG. 11B), until reaching a maximum value at $T_{meta}$. At even higher values of s (lower temperature) the rate constant became arrested due to gelation (descending data points). As described elsewhere herein, this analysis demonstrates that the negative value of $E_{A,app}$ is related to the enhanced thermodynamic driving force for demixing as the temperature of the solution is decreased below $T_{ph}$.

In other words, the value of $E_{A,app}$ is related to the change in free energy with respect to temperature. Supersaturation should be related to the change in free energy upon forming protein-protein interactions (e.g. adding a protein to a droplet). The concept of supersaturation is included in FIG. 19A and FIG. 19B by the difference in free energy between the initial state (monomer and droplet) and the intermediate state (droplet). Based on FIG. 11A and FIG. 11B, the change in free energy should be larger at lower temperatures. As a consequence, it is expected that the activation energy required for dissociation to increase and droplet growth to accelerate.

One could imagine a second case involving thermodynamic states that are fixed. Under Case 2, the reaction coordinate is again a multi-step process involving a reversible first step and an irreversible second step. The negative $E_{A,app}$ would imply that the reverse reaction in the first step has a large activation energy. As the temperature is lowered, the rate of the reverse reaction decreases sharply and the reversibility of the first step (i.e. droplet growth) is impeded, leading to an accumulation of intermediate droplets. As such, the observed rate of ATPS formation increases with cooling, until eventually it becomes limited by the second step of droplet coalescence in the spinodal region.

Figure 19A:
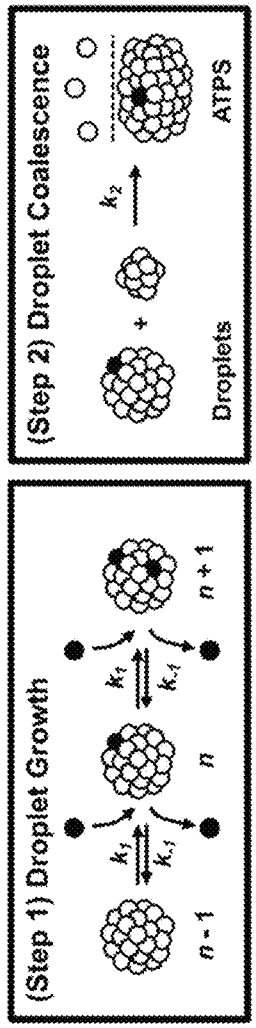
FIG. 19A and FIG. 19B depict the two-step mechanism for ATPS formation.
Figure 19B:
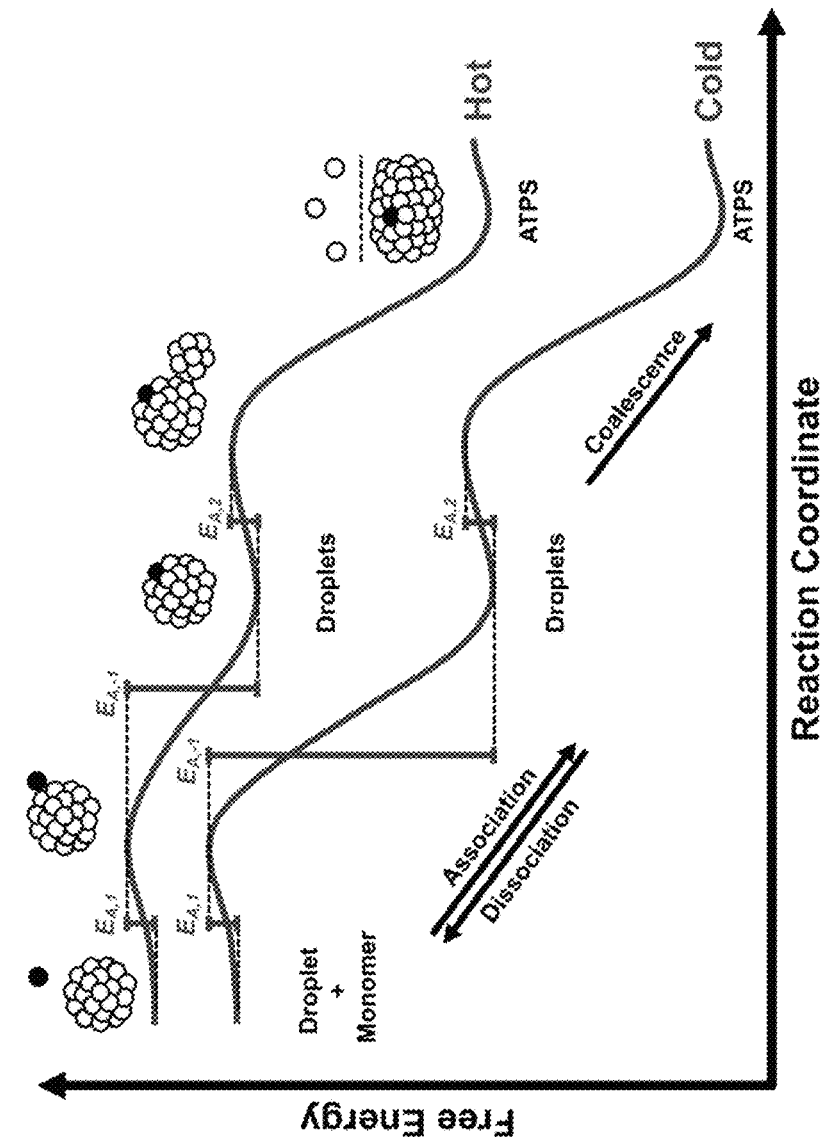

The negative $E_{A,app}$ in the metastable region (black line over the data in the metastable region in FIG. 16B) would support the idea that LLPS is limited by a pre-equilibrium step in a multistep reaction (FIG. 19A, FIG. 19B). In fact, when k is collectively influenced by $k_1$, $k_{-1}$, and $k_2$, there should be 3 activation energies to take into account: 2 corresponding to the reversible steps of the pre-equilibrium ($E_{A,1}$ and $E_{A,-1}$ in FIG. 19B) and 1 for droplet coalescence in the forward direction ($E_{A,2}$ in FIG. 19B). The relative magnitudes of the forward and reverse activation energies determine whether the overall apparent activation energy is positive or negative ($E_{A,app} = E_{A,1} + E_{A,2} - E_{A,-1}$). To estimate the value of $E_{A,-1}$ for the Case 2 scenario, it was assumed that the association reaction was essentially diffusion-limited. Under diffusion-limited conditions, $k_1$ should exhibit a weak temperature dependence, proportional to the diffusion coefficient (Von Smoluchowski M. Z. Phys. 1916; 17:557-85; Van den Tempel M. Recueil des Travaux Chimiques des Pays-Bas. 1953; 72(5):433-41). Based on the small barrier for coalescence ($E_{A,2}=1$ kcal mol$^{-1}$) measured in the spinodal region and the assumption of diffusion-limited association ($E^{A,1} \sim 0$ kcal mol$^{-1}$), the apparent activation energy measured in the metastable region provides an approximate barrier for the dissociation of protein monomers from protein-rich droplets ($E_{A,-1} \sim 35$ kcal mol$^{-1}$). This is in agreement with the apparent activation energy for dissociating protein-protein complexes by electrospray mass spectrometry (Yefremova Y et al. Analytical and bioanalytical chemistry. 2017 Nov. 1; 409(28):6549-58).

Although Case 2 might appear to offer a plausible interpretation for the negative $E_{A,app}$ in the metastable region, the supersaturation analysis presented in FIG. 11A and FIG. 11B suggests the thermodynamic states do change with temperature. Thus, the temperature-dependent kinetics of ATPS formation are more accurately described by Case 1.

The results are now described.

Measuring Phase Separation Along a Temperature Gradient

Figure 13B:
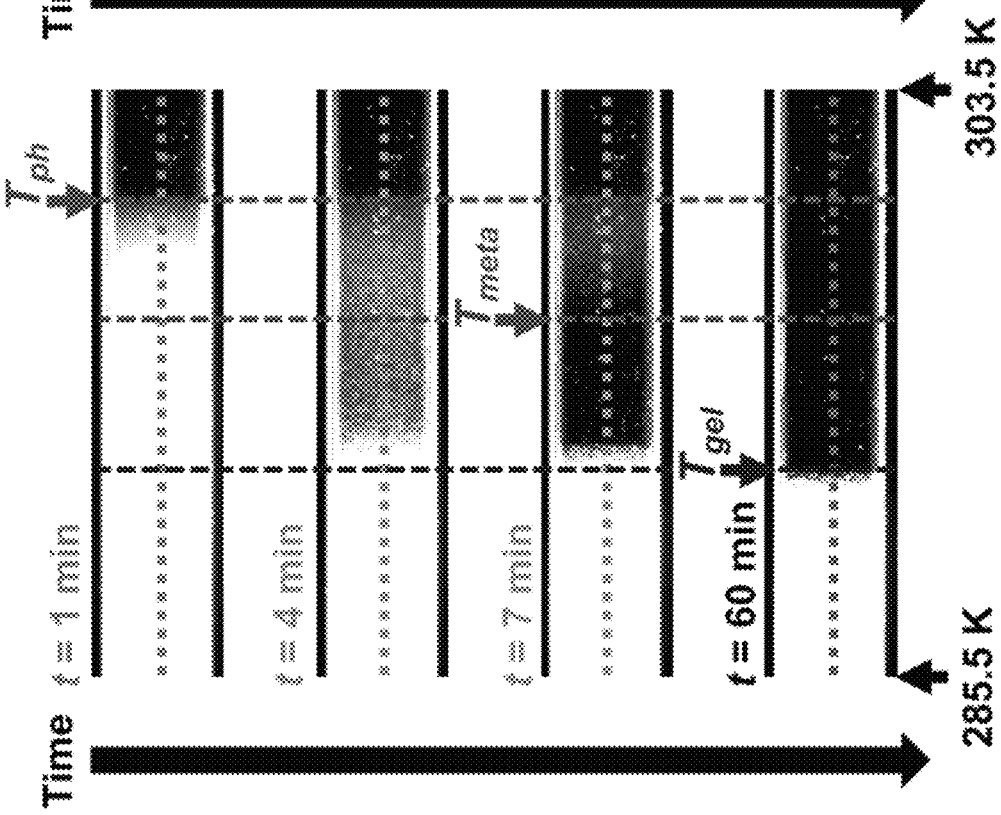
FIG. 13A through FIG. 13C depict the results of ATPS formation of a mAb solution on the temperature gradient device.
Figure 13A:
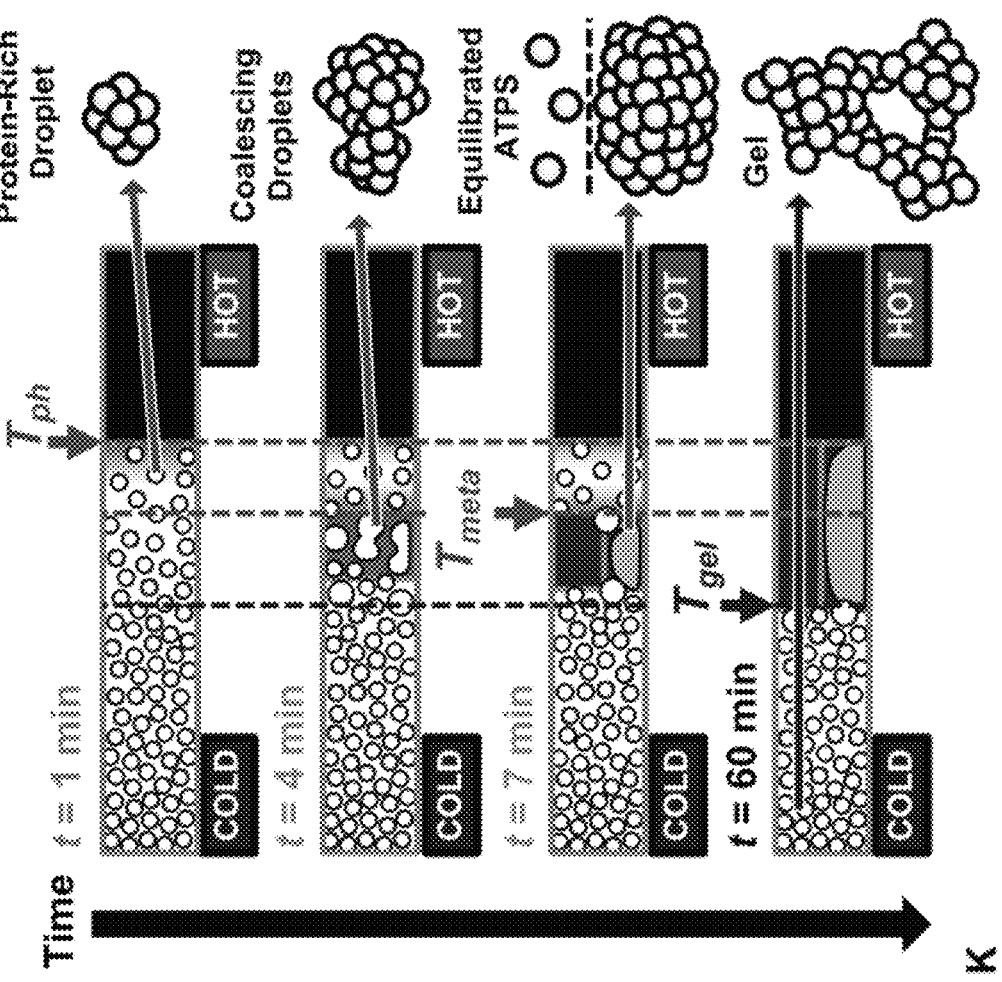
Figure 14:
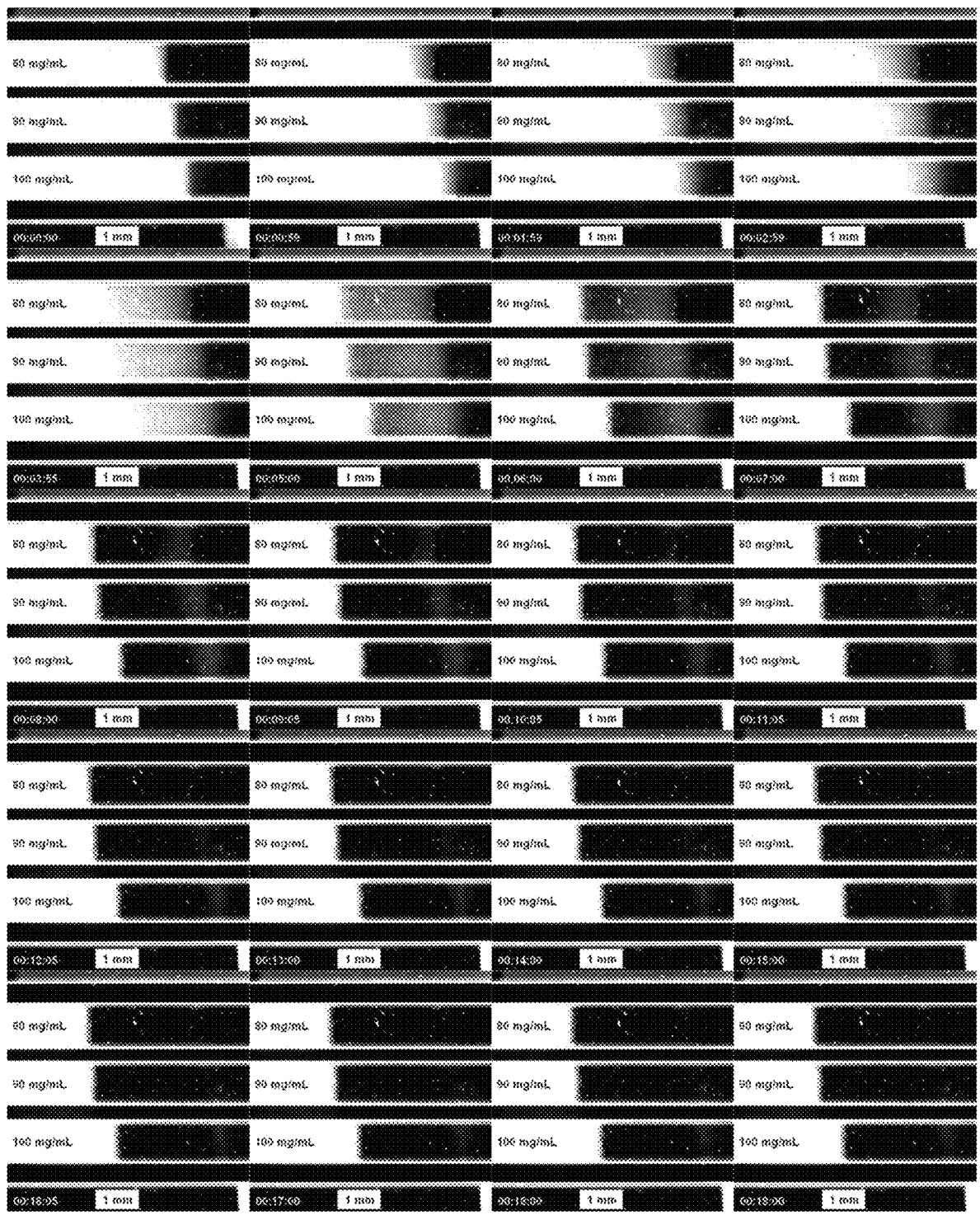
FIG. 14 is a time-lapse showing LLPS and ATPS formation of mAb solutions on the temperature gradient device. The frame captures display the data for 80, 90, and 100 mg/mL mAb solutions each containing 20 mg/mL PEG-3350, 15.5 mM NaCl, and 22.7 mM phosphate buffer at solution pH of 6.8. The mAb-containing capillaries are labeled with their concentration on the left-hand side. Additional capillaries, containing 10 mg/mL PNIPAM, are included for calibration of the temperature gradient. The PNIPAM solution in the top-most capillary contains 1.5 M NaCl (LCST=13.2° C.), while the bottom-most capillary contains 0.1 M NaCl (LCST=28.9° C.). The time-lapse provides data for a total time of 20 minutes and 40 seconds, where the dark field images were acquired every 5 seconds. A time stamp is provided at the bottom-left corner of the frame captures.

The phase behavior was investigated in a 90 mg/mL mAb solution containing 20 mg/mL PEG-3350, 15.5 mM NaCl, and 22.7 mM phosphate buffer at pH 6.8, which is below the antibody's isoelectric point of 8.2. The experiment was initiated by introducing a clear, preheated sample (T=318 K) onto a linear temperature gradient at a time designated as t=0 min. FIG. 13A shows a set of darkfield images obtained at successive time points during the experiment. A schematic diagram from a side-on perspective of the rectangular sample capillary tube is provided in FIG. 13B to help illustrate the phase separation at each time point. Sequential frame captures of a recording of the entire phase separation process is provided in FIG. 14.

Figure 13C:
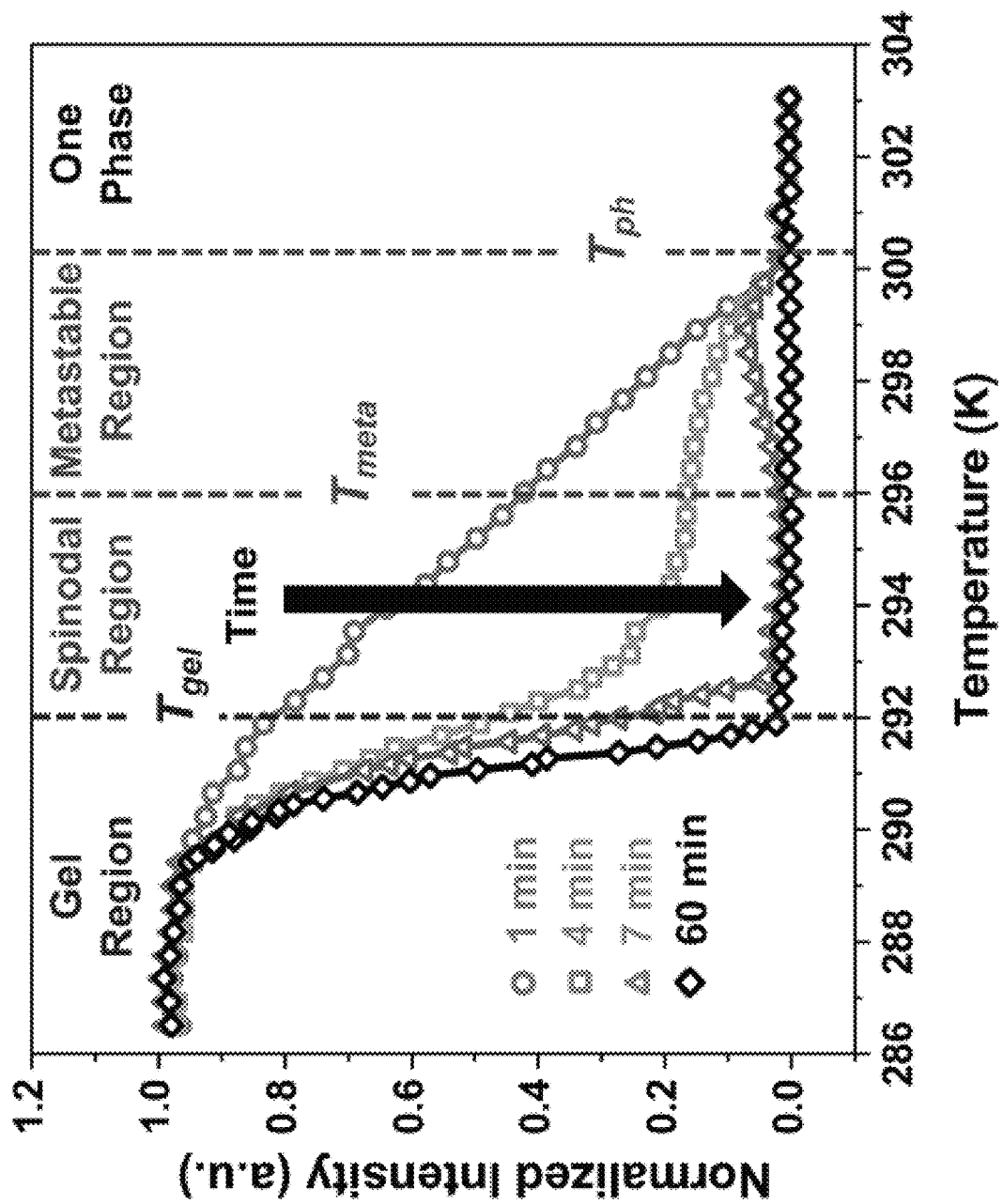

The cooler side of the sample became cloudy almost immediately as protein-rich droplets formed and scattered the light. The phase separation temperature, $T_{ph}$, was determined at t=1 min from the onset of the scattering intensity near 300 K, marked by the red arrows in FIG. 13A and FIG. 13B. A line scan of the scattering intensity versus temperature was measured from the dashed horizontal line in the t=1 min image and plotted as gold data points in FIG. 13C. As can be seen in the orange line scan measured after 4 min, the scattering intensity decreased between 292 and 300 K due to droplet growth and coalescence. The pink line scan at t=7 min showed when the intensity had just reached a minimum and stopped changing between 293 and 296 K because the droplets settled to the bottom of the capillary tube to form a transparent ATPS. The scattering intensity between 296 and 300 K, however, was still decreasing due to slow droplet growth near $T_{ph}$. Using this time point, the metastable temperature could be defined, $T_{meta}$, indicated by the vertical green line in FIG. 13C. The value of $T_{meta}$ divided the warmer, metastable region where ATPS formation was still occurring from the colder, spinodal region where it had just finished. These interpretations were confirmed for the decrease in light scattering by imaging ATPS formation in a larger sample, which is discussed further in FIG. 3A through FIG. 3I.

By t=60 min, the separation yielded an equilibrated ATPS above a gelation temperature, $T_{gel}$. The equilibrated ATPS was optically homogeneous and did not scatter light. The line scans in FIG. 13C reveal that $T_{gel}$ continued to shift subtly and ever more slowly toward colder temperature over time. The time dependent shift of $T_{gel}$ was consistent with a pseudo-phase transition, like a glass transition, which was kinetic rather than thermodynamic (Stillinger F H. Science. 1995 Mar. 31; 267(5206):1935-9). Nonetheless, by t=60 min, $T_{gel}$ effectively stabilized on the timescale of the measurements and could be quantified by the onset of scattering relative to the completed ATPS, designated in FIG. 13C by the vertical dashed line labeled "$T_{gel}$." The procedures for determining the precise transition temperatures are shown in FIG. 4A through FIG. 4C; the procedures for graphing the colloidal phase diagram as a function of mAb concentration are shown in FIG. 5.

Modeling the Kinetics of ATPS Formation

Figure 15A:
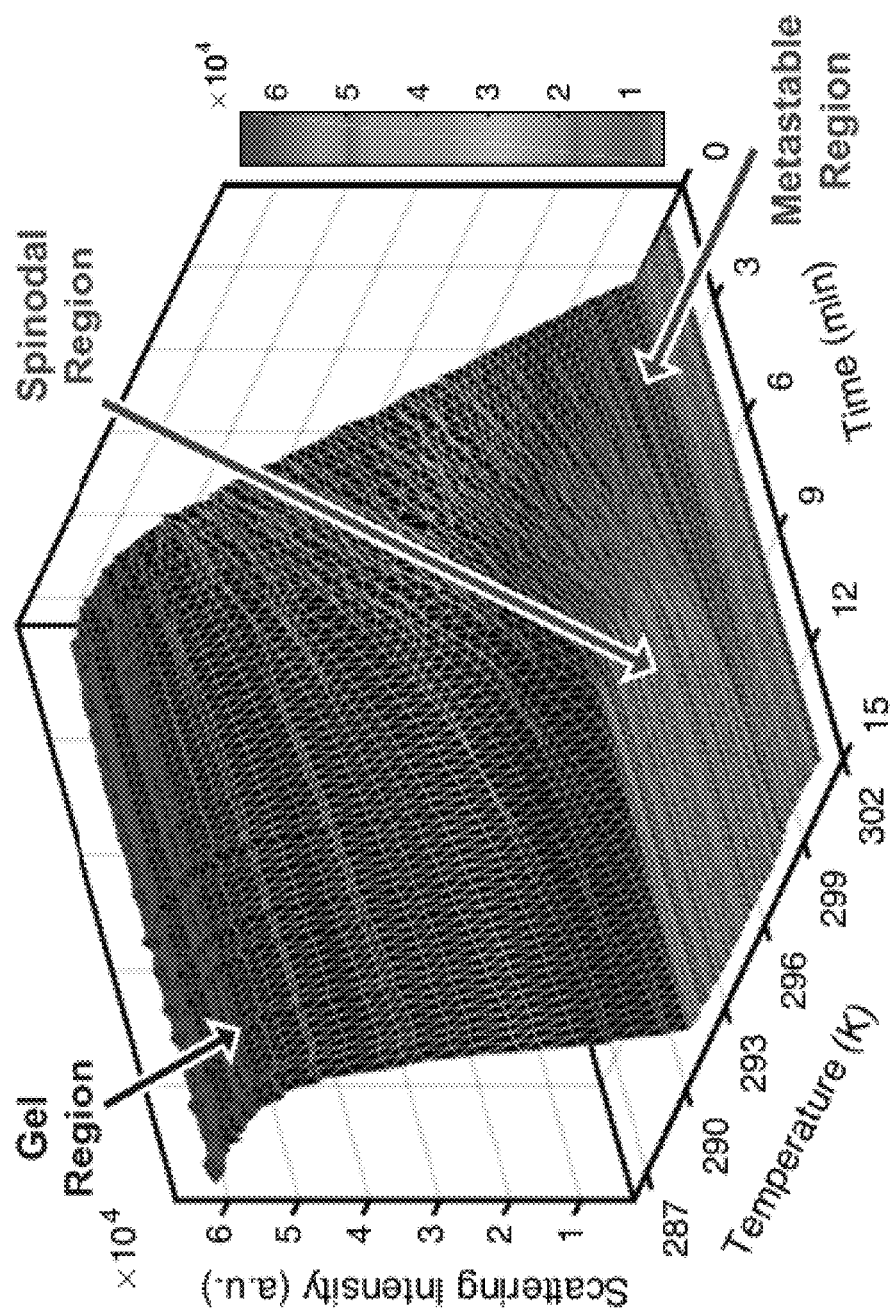
FIG. 15A and FIG. 15B depict the results of kinetic analysis of the light scattering data obtained in FIG. 13A through FIG. 13C.

The kinetics of ATPS formation was analyzed as a function of temperature to probe the mechanism of the late stages of LLPS. FIG. 15A displays the scattering intensity as a function of both temperature and time from the data shown in FIG. 13A through FIG. 13C. In the metastable region, slower ATPS formation gave rise to a low topographical ridge (metastable region in FIG. 15A), while the most rapid separation in the spinodal region produced a valley (spinodal region in FIG. 15A). Little or no scattering reduction was observed in the gel region at colder temperatures (gel region in FIG. 15A). A characteristic scattering decay from each of the 3 kinetic regions is plotted in FIG. 15B. The procedure for measuring the scattering intensities is described in FIG. 6A through FIG. 7G. The normalized scattering intensity, I, for all temperatures was fit to the Kohlrausch-Williams-Watts (KWW) function provided in Eq. 10 (Kohlrausch R. Annalen der Physik. 1854; 167(2):179-214; Williams G et al. Transactions of the Faraday society. 1970; 66:80-5): The KWW fits to the data points are shown as solid curves in FIG. 15B.

$$I = \exp(-(kt)^\beta)$$ Eq. 10

The KWW equation can be employed to empirically model the separation of a cloudy droplet dispersion into a clear, equilibrated ATPS over time, t, by using a cooperativity exponent, $\beta$, and an apparent ATPS formation rate constant, k. The fitted values of $\beta$ are plotted as a function of temperature in FIG. 16A. As can be seen, ATPS formation was cooperative above $T_{gel}$ with $\beta = \sim 1.5$, indicating that the reduction of scattering intensity was faster than a regular exponential decay. ATPS formation for a solution containing a high concentration of droplets should follow a simple exponential decay ($\beta = 1$) if coalescence governs the separation, since the rate limiting step is just the rupture of an interfacial water layer between 2 droplets (Florence A T et al. Journal of Pharmacy and Pharmacology. 1971 April; 23(4):233-51). However, the high density of protein droplets relative to water should cause them to fall to the bottom of the capillary tube via gravitational sedimentation, as depicted in FIG. 13B; therefore, as the droplets grew larger with time, they should have settled ever faster (Parkinson L et al. Journal of colloid and interface science. 2008 Jun. 1; 322(1):168-72). Thus, the observed cooperativity was consistent with ATPS formation governed by droplet coalescence, but accelerated by sedimentation.

The temperature-dependent kinetics of ATPS formation provided further insight into the reaction mechanism. An Arrhenius plot of the fitted k values [ln(k) versus 1,000/T] is provided in FIG. 16B. As can be seen in the metastable region, ATPS formation accelerated as the temperature was lowered below $T_{ph}$. The fit to the Arrhenius law (solid black line over the red data points) revealed a negative apparent activation energy ($E_{A,app} = -35$ kcal mol$^{-1}$), which was inconsistent with the positive $E_{A,app}$ expected for an elementary coalescence reaction. By contrast, ln(k) began to decrease modestly as the temperature was cooled below $T_{meta}$. The spinodal region could also be fit to the Arrhenius model (solid black line over the green data points), providing a slightly positive apparent activation energy ($E_{A,app} = 1$ kcal mol$^{-1}$) that was smaller than the dissociation energy of typical water-water hydrogen bonds (Curtiss L A et al. The Journal of Chemical Physics. 1979 Sep. 15; 71(6):2703-11; Feyereisen M W et al. The Journal of Physical Chemistry. 1996 Feb. 22; 100(8):2993-7). The small, positive value of $E_{A,app}$ in the spinodal region was consistent with the energy required to rupture the aqueous film between 2 droplets and initiate coalescence. Distinct temperature-dependent regions were also observed in the kinetics of ATPS formation for 60 and 40 mg/mL mAb solutions, as shown in FIG. 17. A spinodal region, however, was not present in the 40 mg/mL mAb solution (triangle data points) as can be seen from the lack of a region characterized by a small, positive $E_{A,app}$. A detailed analysis of the effects of mAb concentration and temperature on the scattering decays, fitting parameters for the KWW model, and $E_{A,app}$ values are provided in FIG. 8A through FIG. 10D.

Figure 16A:
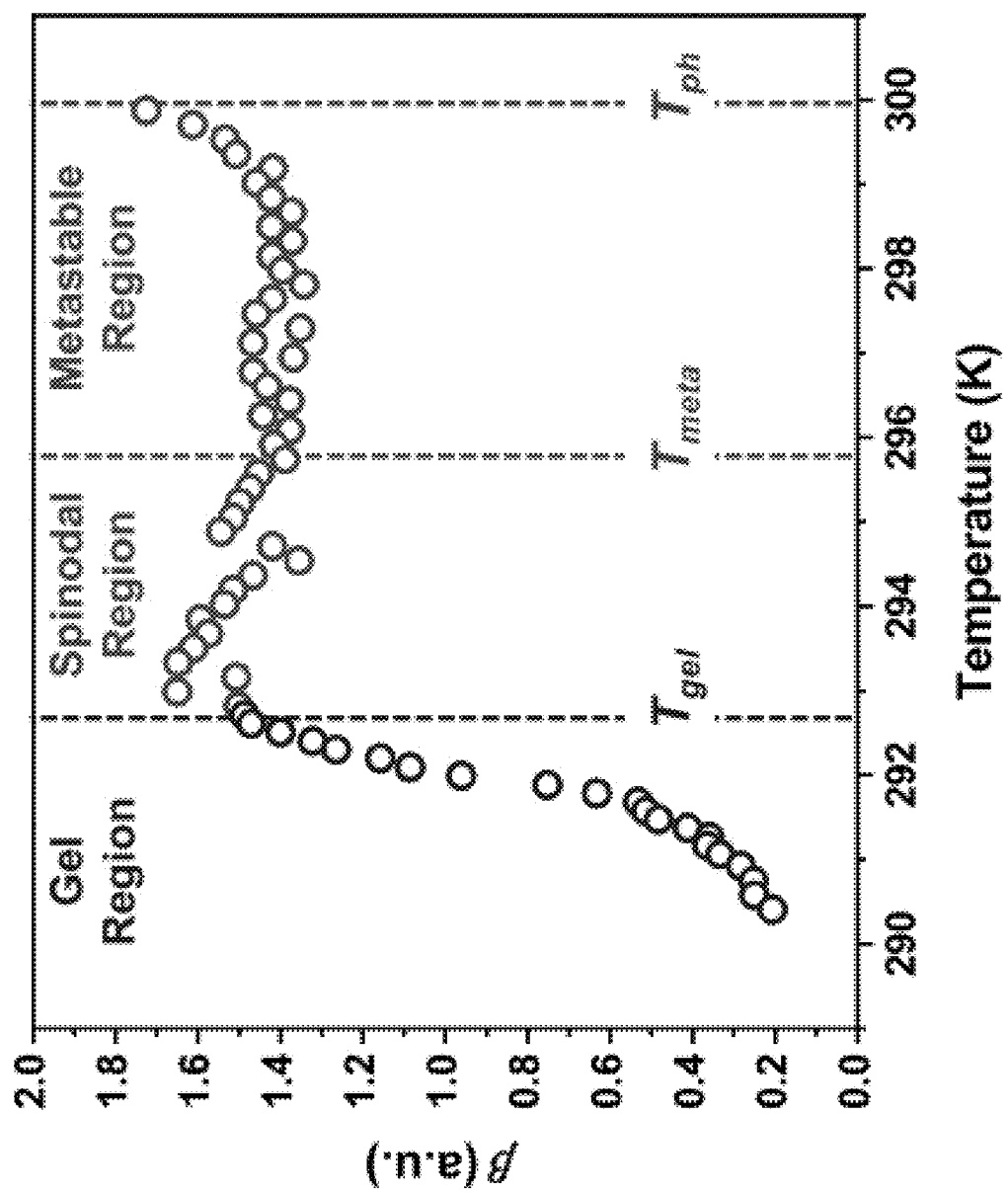
FIG. 16A and FIG. 16B depict the temperature-dependent KWW parameters for the kinetics of ATPS formation in a solution of 90 mg/mL mAb and 20 mg/mL PEG-3350.
Figure 18:
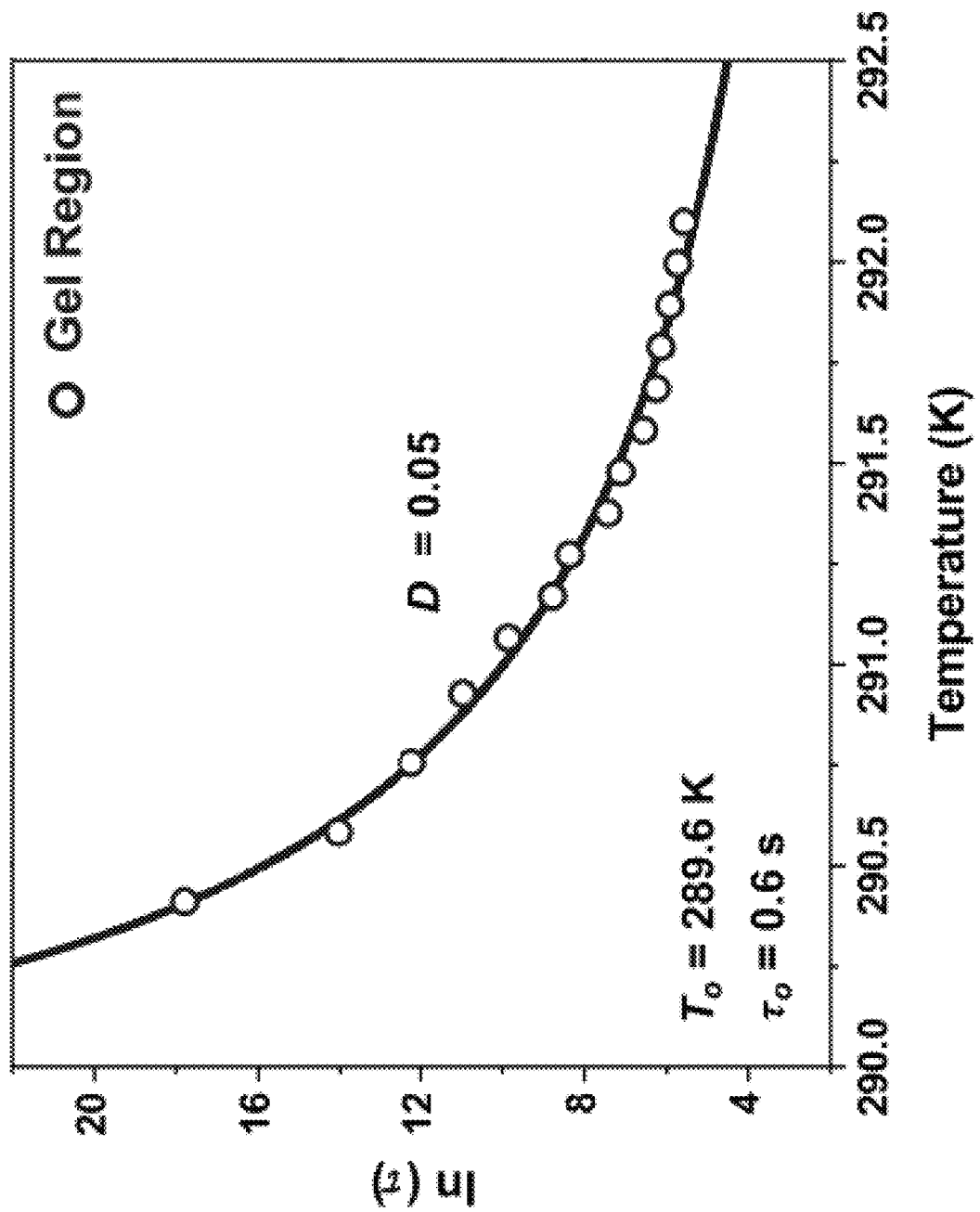
FIG. 18 depicts time constants for ATPS formation as a function of temperature near $T_{gel}$ for a solution of 90 mg/mL mAb and 20 mg/mL PEG-3350. The natural log values of the time constants, ln($\tau$), in the gel region, where $\beta$<1, are plotted as blue data points along with the fit to the VFT model, shown as a solid blue curve.

ATPS formation became anticooperative ($\beta < 1$) upon cooling below 292 K into the gel region, as can be seen in the gel region of FIG. 16A. This cross-over occurred concomitantly with a dramatic reduction in ln(k), as depicted by the gel region data points in FIGS. 4B and 5. As can be seen, ln(k) displayed an asymptotic decrease below $T_{gel}$ that was reminiscent of changes in physical properties due to glass formation (Scherer G W. Journal of the American Ceramic Society. 1992 May; 75(5):1060-2). To relate the abrupt deceleration of ATPS formation to the fragility of the arrested state formed below $T_{gel}$, the kinetics data in the gel region were converted to time constants, $\tau$, by taking the reciprocal of k. The ln($\tau$) values for the 90 mg/mL mAb solution were plotted directly versus temperature in FIG. 18, which could be fit to the Vogel-Fulcher-Tammann (VFT) law provided in Eq. 11 (Scherer G W. Journal of the American Ceramic Society. 1992 May; 75(5):1060-2): The VFT fit to the data points is shown as a solid blue curve in FIG. 18.

$$\ln(\tau) = \ln(\tau_0) + \left(\frac{DT_0}{T - T_0}\right)$$ Eq. 11

Here, the VFT law describes the melting of the kinetically arrested gel state by an ideal gelation temperature, $T_0$, an intrinsic ATPS formation time constant, $\tau_0$, and a fragility index, D. The gel state formed below an ideal gelation temperature ($T_0 = 289.6$ K) where ln($\tau$) approached infinity. As the temperature was increased toward the spinodal region, the ATPS formation time constants decreased rapidly and approached an intrinsic time constant ($\tau_0 = 0.6$ s) as T increased toward infinity. This extrapolated value for $\tau_0$ provides an estimation of the timescale for collective protein reorganization during droplet coalescence and is on the order of the coalescence time period measured for oil droplet dispersions in water (Krebs T et al. Lab on a Chip. 2012; 12(6):1060-70). The fragility index (D=0.05) quantifies the weak resistance of the gel structure to accelerated phase separation as the temperature was increased above $T_0$. Indeed, the measured fragility index was astoundingly weak in comparison with strong glass-forming liquids like SiO2 (D~153) (Angell C A et al. Journal of Physics and Chemistry of Solids. 1988 Jan. 1; 49(8):863-71; Angell C A et al. Journal of Non-Crystalline Solids. 1991 Jun. 11; 131:13-31; Nascimento M L et al. Journal of Physics and Chemistry of Solids. 2007 Jan. 1; 68(1):104-10).

The thermodynamics of colloidal phase diagrams has been measured for numerous systems that undergo LLPS and gelation (Ahamed T et al. Biophysical journal. 2007 Jul. 15; 93(2):610-9; Petsev D N et al. The Journal of Physical Chemistry B. 2003 Apr. 24; 107(16):3921-6; Thomson J A et al. Proceedings of the National Academy of Sciences. 1987 Oct. 1; 84(20):7079-83; Shah M et al. The Journal of chemical physics. 2004 Oct. 15; 121(15):7505-12; Pan W et al. The Journal of Physical Chemistry B. 2010 Apr. 27; 114(22):7620-30; Cardinaux F et al. Physical review letters.

2007 Sep. 13; 99(11):118301; Gibaud T et al. Journal of Physics: Condensed Matter. 2009 Jul. 20; 21(32):322201; Lu P J et al. Nature. 2008 May; 453(7194):499). By measuring ATPS formation as a function of time along a temperature gradient, the metastable, spinodal, and gel regions of the phase diagram were directly visualized for mAb solutions containing PEG. This was possible because the temperature gradient measurements allowed the kinetics of ATPS formation to be extracted in parallel over a range of temperatures. The kinetics measurements suggest a 2-step mechanism for ATPS formation that is depicted schematically in FIG. 19A. After droplet nucleation has taken place, ATPS formation should continue via the first step of droplet growth, which involves the sequential, reversible addition of monomers into growing droplets (FIG. 19A, Step 1). Subsequently, ATPS formation is completed by the second step of irreversible droplet coalescence (FIG. 19A, Step 2). The rates of these 2 steps should have opposite temperature dependencies, which leads to a crossover in the rate-limiting step at $T_{meta}$. The distinct apparent activation energies measured in the metastable and spinodal regions (FIG. 16B) can be related to the effects of temperature on the elementary activation energies of the 2-step mechanism. This idea is depicted by the 2 reaction coordinate diagrams in FIG. 19B that represent different temperatures below $T_{ph}$.

Figure 15B:
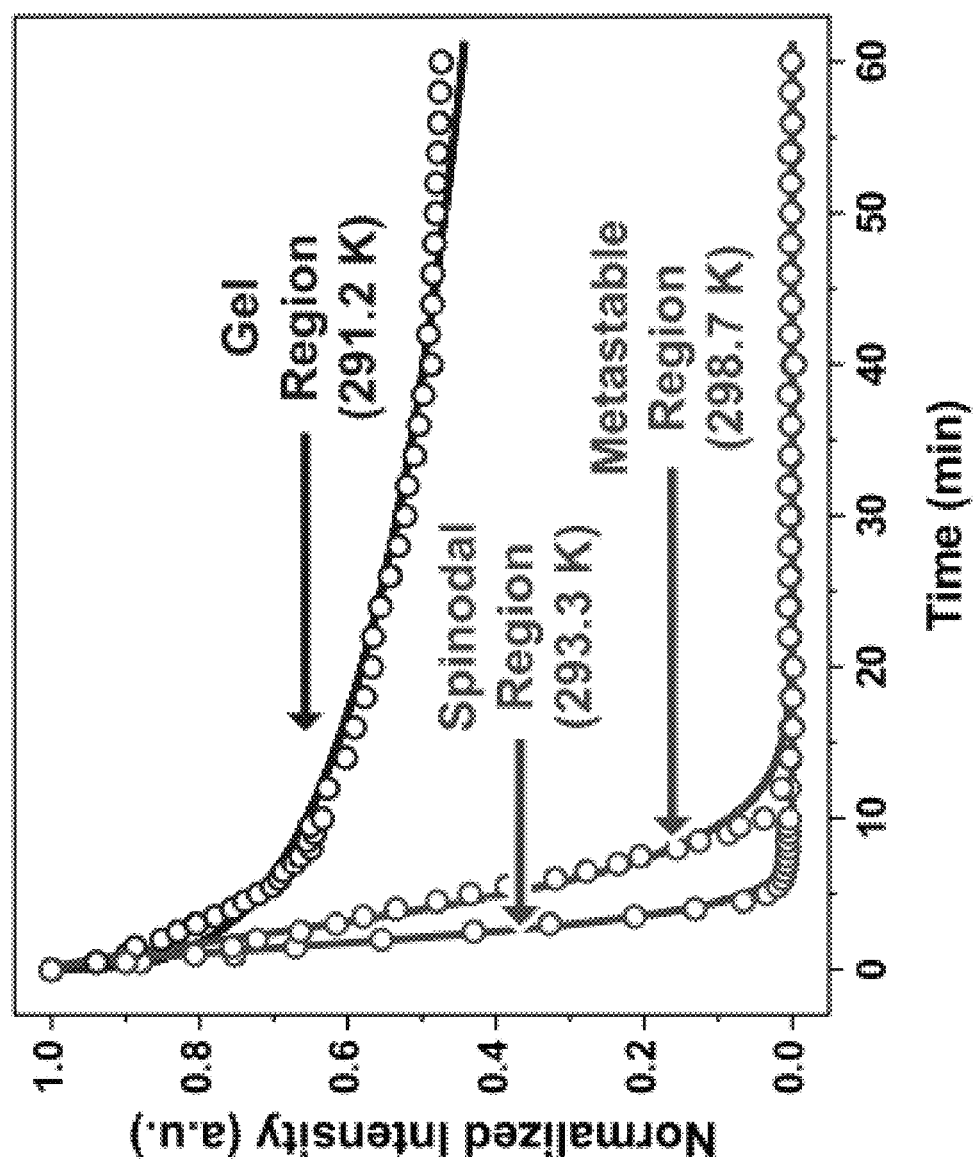

When a protein solution is cooled below $T_{ph}$, it rapidly becomes turbid as protein-rich droplets form within seconds (Shah M et al. The Journal of chemical physics. 2004 Oct. 15; 121(15):7505-12). The cloudy droplet suspension slowly becomes transparent via ATPS formation on the order of minutes (Zhang Y et al. Journal of the American Chemical Society. 2003 Dec. 17; 125(50):15630-5; Zhang Y et al. Biomacromolecules. 2006 Jul. 10; 7(7):2192-9). Once a clear, macroscopic protein-rich phase forms, the system has reached equilibrium. The process of ATPS formation (depicted in FIG. 19A) is reminiscent of a simple consecutive reaction with a reversible first step and an irreversible second step, as described by Eq. 12:

$$A \underset{k_{-1}}{\overset{k_1}{\rightleftharpoons}} B \overset{k_2}{\rightarrow} C \qquad \text{Eq. 12}$$

where A represents the initial droplet suspension. Over time, these droplets grow by reversible monomer addition into larger droplets, denoted by B. The larger droplets irreversibly coalesce to form an ATPS, represented by C. As growth and coalescence occur, the intensity of the light scattered by the initial droplet suspension decreases. The present analysis shows that the kinetics of ATPS formation in mAb solutions is well described by cooperative exponential decays with an apparent rate constant, k (FIG. 15B). Based on Eq. 12, however, k should be influenced by the elementary rate constants for monomer addition, $k_1$, and dissociation, $k_{-1}$, as well as the elementary rate constant of coalescence, $k_2$. The exact relationship of k to $k_1$, $k_{-1}$, and $k_2$ is complex in these experiments because Eq. 12 represents a simplification of the proposed mechanism illustrated in FIG. 19A. Nevertheless, the 2-step mechanism provides a useful simplification for understanding the effects of temperature on the apparent value of k.

The fact that ATPS formation slows down upon cooling below $T_{meta}$ (i.e., the spinodal region data points decrease very slightly from left to right in FIG. 16B) suggests that spinodal decomposition is rate limited by the second step of coalescence (FIG. 19A, Step 2). Indeed, the rate constant for coalescence has previously been shown to be proportional to temperature (Zhang Y et al. Journal of the American Chemical Society. 2003 Dec. 17; 125(50):15630-5; Zhang Y et al. Biomacromolecules. 2006 Jul. 10; 7(7):2192-9). Based on this similarity, the $E_{A,app}$ value for spinodal decomposition (black line over the spinodal region data in FIG. 16B) is assigned to the activation energy for coalescence, $E_{A,2}$. This assignment is depicted schematically in FIG. 19B. The acceleration of ATPS formation upon cooling through the metastable region (i.e., the metastable data points increase from left to right in FIG. 16B), however, is distinct from coalescence. In fact, the negative $E_{A,app}$ value in the metastable region (black line over the metastable region data in FIG. 16B) indicates that ATPS formation is rate-limited by the first step of droplet growth and that there should be 3 activation energies to take into account: the first 2 corresponding to the reversible steps of the droplet growth ($E_{A,1}$ and $E_{A,-1}$ in FIG. 19B) and the third for droplet coalescence in the forward direction ($E_{A,2}$ in FIG. 19B). It is expected that the value of $E_{A,2}$ is independent of temperature. Moreover, if droplet growth is diffusion-limited, then $E_{A,1}$ should also have a temperature independent value (Von Smoluchowski M. Z. Phys. 1916; 17:557-85; Van den Tempel M. Recueil des Travaux Chimiques des Pays-Bas. 1953; 72(5): 433-41). Based on these assumptions, the negative $E_{A,app}$ in the metastable region should reflect the influence of temperature on the activation energy required to dissociate protein monomers from the surface of growing droplets ($E_{A,-1}$).

Upon cooling below $T_{ph}$, the solution becomes supersaturated, i.e., the initial protein concentration is higher than the concentration in the protein-poor phase of the equilibrated ATPS. This concentration difference can be related to the degree of supersaturation, which quantifies the thermodynamic driving force for LLPS. At warmer temperatures near $T_{ph}$, the addition of a monomer to a droplet should be free energy favorable, but the absolute change in free energy should be small (upper curve in FIG. 19B). As the temperature is lowered, the supersaturation increases and the free energy difference for droplet growth becomes larger (lower curve in FIG. 19B). As a consequence, $E_{A,-1}$ becomes higher at colder temperatures and droplet growth accelerates. This idea is supported by the linear dependence of k on supersaturation in the metastable region, which was estimated from the colloidal phase diagram in FIG. 11A and FIG. 11B (Berthoud A. Journal de Chimie Physique. 1912; 10:624-35; Valeton J J. Zeitschrift für Kristallographie-Crystalline Materials. 1924 Nov. 1; 60 (1-6):1-38; Vekilov P G. Journal of Physics: Condensed Matter. 2012 Apr. 11; 24(19): 193101). Although droplets grow ever more rapidly at lower temperatures, the value of k begins to decrease below $T_{meta}$ (dashed vertical line labeled $T_{meta}$ in FIG. 16B) because droplet coalescence becomes the rate-limiting step. The gradual and continuous transition from the metastable region into the spinodal region (metastable region and spinodal region data points in FIG. 16B) should occur because droplet growth becomes faster at lower temperatures, while droplet coalescence is proportional to temperature. Also, droplet growth could become diffusion-limited upon cooling into the spinodal region. In fact, monomer diffusion to the surface of droplets should decrease with temperature, thereby promoting slower droplet growth. These ideas are consistent with the observation that $T_{meta}$ is the first temperature at which ATPS formation comes to completion. Moreover, the 2-step mechanism provides a simple framework for modeling the kinetics of both the metastable and spinodal regions.

Figure 16B:
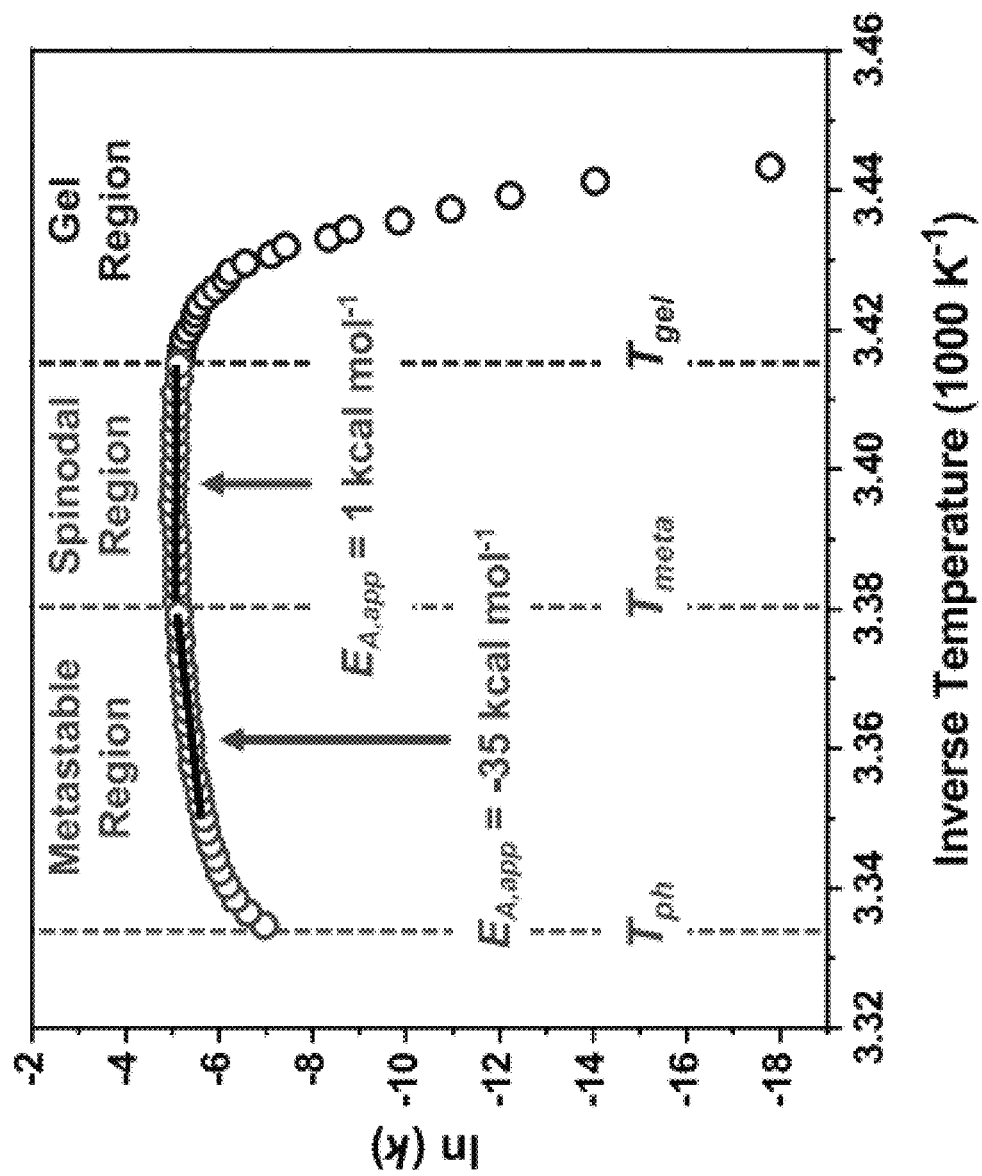
Figure 17:
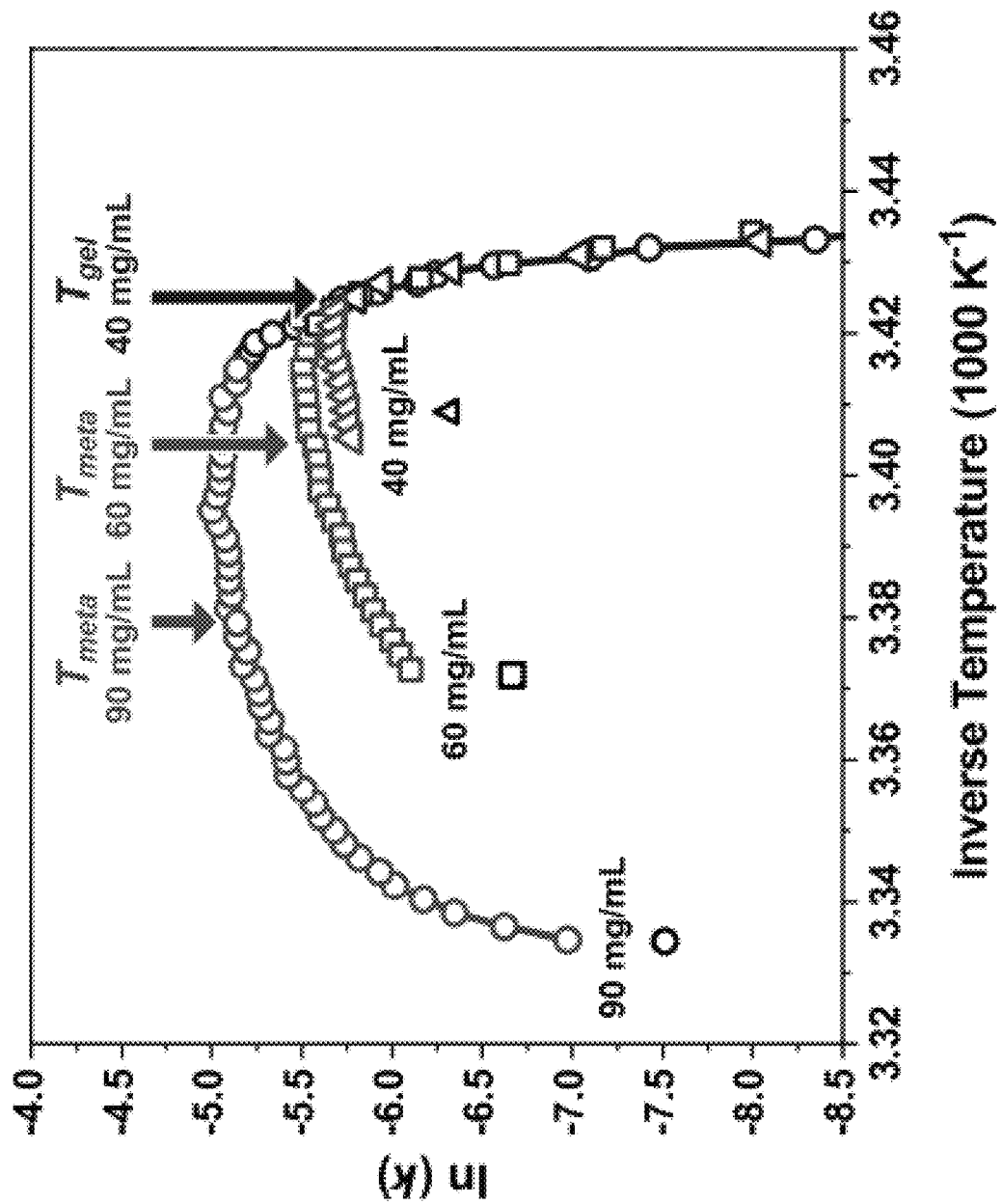
FIG. 17 depicts Arrhenius plots for the kinetics of ATPS formation in solutions containing 90 mg/mL (circle data points), 60 mg/mL (square data points), and 40 mg/mL (triangle data points) mAb in the presence of 20 mg/mL PEG-3350. The natural log of the rate constants, ln(k), for each mAb concentration versus inverse temperature is divided into metastable (red data points), spinodal (green data points), and gel (blue data points) regions. The solid red and blue curves are provided as guides to the eye.

At even colder temperatures, ATPS formation becomes arrested by the formation of a kinetically trapped gel (gel region data points in FIG. 16B). Gelation should occur under conditions where the proteins assemble into an expansive fractal-like network of poorly packed protein clusters that cannot undergo coalescence to complete ATPS formation, as depicted in the droplet cartoon at 60 min in FIG. 13B (Lu P J et al. Annu. Rev. Condens. Matter Phys. 2013 Apr. 1; 4(1):217-33). Indeed, the extremely fragile structure of the gel, as determined by the VFT model in FIG. 18 (D=0.05), is consistent with a fractal-like network held together by a collection of weak and poorly optimized protein-protein interactions. The value of $T_{gel}$ is rather insensitive to the concentration of the protein, as shown by the blue data points in FIG. 17. $T_{gel}$ occurs below the spinodal curve at high mAb concentration (e.g., C=90 mg/mL mAb in FIG. 13A through FIG. 13B), which is consistent with previously proposed gelation mechanisms involving arrested spinodal decomposition (Cardinaux F et al. Physical review letters. 2007 Sep. 13; 99(11):118301; Gibaud T et al. Journal of Physics: Condensed Matter. 2009 Jul. 20; 21(32):322201; Lu P J et al. Nature. 2008 May; 453(7194):499; Zaccarelli E et al. Journal of Physics: Condensed Matter. 2008 Nov. 12; 20(49):494242). The phase diagram provided in FIG. 5, however, demonstrates that gelation can also occur below the metastable region at lower mAb concentrations. In fact, the location of $T_{gel}$ relative to $T_{meta}$ as a function of mAb concentration can be directly observed in the 3 Arrhenius plots provided in FIG. 17. The fastest rate of ATPS formation occurs near $T_{meta}$ (arrows labeled $T_{meta}$ in FIG. 17) for both the 90 and 60 mg/mL mAb samples, where $T_{meta}$ is above $T_{gel}$ (descending data points). The 40 mg/mL mAb solution, however, shows a maximum value for ln(k) at $T_{gel}$ (blue arrow labeled $T_{gel}$ in FIG. 17). This result demonstrates that $T_{gel}$ can occur at the boundary of the metastable and gel regions of the phase diagram. As such, gelation in mAb solutions may occur by diffusion-limited cluster aggregation in the metastable region as opposed to arrested spinodal decomposition (Zaccarelli E. Journal of Physics: Condensed Matter. 2007 Jul. 17; 19(32):323101).

Herein, it was shown that the kinetics of ATPS formation in mAb solutions containing PEG exhibits unique temperature-dependent signatures that correspond to distinct regions of a colloidal phase diagram. Analysis of these signatures suggests that the late stages of phase separation proceed in 2 steps, beginning with droplet growth and ending with droplet coalescence. The kinetics of ATPS formation is controlled by droplet growth in the metastable region, which accelerates with decreasing temperature due to a growing activation energy required for dissociating a protein from the surface of a droplet. The kinetics for spinodal decomposition, however, is distinct because the reaction pathway is limited by the second step of coalescence. The ability to explore the reaction coordinate diagram for ATPS formation via temperature gradient microfluidics may help to provide insights into the effects of solution conditions (e.g., crowders, salts, surfactants, buffers, and pH) and protein properties on the phase behavior of mAb formulations. In a broader sense, the 2-step mechanism should help provide insight into the phase behavior of colloids and polymers, as well as the phase separation of biomacromolecules inside living cells (Brangwynne C P et al. Science. 2009 Jun. 26; 324(5935):1729-32).

Example 2: Temperature Gradient Assays for Measuring the Thermodynamics and Kinetics of Colloidal Phase Separation Liquid-liquid phase separation is the process by which a homogenous solution demixes into two phases. This process has been implicated in biological context over the past decade. However, the underlying chemistry and process is relevant to a wide range of phenomenon. In particular there has been increasing interest in using phase separation as a metric for colloidal stability in biologics formulation screening. The petroleum industry also uses phase separation measurements to assess the composition and purity of oil samples.

Figure 20:
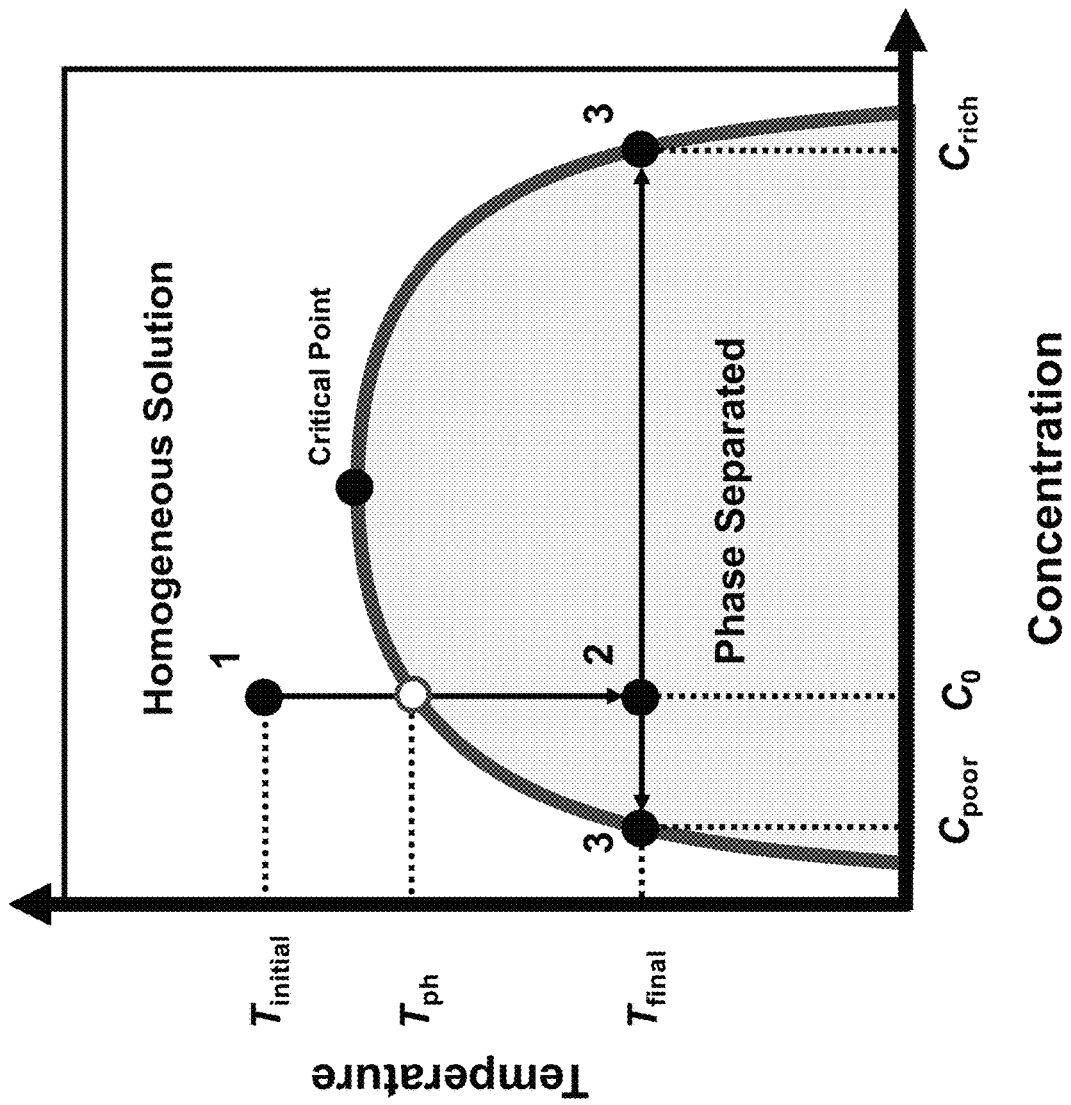
FIG. 20 depicts a colloidal phase diagram exhibiting an upper critical solution temperature. The remaining black points represent different conditions during phase separation experiments.

The interactions that control colloid phase behavior can be quantified by phase diagrams, as depicted schematically in FIG. 20. The curve delineates conditions where the solution is homogeneous and the colloids are soluble from conditions where the colloids are attracted to one another and separate into two phases. Phase separation can be monitored using a variety of techniques including fluorescence or direct concentration measurements. A very common approach is to monitor solution turbidity because it does not require fluorescent labeling or tedious concentration measurements by UV-vis or chromatography.

The phase separation temperature resides on the binodal curve, illustrated by the solid curve in FIG. 20. A popular method for determining $T_{ph}$ is to slowly cool a solution over time (e.g. 1° C./min, depicted in FIG. 21A). This cooling process is illustrated by the black arrow from point 1 to point 2. Once a sample has been cooled below $T_{ph}$, phase separation leads to the formation of droplets that scatter light and make the sample appear cloudy and turbid (FIG. 21). The proteins associate until the droplets reach a concentrated with protein ($C_{rinch}$) and the other is devoid of protein ($C_{poor}$). With more time, the droplets grow and coalesce to form larger droplets with a smaller surface area. Moreover, the droplets are often more dense than the surrounding solutions so they settle to bottom of the container. At equilibrium, the sample forms an aqueous two-phase system consisting of two macroscopic phases. The concentrations of these phases are determined by the shape of the phase diagram in FIG. 20 labeled by points 3.

Figure 21A:
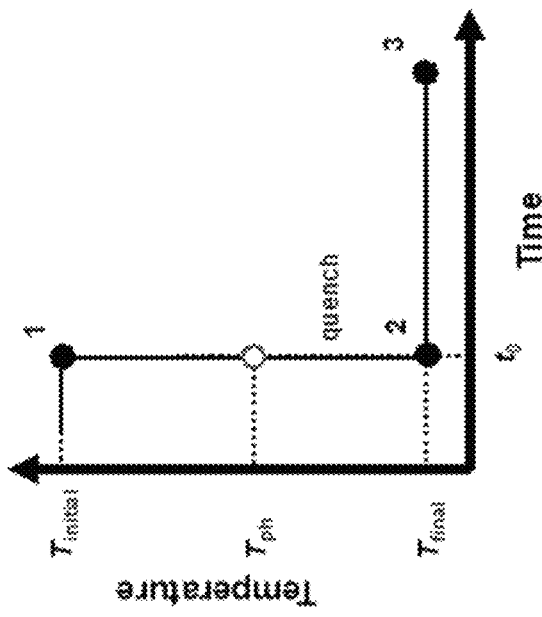
FIG. 21A through FIG. 21D depict common temperature-dependent experiments to study phase separation.
Figure 21B:
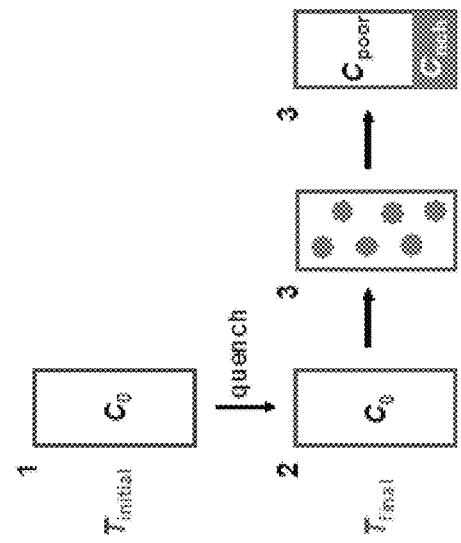
Figure 21C:
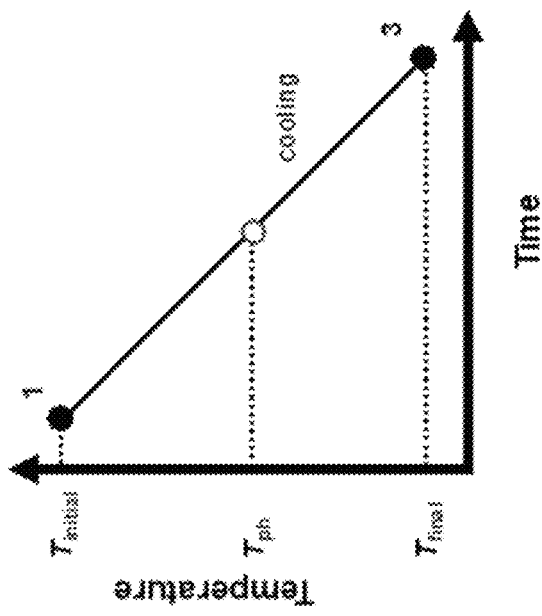
Figure 21D:
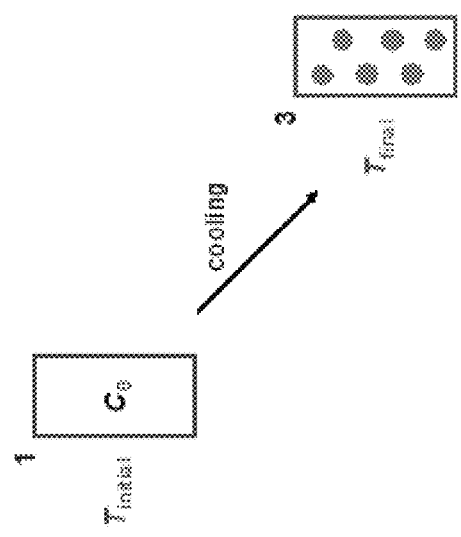
Figure 22A:
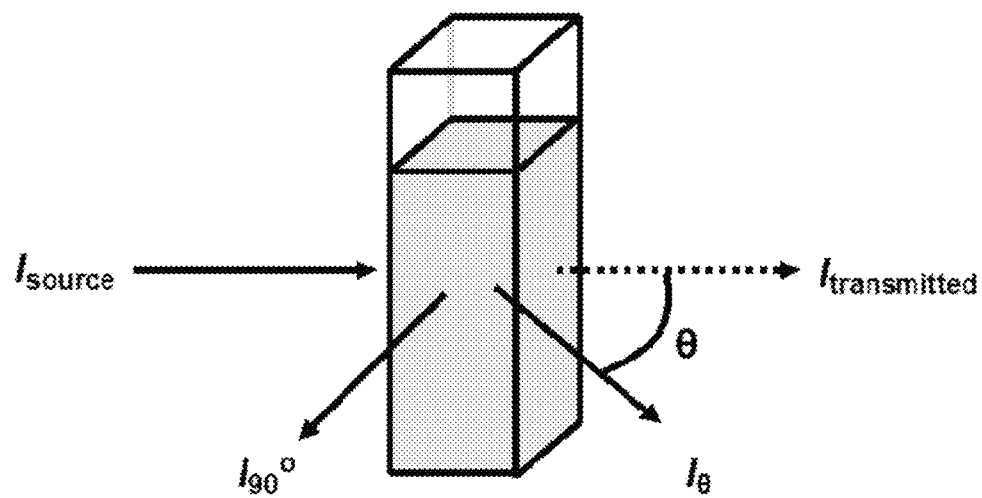
FIG. 22A and FIG. 22B depict experimental setups for light scattering experiments for phase separation.
Figure 22B:
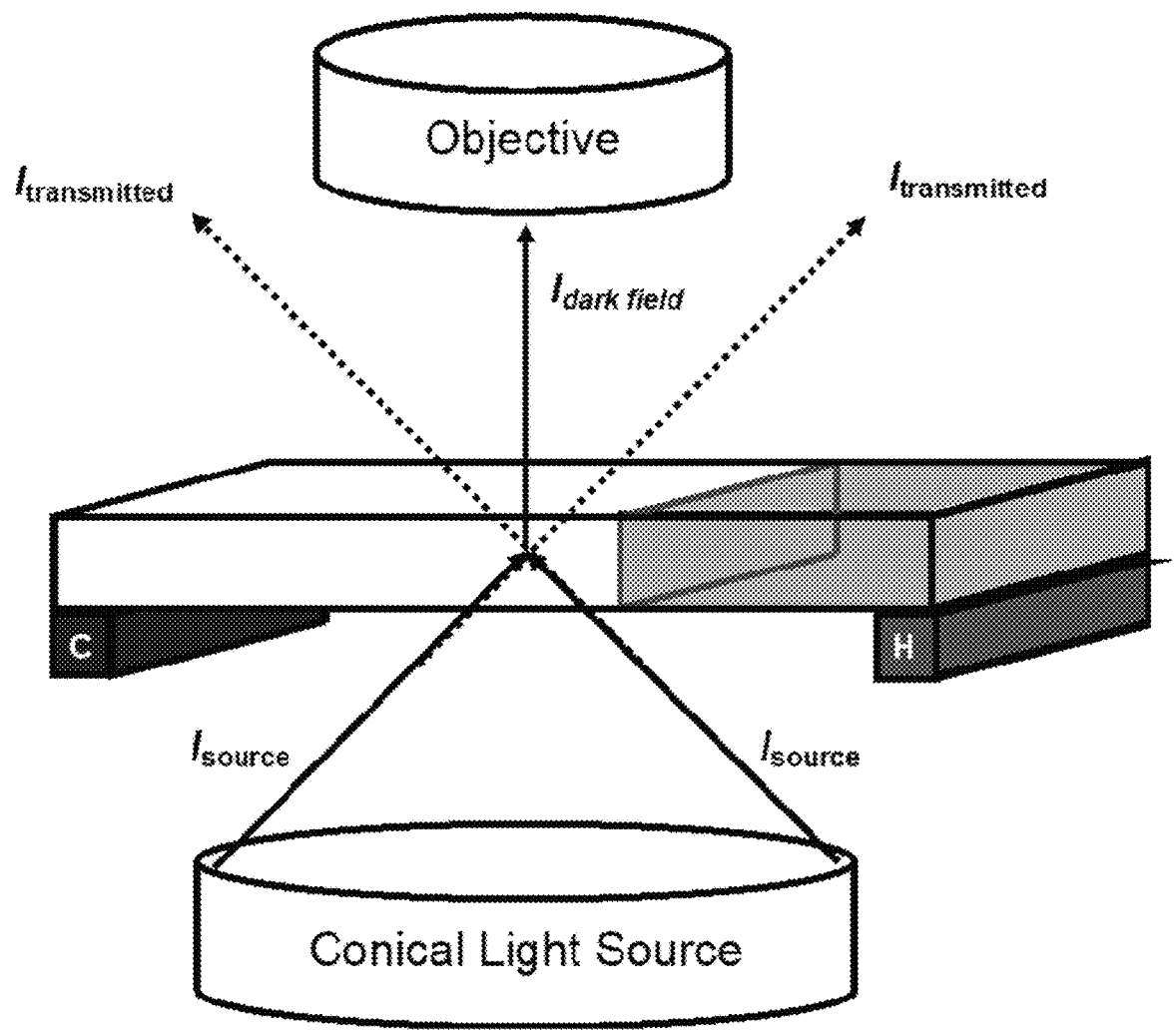

Kinetics measurements of phase separation are commonly performed by rapidly cooling a solution (a so-called temperature-quench, FIG. 21C) to a final temperature, $T_{final}$, that is below $T_{ph}$. Over time, droplets will form and then combine to form an aqueous two-phase system (FIG. 21D). The kinetics of this process can be monitored using a range of scattering experiments (FIG. 22A, FIG. 22B). Kinetics measurements provide insight into the mechanism of phase separation. However, there is a significant lack of kinetics measurements because the current strategies would require multiple temperature quenching experiments to study how the value of $T_{final}$ influences the kinetics.

Schematic illustrations of measuring phase separation temperature are shown in FIG. 23A and FIG. 23B. Classical measurements, where the transmitted intensity is measured as a function of temperature, are performed by cooling a sample then reheating it (FIG. 23A). The average of the mid points of $T_{cloud}$ and $T_{clarify}$ is used as a measure of $T_{ph}$. FIG. 23B shows a schematic illustration of a line scan from a temperature gradient. The value of $T_{ph}$ is determined from the onset of light scattering intensity relative to the minimum baseline at higher temperatures.

Figure 24:
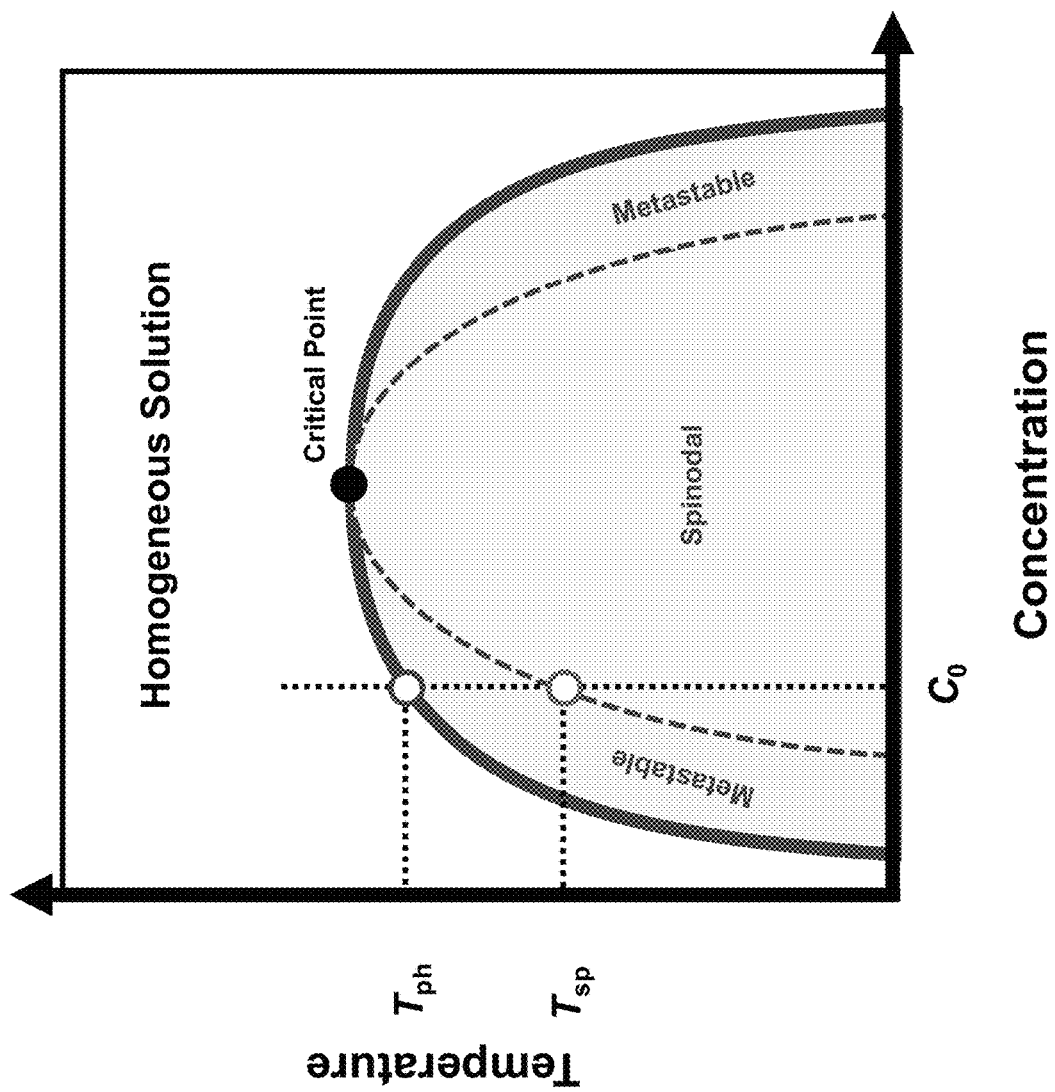
FIG. 24 depicts a colloidal phase diagram with kinetic regions. The red curve denotes the binodal curve, like in FIG. 20. At lower temperatures there is another boundary called the spinodal curve, which delineates conditions phase separate via distinct kinetic pathways. The green circle marks the spinodal temperature, $T_{sp}$, for a sample with an initial concentration of $C_0$. The metastable region exists between the binodal and spinodal curves. In this region, phase separation should proceed by nucleation and growth. The spinodal region lies below the spinodal curve, where phase separation proceeds by spinodal decomposition.

A colloidal phase diagram with kinetic regions is shown in FIG. 24. The red curve denotes the binodal curve, like in FIG. 20. At lower temperatures there is another boundary called the spinodal curve, which delineates conditions phase separate via distinct kinetic pathways. The green circle marks the spinodal temperature, $T_{sp}$, for a sample with an initial concentration of $C_0$. The metastable region exists between the binodal and spinodal curves. In this region, phase separation should proceed by nucleation and growth. The spinodal region lies below the spinodal curve, where phase separation proceeds by spinodal decomposition.

Figure 25:
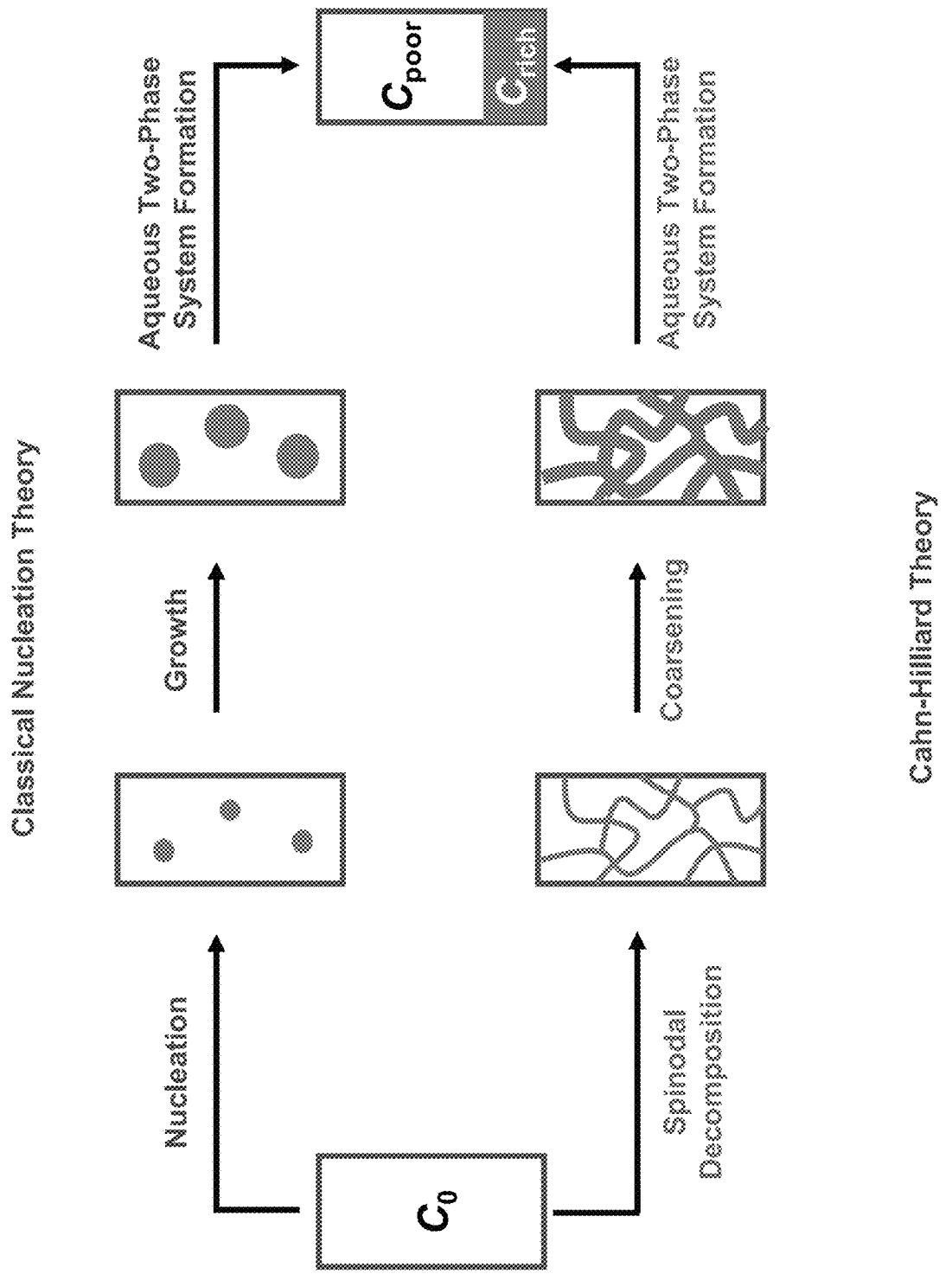
FIG. 25 depicts a schematic illustration of two pathways of phase separation after a cooling a sample below the phase separation temperature. The upper panels illustrate nucleation and growth, which occurs in the metastable region of the phase diagram provided in FIG. 24. The lower panels illustrate spinodal decomposition and coarsening, which occurs in the spinodal region of the phase diagram.

A schematic illustration of two pathways of phase separation after cooling a sample below the phase separation temperature is shown in FIG. 25. The upper panels illustrate nucleation and growth, which occurs in the metastable region of the phase diagram provided in FIG. 24. The lower panels illustrate spinodal decomposition and coarsening, which occurs in the spinodal region of the phase diagram.

Figure 26A:
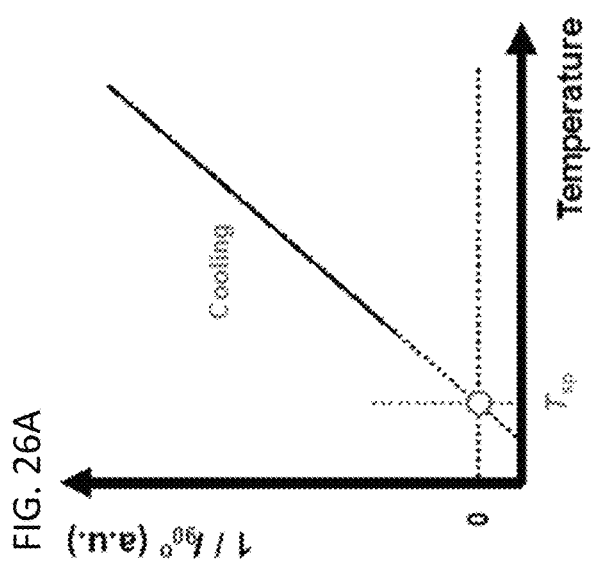
FIG. 26A through FIG. 26C depict classic methods to measure the spinodal temperature, $T_{sp}$.
Figure 26C:
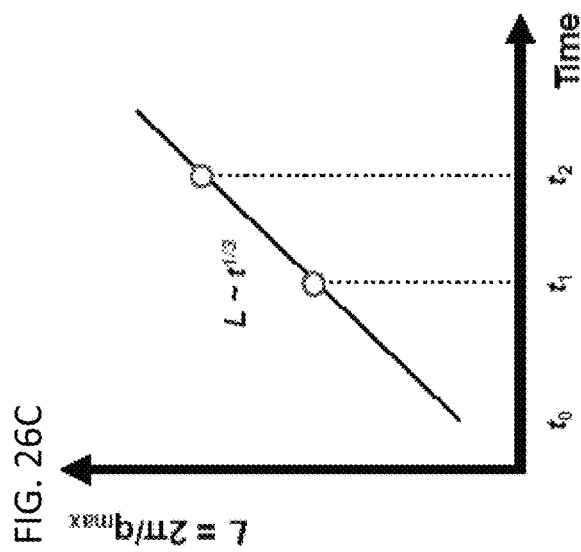
Figure 26B:
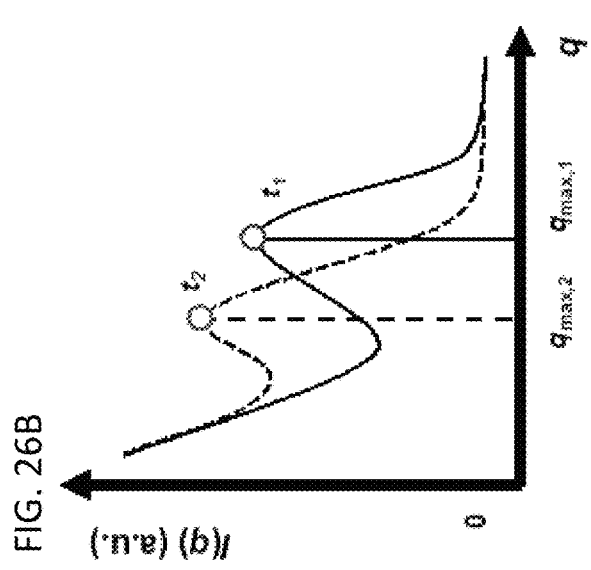

Classic methods of measuring spinodal temperature, $T_{sp}$, are shown in FIG. 26A through FIG. 26C. (FIG. 26A) The intensity of light scattering at a 90° angle from a cuvette can be monitored as a function of temperature during a cooling experiment. The inverse of this intensity, $1/I_{90}$, decreases as the sample is cooled. The spinodal temperature, $T_{sp}$, is obtained by extrapolation to the x-intercept, as depicted by the dashed vertical line. (FIG. 26B and FIG. 26C) Kinetic measurements of the spinodal transition. (FIG. 26B) The angle-dependent light scattering intensity contains information about the size of phase separated droplets in the sample. The intensity data are plotted as a function of q ($q=4\pi n_0 \sin(\theta/2)/\lambda$), where $\theta$ is the angle from the transmitted intensity, as shown in FIG. 22A and FIG. 22B, $n_0$ is the viscosity of the solvent and $\lambda$ is the wavelength of the incident light. Peaks in the scattering data shift as a function of time due to the growth of droplets. (FIG. 26C) The peak maxima can be related to a characteristic length scale of droplets in the sample, which grows over time. If the sample grows via spinodal decomposition this plot should follow a power law with an exponent of ⅓.

Temperature gradient methods to determine the spinodal curve are shown in FIG. 27A through FIG. 27E. (FIG. 27A) Schematic illustration of a set of images obtained during a temperature gradient experiment. The dark field intensity is tracked at a specific temperature, as illustrated by the dashed vertical line at $T_i$. (FIG. 27B) This intensity decays as a function of time due to the conversion of the droplet suspension into a clear aqueous two-phase system. (FIG. 27C) The data can be analyzed to various rate laws to determine the order of the reaction and the rate constant, k. By repeating this process for various positions in (FIG. 27A), the value of k is then extracted from every temperature along the temperature gradient. The temperature-dependent kinetics are then analyzed via (FIG. 27D) Arrhenius or (FIG. 27E) Eyring theories. From the experiments, the data typically display a maximum value at intermediate temperatures. Using this feature, the metastable temperature is defined, $1/T_{meta}$, which serves as a novel metric for the spinodal temperature, $T_{sp}$. The derivative the Arrhenius plot in (FIG. 27D) contains information about the apparent activation energy, $E_{A,app}$ for aqueous two-phase system formation. The derivative of the Eyring plot in (FIG. 27E), on the other hand, can be related to the apparent enthalpy of aqueous two-phase system formation, $\Delta H_{app}$.

Methods and analysis to extract the temperature-dependence of the apparent activation energy for aqueous two-phase system formation are shown in FIG. 28A through FIG. 28D. (FIG. 28A) Arrhenius plot of 100 mg/mL mAb with 23 mg/mL PEG-3350 at pH 6.4, where the fit to the data is plotted as a solid black curve. The blue and red stars are provided to mark cold and hot temperatures, respectively. The tan h fit comprises three functions. This idea is illustrated schematically in (FIG. 28B), where the individual components have been included with the data from (FIG. 28A). This model assumes that the data follow a linear function at high temperature (dashed red line) and another linear function at colder temperature (dashed blue line). The tan h function exhibits a transition from one function to another at a specific value of 1000/T. This transition is achieved by the dashed black function at the bottom of (FIG. 28B). (FIG. 28C) The derivative of the tan h function fit can be converted to an apparent activation energy as a function of temperature. The exact mathematical functions used for the model are summarized in (FIG. 28D), where y=ln(k) and x=1000/T.

Interpretations of the negative value for the apparent activation energy of aqueous two-phase system formation are shown in FIG. 29A through FIG. 29D. (FIG. 29A) Reaction coordinate diagram for a reversible, one-step reaction. The apparent activation energy for the forward reaction will be equal to the forward minus the reverse activation energy, which would give rise to a negative number. (FIG. 29B) Alternatively, the shape of the reaction coordinate diagram can vary with temperature. In this case, the free energy of demixing, $\Delta G_{demix}$, becomes more negative with decreasing temperature. This free energy driving force can be approximated by the supersaturation. (FIG. 29C) The value of $\Delta G$ should be zero at $T_{ph}$ and become negative with cooling. (FIG. 29D) The rate constant of aqueous two-phase system formation, k, correlates with $\Delta G$ in the metastable region consistent with the kinetics being dominated by the later stages of growth via monomer addition. At lower temperature, where the value of $\Delta G$ continues to decrease, the kinetics deviate. This deviation may be a signature of spinodal decomposition, which is dominated by the coalescence of droplets or diffusion-limited monomer addition.

A colloidal phase diagram exhibiting the metastable, spinodal, and gel regions is shown in FIG. 30. The gel region is a kinetically trapped state that forms at cold temperature below a gelation temperature, $T_{gel}$.

Classical ideas and characterizations of gels and glass transitions are shown in FIG. 31A and FIG. 31B. (FIG. 31A) Accepted phase diagram of gels and glasses. (FIG. 31B) Schematic illustration of measurements of glass transition temperatures, $T_g$. The dynamics, e.g. diffusion constant, or macroscopic rheological properties, e.g. viscosity, increase dramatically as the volume fraction of colloid or protein is increased toward the gel conditions. The abruptness of the transition can be related to the mechanical strength of the arrested state. Glasses and gels with a sharp concentration dependence are fragile, while those that do not depend as strongly are considered strong.

Temperature gradient approaches to characterizing gels and glasses are shown in FIG. 32A through FIG. 32C. (FIG. 32A) Schematic illustrations of the line scans of dark field intensity as a function of time during a temperature gradient experiment. The first profile measured at 1 minute is used to extract the phase separation temperature, $T_{ph}$. At longer times, e.g. 60 minutes, the gelation temperature, $T_{gel}$ as marked by the dashed blue line, can be determined, which delineates conditions that form an aqueous two-phase system formation from those that become kinetically trapped in a gel at lower temperature. Importantly, the mechanical strength of the gel states can be assessed by the change in the kinetics as the temperature approaches the gelation temperature. (FIG. 32B) The Arrhenius plots for gelation exhibit curvature when the gel state is fragile, but linearity when it is strong. (FIG. 32C) The kinetic information in (FIG. 32B) can be replotted as a time constant on the y-axis, τ, and temperature on the x-axis. This representation of the data more closely resembles the changes in viscosity due to glass or gel formation with decreasing temperature. Again, the samples with sharp temperature dependence are characterized as fragile because their arrested structure can be melted with just small changes in temperature.

Illustrations of the high-throughput nature of temperature gradient microfluidics for characterizing colloidal phase behavior are shown in FIG. 33A through FIG. 33D. (FIG. 33A) Colloidal phase diagram with superimposed temperature gradient channels, depicted as vertical bars. (FIG. 33B) The geometry of a channel-based temperature gradient chip facilitates single-experiment characterization of phase diagrams. (FIG. 33C) Classical high-throughput measurements employ 96 well plate style assays that contain different compositions in each well. The entire well can then be cooled or heated to probe the phase diagram. (FIG. 33D) An alternative method using a well-based array and the temperature gradient technology offers a new platform to obtain more parameters of the phase diagram.

Example 3: Kinetic and Thermodynamic Effects of Cosolutes on Antibody Phase Separation Phase separation has been a rapidly developing topic of interest in the recent past due to its relevance in studies of membrane-less organelles, self-assembling protein complexes, and formulation chemistry. Protein-protein interactions (PPI) have been implicated in driving phase separation, but the exact influence that these interactions have on phase behavior is not yet fully explored. Further investigations into the link between PPI and phase behavior will provide greater insight into the mechanisms of phase separation and control over this phenomenon.

The system under investigation for this work is a human monoclonal antibody (mAb) referred to as mAb1. mAbs are of particular interest for the study of phase separation due to their use in the pharmaceutical industry in relatively high concentrations (~150 mg/mL). These high concentrations lead to solution instabilities such as aggregation, denaturation, and reversible association. Previous studies on the phase separation of antibodies have reported reversible phase separation behavior, indicating that PPI primarily involve the folded states of the proteins and therefore association ought to be reversible. Observation of mAb phase separation is not always possible, however, above the freezing point of water. An assay has been developed using a non-interacting crowder, poly(ethylene glycol) (PEG), to force the phase separation temperatures of proteins up to observable temperatures. The PEG molecules force antibodies to interact by an excluded volume mechanism. In short, it is extremely unfavorable for the PEG to be in some region close to the antibody surface, referred to as an excluded volume, and the translational entropy of the PEG is maximized by minimizing the excluded volume.

The PEG phase separation assay has been adapted here to be paired with temperature gradient microfluidics (TGM) for high-throughput phase separation measurements. Phase diagrams can be mapped relatively quickly, with phase transition temperatures ($T_{ph}$) appearing on the scale of minutes. Previous work has shown that rich kinetic data can also be acquired in this manner, leading to mechanistic insight on the phase separation of a monoclonal antibody. A two-step model was developed, in which an aqueous two-phase system (ATPS) is formed by a droplet growth step followed by droplet coalescence (FIG. 34A, FIG. 34B). This work serves as a framework on which future kinetic studies can be based on when interpreting phase separation behavior of other systems.

In this work, the effect of cosolutes is investigated on the kinetics and thermodynamics of mAb phase separation. Specifically, it is found through titrations of PEG and NaCl that TGM can be used to obtain changes in enthalpy and entropy of an antibody solution. These parameters can be used to better understand how cosolutes alter the PPI within a given formulation.

The methods and materials are now described.

Antibody Preparation

Monoclonal antibody solutions were provided by Sanofi at 44 mg/mL mAb concentration in 10 mM L-histidine and 10 mM L-methionine (pH=6.0). The provided IgG1 had a pI of 6.4 and was fully glycosylated. Aliquots of provided mAb solutions were dialyzed extensively into 18 MΩ purified water filtered by a Barnstead Nanopure water purification system (Thermo Scientific). mAb solutions were concentrated to 140-170 mg/mL via SPEEDVAC and concentration was assessed by UV/Vis using the extinction coefficient 1.353 (mL/mg*cm) at 280 nm.

PEG Spikes

PEG-3350 was purchased from Spectrum Chemical and all salts were purchased from Sigma-Aldrich. PEG and salts were used as provided. Stock solutions of histidine hydrochloride (His-HCl) (pH=6.4), His-HCl buffered PEG, and His-HCl buffered salt were prepared and combined in varying amounts to prepare a series of excipient solutions. The excipient solutions were added to concentrated mAb1 solutions in ratios such that the final concentration of mAb was 100 mg/mL in 40 mM His-HCl (pH=6.4).

Temperature Gradient Microfluidics

Immediately after mixing excipients with antibody solutions, samples were incubated at 40° C. before and during sample loading. Samples were loaded into borosilicate glass capillaries (VitroCom) with internal dimensions of 1 mm wide×0.1 mm tall. Capillaries were sealed with capillary wax and phase behavior was assessed by temperature gradient microfluidics as described elsewhere herein. Poly(N-isopropyl acrylamide) solutions spiked with NaCl were used as reference solutions and had their phase transition temperatures verified by Optimelt. Temperature gradient data was initially processed using NIS-Elements and further processed in Excel.

Kinetic Data Analysis

Rate constants for phase separation were determined by tracking intensity change as a function of time at various temperatures. Temperature points were binned from equidistant regions of interest (ROIs) arranged vertically along the capillary. Intensity as a function of time was tracked for each region/temperature point, and for each set of intensity decay data up to half of the normalized intensity (spanning several minutes) was fit to a first order rate law. Rate constants were acquired from these fits and plotted as a function of temperature using the Arrhenius law. These Arrhenius plots were fit with a tan h function, $$y=(1-s(x))*f(x)+s(x)*g(x) \qquad \text{Eq. 13}$$

which effectively fits to two lines with a gradual, modifiable transition width. Here, f(x) and g(x) are equal to $m_i*x+b_i$, where i is f or g, respectively, and x is temperature. s(x) is written out:

$$s(x) = 0.5 + 0.5 * \tanh\left(\frac{x-c}{w}\right) \qquad \text{Eq. 14}$$

where c is some constant and w defines the width of the transition. The first derivative is taken for each of these fits, and the apparent activation energy is arbitrarily calculated from an average of the first four and last four points of data along these curves, close to where the slopes plateau. The first four points lie along the cold temperature side and should be informative about coalescence, whereas the last four data points lie along the hot side and should report on metastability.

The results are now described.

Cosolute Effects on Phase Transition Temperatures of mAb1

In order to compare the effects of different cosolutes on antibody phase separation, PEG and NaCl were titrated into mAb1 solutions and changes in $T_{ph}$ were observed by TGM. When PEG-3K was titrated into these mAb1 solutions, a linear increase in $T_{ph}$ was observed (FIG. 35A). This trend is consistent with PEG-induced crowding via an excluded volume mechanism. The addition of NaCl decreases $T_{ph}$ with a trend that fits well to a Langmuir binding isotherm (FIG. 35B) (Eq. 15):

$$T_{ph} = T_0 + ac + \frac{B^{max} K_A c}{1 + K_A c} \quad \text{Eq. 15}$$

where $T_0$ is the phase transition temperature under initial conditions (before salt is added), a is a linear term related to the surface tension at the macromolecule/water interface (for uncharged molecules), c is the concentration of salt, $B^{max}$ represents changes in $T_{ph}$ as ion binding saturates at the protein surface, and $K_A$ can be interpreted as the binding constant of the salt's anions to the protein.

The Langmuir binding isotherm fit implies that ions are binding to the protein surface and neutralizing electrostatic interactions. The reciprocal of the binding constant can be taken in order to acquire the dissociation constant, which ranges from 5 to 10 mM for $T_0$ of 45° C. and 30° C., respectively. Similar line shapes are observed when the cation is switched to arginine and the anion is substituted for others in the Hofmeister series. It is also worth noting that Eq. 15 fits equally well to the data with and without the linear term, indicating that the observed changes in $T_{ph}$ are dominated by salt binding.

FIG. 36 shows additional PEG titrations at various NaCl concentrations. As NaCl concentration increases, $T_{ph}$ shifts towards higher PEG concentrations (FIG. 36). Additionally, the linear fits have increasingly shallower slopes as NaCl is added. In other words, more PEG is required for observable phase separation in the presence of NaCl, and the addition of PEG has decreasing effectiveness with increasing salt. This is consistent with the hypothesis that PEG is encouraging phase separation, whereas NaCl inhibits the process.

Apparent Activation Energies of mAb1 in the Presence of PEG and NaCl

Kinetic measurements for the cosolute titrations were compared with two different methods. In order to see the effect of PEG on phase separation kinetics, various PEG concentrations were compared while holding NaCl concentrations constant (FIG. 37A). When comparing various NaCl concentrations, however, the PEG concentration could not be held constant as that would not produce enough data points for adequate comparisons. Instead, salt concentrations were compared by selecting PEG solution conditions where $T_{ph}$ was similar (grey region FIG. 36). For example, both 0 mM NaCl with 24 mg/mL PEG and 100 mM NaCl with 47 mg/mL PEG conditions phase separated at roughly 30° C., therefore these solutions were comparable (FIG. 37B). Arrhenius plots for these titrations were created and produced non-linear kinetic behavior as reported previously. This indicates that similar processing of $E_{A,app}$ can be done in order to gain insight on the changes to the droplet growth stage of ATPS formation. From this point forward, references to $E_{A,app}$ will refer to values obtained from the metastable regions of the kinetic data.

Apparent activation energies have been plotted as a function of PEG concentration and NaCl concentration in FIG. 37C and FIG. 37D, respectively. The apparent activation energies calculated for these plots were initially negative, implying that the step of monomer removal from a droplet was rate limiting in these cases. Therefore, the $E_{A,app}$ have been plotted as positive values and assumed to be representative of reversibility of the droplet growth step. Remarkably, PEG does not change $E_{A,app}$ whereas NaCl increases this value with increasing concentration. This can be observed qualitatively when comparing the general trends in the Arrhenius plots and considering the Arrhenius law:

$$\ln(k) = \ln(A) + \frac{-E_{A \cdot app}}{R}\left(\frac{1}{T}\right) \quad \text{Eq. 16}$$

where k is the rate constant, A is a pre-exponential factor, R is the gas constant, and T is temperature. The slopes (approximated with guide lines) for two different PEG concentrations in FIG. 37A appear unchanging, leading to similar values of $E_{A,app}$ in FIG. 37C. On the other hand, the slopes for the differing NaCl concentrations are clearly different and produce distinct values for $E_{A,app}$.

PEG and NaCl are shown herein to be able to modify the phase behavior of mAb1 with distinct mechanisms. The addition of PEG linearly increases $T_{ph}$, whereas additional NaCl leads to a decrease in $T_{ph}$ reminiscent of salt binding. FIG. 36 shows that the slope of each PEG titration becomes more shallow with added NaCl. This indicates that the excluded volume effect is diminished in the presence of salt. There are two cases which could lead to this decrease. The first case would be the decrease in excluded volume produced by the PEG molecules due to a change in their radii of gyration based on the bulk salt concentration. PEG molecule (and whatever volume it is occupying) can't occupy the same space as the protein. So instead of being repelled from some area, it is simply non-interacting and cannot occupy that space.

Additionally, PEG has no change on $E_{A,app}$, while NaCl increases this value. It has previously been suggested that $E_{A,app}$ is correlated with the supersaturation of a temperature-quenched protein solution. The linear increase in $T_{ph}$ with PEG is consistent with an excluded volume mechanism, which ought to be purely entropic in nature. The binding of NaCl to the antibody, however, should have both entropic and enthalpic contributions. These data imply that the $E_{A,app}$ calculated from TGM measurements are reporting on enthalpic changes to the system and not entropic changes.

The kinetic analysis can be taken one step further by fitting with the Eyring equation:

$$\ln\left(\frac{k}{T}\right) = B + \frac{\Delta S^{\ddagger}}{R} + \frac{-\Delta H^{\ddagger}}{R}\left(\frac{1}{T}\right) \quad \text{Eq. 17}$$

where B is a constant related to the frequency factor, and $\Delta S^{\ddagger}$ and $\Delta H^{\ddagger}$ are entropy and enthalpy of activation, respectively. FIG. 38A through FIG. 38D shows the data presented in FIG. 37A through FIG. 37D plotted along axes more similar to Eq. 17.

One of the puzzling aspects of the salt titration data is that the decreasing $T_{ph}$ suggest that phase separation is becoming less favorable, but kinetic data show that $E_{A,app}$ becomes increasingly negative. This change in $E_{A,app}$ can be interpreted as an increase in the supersaturation of the system, leading to stronger driving forces for phase separation. Another way of imagining this change is that as temperature decreases, the initial protein solution is brought lower into the phase diagram. As one decreases temperature, the sides of the phase diagram grow further apart, and likewise the concentrations of the rich and poor phases become more disparate from the initial concentration. This increasing difference between the initial protein concentration and the thermodynamically stable concentrations produces a driving force for demixing, which is well described by the term supersaturation. The kinetic data indicate that adding NaCl increases the supersaturation of the system. A possible mechanism for such an increase is that the salt is screening repulsive electrostatics between protein molecules, allowing for more dense packing of the protein rich phase (FIG. 39). This would force the right side of the phase diagram further to the right towards higher concentrations.

Example 4: Temperature Gradient Microfluidics for Measuring the Apparent Solubility of Proteins and Predicting Storage Stability Therapeutic proteins, like monoclonal antibodies (mAbs), have revolutionized the treatment of diseases ranging from cancer to arthritis. A pressing goal in the biopharmaceutical industry is to develop these drugs into liquid injectables that can be stored and self-administered at home (Bittner B et al., BioDrugs 2018, 32 (5), 425-440). Unfortunately, many mAbs cannot easily be turned into liquid products because they need to be formulated at very high concentrations (above 150 mg/mL), where protein-protein interactions are enhanced and they become susceptible to accelerated aggregation or the formation of viscous solutions (Shire S J et al., JPharmSci 2004, 93 (6), 1390-1402). Aggregation and viscosity issues can hinder various stages of the development pipeline, including purification (Du Q et al., MAbs 2019, 11 (4), 789-802), buffer exchange (Baek Y et al., Current Opinion in Biotechnology 2018, 53, 59-64), fill-finish, and shelf-life; however, these problems are commonly experienced after resource-intensive manufacturing steps have been scaled up for a sub-optimal drug candidate or formulation (Jarasch A et al., Journal of Pharmaceutical Sciences 2015, 104 (6), 1885-1898). To avoid late-stage development failures, it is critical to assess the risks associated with protein-protein interactions at high concentration.

Colloidal interactions between proteins are particularly important in aggregation and association. Directly measuring these properties at high concentration is possible via static light scattering and centrifugal methods (Yang D et al., Protein Science 2018, 27 (7), 1334-1348; Woldeyes M A et al., Journal of Pharmaceutical Sciences 2019, 108 (1), 142-154; Chaturvedi S K et al., Nature Communications 2018, 9 (1), 4415; Correia J J et al., Eur Biophys J 2020, 49 (8), 687-700; Fernindez C et al., Analytical Biochemistry 2008, 381 (2), 254-257; Scherer T M et al., J. Phys. Chem. B 2010, 114 (40), 12948-12957; Minton A P et al., Anal Biochem 2016, 501, 4-22), but they can be impractical during early development when the quantity of materials are limited. As such, formulation workflows have relied on predicting high concentration behavior with low concentration assays, such as dynamic light scattering, biolayer interferometry and self-interaction nanoparticle spectroscopy (Saluja A et al., Biophys J 2010, 99 (8), 2657-2665; Kingsbury J S et al., Science Advances 2020, 6 (32), eabb0372; Sule S V et al., Mol. Pharmaceutics 2013, 10 (4), 1322-1331; Liu Y et al., mAbs 2014, 6 (2), 483-492; Sun T et al., mAbs 2013, 5 (6), 838-841; Rich R L et al., Analytical Biochemistry 2007, 361 (1), 1-6). Although these methods have helped mitigate colloidal stability risks, they are not always predictive of high concentration behavior and can only be employed with a limited range of buffers and excipients (Woldeyes M A et al., Journal of Pharmaceutical Sciences 2019, 108 (1), 142-154; Sorret L L et al., Biophys J 2016, 111 (9), 1831-1842; Blanco M A et al., J. Phys. Chem. B 2014, 118 (22), 5817-5831). The incorporation of small-volume techniques for characterizing mAbs under high concentration stress should provide a more comprehensive risk assessment and improve formulation selection.

Crowding-induced precipitation is a classic method for quantifying the colloidal interactions involved in protein aggregation (Polson A et al., Biochimica et Biophysica Acta (BBA)—General Subjects 1964, 82 (3), 463-475; Middaugh C R et al., J. Biol. Chem. 1979, 254 (2), 367-370; Annunziata O et al., PNAS 2002, 99 (22), 14165-14170; Wang Y et al., J Phys Chem B 2007, 111 (5), 1222-1230; Kumar V et al., International Journal of Pharmaceutics 2009, 366 (1), 38-43; Gibson T J et al., Journal of Pharmaceutical Sciences 2011, 100 (3), 1009-1021; Wang Y et al., J. Chem. Phys. 2013, 139 (12), 121904; Wang Y et al., Mol. Pharmaceutics 2014, 11 (5), 1391-1402; Kalonia C et al., J. Phys. Chem. B 2016, 120 (29), 7062-7075; Toprani V M et al., Journal of Pharmaceutical Sciences 2016, 105 (8), 2319-2327; Schermeyer M T et al., mAbs 2017, 9 (7), 1169-1185; Walchli R et al., European Journal of Pharmaceutics and Biopharmaceutics 2020, 151, 53-60). These experiments place the protein under high concentration stress by the addition of polymer crowders, like polyethylene glycol (PEG). Typically, crowders are sterically repelled from proteins and enhance protein association entropically via an excluded volume mechanism, although weak enthalpic driving forces have been observed in some studies (Annunziata O et al., PNAS 2002, 99 (22), 14165-14170; Wang Y et al., Mol. Pharmaceutics 2014, 11 (5), 1391-1402; Bhat R et al., Protein Science 1992, 1 (9), 1133-1143; Arakawa T et al., Biochemistry 1985, 24 (24), 6756-6762; Bloustine J et al., Phys. Rev. Lett. 2006, 96 (8), 087803; Jiao M et al., Biophys J 2010, 99 (3), 914-923; Knowles D B et al., PNAS 2011, 108 (31), 12699-12704; Shkel I A et al., Biopolymers 2015, 103 (9), 517-527; Knowles D B et al., Biochemistry 2015, 54 (22), 3528-3542; Mukherjee S K et al., J. Phys. Chem. B 2015, 119 (44), 14145-14156; Sapir L et al., Current Opinion in Colloid & Interface Science 2015, 20 (1), 3-10; Samanta N et al., Langmuir 2016, 32 (3), 831-837; Guseman A J et al., PNAS 2018, 115 (43), 10965-10970; Sukenik S et al., Current Opinion in Colloid & Interface Science 2013, 18 (6), 495-501; Stadmiller S S et al., Current Opinion in Structural Biology 2021, 66, 183-192). Apparent solubility can be measured by the concentration of PEG that is required to precipitate proteins from a formulation or by the temperature at which precipitation occurs in the presence of PEG (FIG. 40) (Du Q et al., MAbs 2019, 11 (4), 789-802; Raut A S et al., Mol. Pharmaceutics 2016, 13 (5), 1431-1444; Mason B D et al., Biophysical Journal 2010, 99 (11), 3792-3800; Li L et al., Macromolecules 2021, 54 (1), 105-114; Broide M L et al., Proc Natl Acad Sci USA 1991, 88 (13), 5660-5664; Ishimoto C et al., Phys. Rev. Lett. 1977, 39 (8), 474-477; Taratuta V G et al., J. Phys. Chem. 1990, 94 (5), 2140-2144; Dzuricky M et al., Nature Chemistry 2020, 12 (9), 814-825; Simon J R et al., Nature Chemistry 2017, 9 (6), 509-515). Crowding assays are more quantitative and less laborious than direct solubility measurements and can be performed across a wider range of protein concentration and formulation conditions than most screening tools. The widespread use of crowders in formulation screening, however, has been limited by the low-throughput and large volume requirements of the traditional assay.

The present study employs a temperature gradient microfluidics device to measure crowding-induced precipitation. Each formulation is analyzed in 1 minute using only 10 µL of sample. The ability of the apparent solubility to predict the shelf-life of the formulation was tested directly by conducting month-long stability studies. In the first study, a protein (mAb1) was formulated under a range of pH conditions and particle formation was measured at 5° C. to mimic the intended storage conditions. In the second study, another protein (mAb2) was formulated below its isoelectric point and in the presence of various salt stabilizers. The storage stability was assessed by monitoring the turbidity of the solutions at 40° C. to accelerate the aggregation. The solubility parameters correlate remarkably well with the month-long stability tests, suggesting the importance of colloidal interactions in protein aggregation and demonstrating the utility of the temperature gradient microfluidics for mitigating solubility risks in drug development.

The materials and methods are now described.

Buffers, Salts, and Polymers

The proteins were formulated in two buffers, including histidine (His) and sodium acetate (NaAc). Hydrochloric acid (HCl) and sodium hydroxide (NaOH) were used for pH adjustments. The salts that were used in the study included sodium chloride (NaCl) and sodium sulfate ($Na_2SO_4$). Additional bases and acids were used to formulate the proteins into stabilizers that were commercially unavailable, including lysine base (Lys), arginine base (Arg), aspartic acid (Asp), glutamic acid (HGlu), sulfuric acid ($H_2SO_4$). The polymer that was used in the crowder assays was polyethylene glycol, which had an average molecular weight of 3,350 g/mol (PEG-3350). The calibration standards for the temperature gradient experiments were solutions containing a thermoresponsive polymer, poly N-isopropyl acrylamide (PNIPAM).

Properties and Storage Conditions of the mAbs

Two monoclonal antibodies were produced, purified and formulated for this study. The antibody that was used for the pH screen had an isoelectric point (pI) of 6.4 and was referred to as mAb1. The mAb1 was formulated at a concentration of 50 mg/mL mAb with 500 mM glycine and 50 mM sodium acetate buffer at pH 5.0 for storage. The mAb that was used for the salt stabilizer studies had a pI of 8.2 and was referred to as mAb2. The mAb2 storage formulation was 50 mg/mL mAb and 10 mM histidine buffer at pH 5.5. Both of the mAbs were stored at −80° C. until further use.

Formulating Concentrated Stock Solutions of mAb1 for the pH Study

The mAb1 was reformulated into 8 different solution conditions for the pH study. The acidic solutions were prepared at pH 4.5, 5.0, and 5.5 in 20 mM sodium acetate buffer. The basic formulations were prepared at pH 5.5, 6.0, and 6.5 using 10 mM histidine buffer. Two additional formulations were prepared at pH 5.5 and 25 mM NaCl in either acetate or histidine buffer. Reformulation into these target conditions was achieved by dialysis of the storage solution followed by concentration using centrifugal filtration. A 6 mL volume of the mAb1 storage solution was aliquoted into 3.5 kDa MWCO dialysis tubing (SnakeSkin Dialysis Tubing) and suspended in 4 L of the target buffer condition at 4° C. Three rounds of dialysis were performed with each round lasting 8 hours. The concentration of buffer and solution pH in the dialysis solution were slightly different than the target concentration to account for the protein buffering and the Donnan effect. The dialyzed mAb solution was then concentrated from ~ 6 mL to ~ 1.75 mL using 30 kDa MWCO centrifugal filters (Amicon Ultra-4) at 3000 RCF and 20° C. The protein concentration was determined by UV-visible spectroscopy using an extinction coefficient of 1.353 $(mg/mL)^{-1}$ $cm^{-1}$ at 280 nm (~120 mg/mL).

Formulating Concentrated Stock Solutions of mAb2 for the Salt Study

The mAb2 was reformulated into 7 different salt conditions for the excipient study, all of which were prepared to pH 5.5 in 10 mM histidine buffer. A control formulation was prepared without salt, while the other 6 solutions contained 200 mM salt. The identities of salt excipients were arginine aspartate (ArgAsp), arginine glutamate (ArgGlu), arginine sulfate ($Arg_2SO_4$), lysine glutamate (LysGlu), lysine sulfate ($Lys_2SO_4$), and sodium sulfate ($Na_2SO_4$). Reformulation was achieved by buffer exchange in a 30 kDa MWCO centrifugal filters (Amicon Ultra-4) at 3000 RCF and 20° C. A volume of the storage solution was aliquoted into the filter and concentrated by a factor of 3. The target formulation buffer was then used to dilute the solution back to its initial volume. This cycle, consisting of concentration followed by dilution, was repeated 3 times. Finally, the formulations were concentrated in the target buffer condition. The concentration of these mAb2 stock solutions were measured by UV-visible spectroscopy (above 120 mg/mL).

Preparing Concentrated Crowder Stock Solutions for the Apparent Solubility Assay The mAb formulations were mixed with a crowder prior to measuring phase separation on the temperature gradient. For most of the formulations, a crowder stock solution was prepared to match the pH, buffer, and salt conditions of the respective mAb stock. The only exceptions were for the two conditions where mAb1 was formulated at pH 5.5 with 25 mM NaCl, in which case the NaCl salt was added to the crowder stock solution.

The crowder stock solutions were prepared by weighing the appropriate masses of buffer, salt, and PEG into a beaker. Deionized water was added to dilute the sample to ~80% of the total volume and the pH was adjusted with aliquots of 1 M HCl or NaOH. The samples were sonicated after the addition of acid or base to ensure that the pH was equilibrated. This process was repeated until the pH stabilized to the intended value. Finally, the solution was transferred into a volumetric flask and diluted to volume. The initial beaker was washed with water to ensure complete transfer of the solute molecules. The concentration of PEG in the crowder stock solutions was between 300 and 400 mg/mL depending on the formulation.

Many of the crowder stock solutions in the excipient study were prepared with stabilizer compositions that were not commercially available as salts (ArgAsp, ArgGlu, $Arg_2SO_4$, LysGlu, and $Lys_2SO_4$). For these stock solutions, the masses histidine buffer, arginine base or lysine base, and PEG were initially weighed into a beaker. Water was added to achieve a ~50% dilution and then the acid containing the respective anion moiety was added drop-wise and measured gravimetrically (aspartic acid, glutamic acid, or sulfuric acid). The stock solutions were then pH adjusted and diluted to their final volume following the procedure described above.

Mixing the mAb and Crowder Stock Solutions

The process for mixing the stock solutions was performed in two steps. First, the crowder stock solution was diluted with a buffer solution, which did not contain polymer, to prepare a series stocks with different PEG concentrations. This series of PEG stocks were prepared in 500 µL volumes to avoid the inaccuracies from pipetting small volumes. In the second step, the mAb stock was mixed with the various crowder stocks of the series to total of 100 µL. Volumes were assumed to be additive in both steps of this procedure.

Several of the mAb stocks were very viscous. In order to minimize deviations in the volume of mAb stock that was transferred into the PEG stocks, a new pipette tip was used for each sample preparation. The aliquot of mAb was pipetted up and down 5-8 times in the PEG stock to ensure that the mAb solution was completely delivered and homogenized. The solutions of mAb and PEG were incubated in a water bath at 35° C. for 5-10 minutes to ensure that the samples were soluble (i.e. above the phase separation temperature). Moreover, the samples were mixed by pipetting up and down at two intermittent points during the water bath incubation.

Temperature Gradient Experiments

The incubated samples were loaded into rectangular glass capillary tubes (12×1×0.1 mm, VitroTube). Loading was achieved by placing a drop of the sample in contact with one end of the capillary tube and the liquid was drawn in by capillary action. This procedure was performed within an incubator at 40° C. to ensure that the sample remained homogenous. The loaded capillaries were sealed with wax to avoid loss of solvent due to evaporation. Each sample preparation was loaded into two capillaries for duplicate analysis on the temperature gradient. The set of capillaries for a PEG titration were assembled together into a chip using scotch tape and then placed on the temperature gradient at the same time to begin the experiment.

Prior to initiating the experiment, the cold sink and heat source of the temperature gradient were set to ~5 and 35° C., respectively, using hardware that was similar to previous studies (Zhang Y et al., PNAS 2009, 106 (36), 15249-15253; Mao H et al., J. Am. Chem. Soc. 2002, 124 (16), 4432-4435; Mao H et al., Anal. Chem. 2002, 74 (19), 5071-5075; Mao H et al., J. Am. Chem. Soc. 2003, 125 (10), 2850-2851; Zhang Y et al., J. Am. Chem. Soc. 2003, 125 (50), 15630-15635; Mao H et al., Macromolecules 2004, 37 (3), 1031-1036; Zhang Y et al., J. Am. Chem. Soc. 2005, 127 (41), 14505-14510; Furyk S et al., Journal of Polymer Science Part A: Polymer Chemistry 2006, 44 (4), 1492-1501; Zhang Y et al., J. Phys. Chem. C 2007, 111 (25), 8916-8924; Zhang Y et al., Biomacromolecules 2006, 7 (7), 2192-2199; Rogers B A et al., PNAS 2019, 116 (32), 15784-15791). The temperature gradient was calibrated using samples of 10 mg/mL poly N-isopropylacrylamide in either 0.2 or 1.7 M NaCl, the cloud points of which were measured at 29.3 and 11.1° C., respectively. After the experiment was initiated by placing the chip of capillaries onto temperature gradient, the images were acquired using a dark-field upright microscope (SZM Nikon, LED light source, 1× objective, DS-iQ CMOS camera). Solubility was measured by analyzing the images obtained after 1 minute in Nikon Elements. Additional data analysis and plot generation was performed in OriginLab.

The results are now described.

Apparent Solubility Measurements on a Temperature Gradient

The mAb formulations were mixed with PEG and loaded into capillaries for temperature gradient analysis. The precipitation experiment was initiated by placing a capillary into thermal contact with a cold sink on one side and a heat source on the other (FIG. 41, A). Heat flowed across the capillary and generated a steady-state temperature gradient. Dark-field images of the capillary were acquired from above to visualize the precipitation as shown in FIG. 41, B, where the temperature changes linearly from left to right (0.5 to 30° C.). As can be seen, the capillary was cloudy on the cooler side because the proteins assembled into droplets that scattered light. The phase separation temperature, $T_{ph}$, was quantified by analyzing the light scattering intensity as a function of a temperature across the capillary (intersection of the two red lines over the black data points in FIG. 41, B).

Multiple capillaries were introduced onto the temperature gradient to conduct the PEG titrations and measure the apparent solubility (FIG. 41, C). The temperature increases from bottom to top of the image and the PEG concentration increases from left to right. The values of $T_{ph}$ increased upon the addition of PEG and were extracted to create a crowding phase diagram (FIG. 41, D). The apparent solubility was quantified by the critical crowder concentration, $C_{PEG}^*$, that increased $T_{ph}$ to 15° C. (black arrow in FIG. 41, D). This temperature was the mid-point between the limits of reliable $T_{ph}$ measurements. Indeed, aqueous solutions freeze below 0° C. and samples with $T_{ph}$ values above 30° C. precipitate during capillary loading (blue and red lines in FIG. 41, D). Similar mid-point analyses have previously been employed to quantify colloidal interactions and offer an alternative to large extrapolations to conditions without crowder (Gibson T J et al., Journal of Pharmaceutical Sciences 2011, 100 (3), 1009-1021).

Optimization of the Formulation pH

Solution pH is a critical parameter for a formulation because it influences the protein's charge state and therefore the protein-protein interactions, as illustrated in FIG. 42, A. Proteins bear net positive charge when they are formulated below their isoelectric point (pI) and are electrostatically repelled from each other. Near the isoelectric point, however, the colloidal interactions are the least repulsive and the protein interact more readily. In this study, the apparent solubility of mAb1 was measured over a range of pH conditions. Formulations of mAb1 (pI=6.4) were prepared with solution pH values ranging from 4.5 to 6.5 using either acetate (Ac) or histidine (His) buffer. The influence of buffer identity and ionic strength were tested at 5.5 solution pH.

The crowding phase diagrams in FIG. 42, B show the effects of pH on mAb1 solubility. At pH 6.1, the proteins readily precipitated (purple data, $C_{PEG}^*$=12 mg/mL), but high concentrations of PEG were required to crowd mAb1 out of solution at pH 4.9 (red data, $C_{PEG}^*$=116 mg/mL). The values of $C_{PEG}^*$ were extracted from FIG. 42, B and plotted as a function of solution pH in FIG. 42, C. As can be seen, the apparent solubility was lowest near the isoelectric point. Below pH 5.5 there was a dramatic increase in the solubility, presumably due to the protonation events that increased the mAb's net positive charge (FIG. 42, A). The four data points clustered near pH 5.5 show that salt reduced the mAb1 solubility. Moreover, the acetate reduced the solubility more than histidine buffer. Such results suggest that acetate and chloride decreased the mAb's effective charge more than neat histidine buffer.

Optimization of the Formulation Excipients

After the pH and buffer have been selected, excipients can be introduced to further optimize the formulation. Stabilizers are a common class of excipients that provide additional protection against protein denaturation under stress, like heat and agitation, but they can also impact the protein-protein interactions. Screening a variety of stabilizers can help to identify an excipient that provides a balance between conformational and colloidal stability. This type of formulation challenge is exemplified by mAb2 (pI=8.2), which is conformationally unstable in buffered formulations. The apparent solubility of mAb2 was used as a screening parameter to predict the performance in a month-long accelerated stability study at 40° C. Specifically, mAb2 was formulated with various stabilizers, ranging from inorganic salts to amino acids, at a constant pH of 5.5 using histidine buffer.

The ionic stabilizers employed in this work should be expected to screen the electrostatic repulsion between mAb2 proteins, which bears a net positive charge at pH 5.5 (FIG. 43, A). The crowding phase diagrams, however, revealed that the decrease in solubility was dependent on the stabilizer identity (FIG. 43, B). The values of $C_{PEG}^*$ (FIG. 43, C) showed that all of the salts reduced mAb2's solubility, relative to the no salt condition. Formulations containing divalent sulfate anions precipitated easily, while those containing amino acid salts were more resistant to the crowding stress. The rank ordering of cation effects on mAb2 solubility followed arginine ($Arg^+$)>lysine ($Lys^+$)>sodium ($Na^+$), while the rank ordering for anions was glutamate ($Glu^-$)>aspartate ($Asp^-$)>sulfate ($SO_4^{2-}$). These results indicate that, in addition to electrostatic screening, the protein solubility was influenced by specific interactions with the stabilizers, which should be more diverse for amino acids than alkali metals and inorganic oxyanions.

Formulating mAbs into liquid injectables is challenging because each protein has a unique structural stability and propensity to form protein-protein interactions. The task is exacerbated by the fact that formulation conditions, like pH and excipients, have distinct effects on different mAbs. High-throughput screening assays that predict a rank ordering of shelf-life offer the potential to accelerate and improve the selection of formulation components. In this work, temperature gradient microfluidics was employed to measure the crowding-induced precipitation of mAbs. The apparent solubility of the mAbs was quantified under various formulation conditions. These results highlight the importance of colloidal protein-protein interactions and provide insight into their sensitivity to formulation conditions. Furthermore, this study validates the utility of apparent solubility measurements and motivates the use of temperature gradient microfluidics as a formulation screening tool for predicting and controlling protein aggregation.

Understanding the roles of conformational and colloidal stability in the mechanism of protein aggregation is an important topic for the biopharmaceutical industry and an active area of research (Chi E Y et al., Pharm Res 2003, 20 (9), 1325-1336; Roberts C J et al., Trends Biotechnol 2014, 32 (7), 372-380). The schematic in FIG. 44 provides a simplified illustration of the routes to forming an aggregation nucleus. The upper pathway portrays the protein's folding equilibrium and a second step, involving the aggregation of two unfolded monomers. The lower pathway depicts the association equilibrium between folded proteins and a second step, where the dimers unfold. Protein denaturation is a key step in both pathways, but forming an aggregation nucleus requires protein-protein interactions, which are enhanced in high concentration formulations. With these considerations in mind, it is critical to characterize protein behavior under concentrated environments in order to comprehensively assess the risks for aggregation.

Crowding assays systematically increase the concentration stress of a formulation to induce precipitation and quantify the protein-protein interactions that govern solubility (FIG. 40, FIG. 41). At low ionic strength, these colloidal interactions are dominated by long-range electrostatic forces between the proteins. The dramatic increase in mAb1's solubility as the pH was lowered below its pI (FIG. 42), for example, can be explained by its charge. Carboxylate sides chains begin to protonate in this pH range and increase the mAb's net charge to positive values, thereby generating long range repulsion. These protonation events may also disrupt short range electrostatic interactions, such as the pairing of oppositely charged patches between proteins. Both of these pH effects on surface charge increased the apparent solubility.

Excipients, as opposed to solution pH, tune protein solubility through a combination of electrostatic screening and interactions with the protein. The mAb2 was very soluble at pH 5.5 because of its net positive charge, but the addition of salt stabilizers screened the long-range repulsion and decreased the solubility. The decrease in solubility was ion-specific (FIG. 43), which suggests that excipient-protein interactions also affected the short-ranged interactions between proteins. Excipients that are excluded from the protein's surface should drive proteins into precipitates, where proteins reduce their exposure to repulsive excipient interactions. Excipients that bind to proteins, however, should drive proteins to dissociate and expose more of their surface to the attractive excipient interactions. Moreover, when excipients bind to a protein, they can alter the effective protein charge and mask chemical moieties from participating in protein-protein interactions.

The solubility was lowest for the formulations containing sulfate. Sulfate likely reduced the mAb2 solubility by two mechanisms, including salting-out hydrophobic patches via exclusion and reducing the net charge by ion-paring with positively charged side chains (Zhang Y et al., PNAS 2009, 106 (36), 15249-15253; Gokarn Y R et al., Protein Science: A Publication of the Protein Society 2011, 20 (3), 580; Paterová J et al., J. Phys. Chem. B 2013, 117 (27), 8150-8158; Hladilkovi J et al., J. Phys. Chem. Lett. 2013, 4 (23), 4069-4073). Sodium sulfate produced the largest decrease in solubility, as excepted based on the exclusion of sodium from the protein surface (Okur H I et al., J. Am. Chem. Soc. 2013, 135 (13), 5062-5067; Kherb J et al., J. Phys. Chem. B 2012, 116 (25), 7389-7397). The solubility was increased in arginine sulfate, on the other hand, which may originate from arginine's ability to cover the hydrophobic and charged-charge interactions that drive precipitation, as well as by cluster with the sulfate counterions at the protein surface (Arakawa T et al., Biochemistry 1985, 24 (24), 6756-6762; Shiraki K et al., The Journal of Biochemistry 2002, 132 (4), 591-595; Golovanov A P et al., J. Am. Chem. Soc. 2004, 126 (29), 8933-8939; Valente J J et al., Biophys J 2005, 89 (6), 4211-4218; Arakawa T et al., Biophysical Chemistry 2007, 127 (1), 1-8; Schneider C P et al., J. Phys. Chem. B 2009, 113 (7), 2050-2058; Shukla D et al., J. Phys. Chem. B 2010, 114 (42), 13426-13438; Shukla D et al., J. Phys. Chem. B 2011, 115 (41), 11831-11839; Shukla D et al., J. Am. Chem. Soc. 2011, 133 (46), 18713-18718). The highest solubility was measured in arginine glutamate, corroborating previous observations of this stabilizer's synergistic effects on protein solubility. Together, these solubility measurements demonstrate the specificity of excipient effects.

Crowding-induced precipitation has several key advantages over direct solubility measurements, alternative precipitation methods and colloidal stability screening assays. Measuring solubility directly with centrifugal concentration is labor intensive and prohibitive for viscous samples (UF/DF). Precipitation methods that use ammonium sulfate can circumvent these problems (Trevino S R et al., J Mol Biol 2007, 366 (2), 449-460; Trevino S R et al., Journal of Pharmaceutical Sciences 2008, 97 (10), 4155-4166; Pace C N et al., J Biol Chem 2009, 284 (20), 13285-13289; Klijn M E et al., Bioprocess Biosyst Eng 2020, 43 (3), 439-456), but electrostatic precipitant-protein interactions can influence the solubility assessment. Non-interacting polymers, on the other hand, are ideal for measuring apparent solubilities. Crowding assays are more flexible than high-throughput light scattering measurements, which are limited to low protein concentrations, because they can be performed across a wide range of protein concentrations and formulation excipients. The temperature gradient microfluidics technology allows rapid analysis of solubility for many samples in a single experiment. This style of device adds to the growing efforts to miniaturize and increase the throughput of protein solubility measurements (Klijn M E et al., Bioprocess Biosyst Eng 2020, 43 (3), 439-456; Klijn M E et al., Bioprocess Biosyst Eng 2020; Hansen C L et al., PNAS 2004, 101 (40), 14431-14436; Selimovid S et al., Lab on a Chip 2010, 10 (13), 1696-1699; Kopp M R G et al., Anal. Chem. 2020, 92 (8), 5803-5812; Bremer A et al., bioRxiv 2020, 2020.06.16.154518).

In order to accelerate and improve the selection of optimal formulation conditions, it is critical to employ high-throughput assays that quantify high concentration protein behavior and use them to predict their impact on shelf-life. This study establishes the methodology of using temperature gradient microfluidics as a screening tool in formulation development. The apparent solubility was measured by crowding-induced precipitation as a function of both solution pH and excipient chemistry. The variation of the solubility with formulation chemistry was influenced by a combination of long-range electrostatics and short-range interactions that were related to the protein's surface charge, the effective net charge, and the exposure of the protein's surface to the solvent. The high-throughput identification of insoluble formulation conditions under high concentration stress offers a promising and orthogonal technique to expand the capabilities of currently available screening assays. The use of this technology in the biopharmaceutical industry has the potential to reduce solubility risks for manufacturing and storing high concentration liquid injectables.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method of characterizing aqueous two-phase system (ATPS) formation in a macromolecule solution, comprising the steps of:
    providing a temperature gradient device having a hot surface and a cold surface separated by a gap space;
    providing a sample holder having a first end, a second end, a length in-between, and at least one sample reservoir positioned within the length of the sample holder, wherein the length spans at least the gap space of the temperature gradient device to touch the hot surface and the cold surface;
    loading at least one macromolecule solution into the at least one sample reservoir;
    positioning the sample holder onto the temperature gradient device such that the first end and the second end touch the hot surface and the cold surface simultaneously to establish a temperature gradient across the length of the sample holder;
    imaging the length of the sample holder spanning the gap space over a time period to capture light scattering intensity as a function of temperature in the sample holder; and
    calculating a phase separation temperature ($T_{ph}$), a spinodal temperature ($T_{meta}$), and a gelation temperature ($T_g$) of the at least one macromolecule solution in each of the at least one sample reservoir.

2. The method of claim 1, wherein the positioning step establishes a linear temperature gradient across the length of the sample holder.

3. The method of claim 1, wherein the $T_{ph}$ of the at least one macromolecule solution is calculated at a time point of temperature gradient stabilization at a position along the length of the sample holder wherein an onset of light scattering intensity begins in the sample reservoir containing the at least one macromolecule solution as detected by the imaging step.

4. The method of claim 3, wherein the time point of temperature gradient stabilization is about 1 minute after the positioning step.

5. The method of claim 1, wherein the $T_{meta}$ of the at least one macromolecule solution is calculated at a time point of phase separation completion below the $T_{ph}$ at a position along the length of the sample holder wherein light scattering intensity reaches a minimum intensity in the sample reservoir containing the at least one macromolecule solution as detected by the imaging step.

6. The method of claim 1, wherein the $T_g$ of the at least one macromolecule solution is calculated at a time point of phase separation completion below the $T_{ph}$ at a position along the length of the sample holder wherein an onset of light scattering intensity begins in the sample reservoir containing the at least one macromolecule solution as detected by the imaging step.

7. The method of claim 1, wherein the hot surface has a temperature of between about 300 and 350 K and the cold surface has a temperature of between about 250 and 300 K.

8. The method of claim 1, wherein the imaging step is performed using light field microscopy, dark field microscopy, fluorescence microscopy, raman microscopy, polarized light microscopy, phase-contrast microscopy, differential interference contrast microscopy, or multiphoton excitation microscopy.

9. The method of claim 1, wherein the sample holder is selected from the group consisting of: cuvettes, capillary tubes, and multi-well plates.

10. The method of claim 1, wherein a colloidal phase diagram is created by calculating the phase separation temperature ($T_{ph}$), the spinodal temperature ($T_{meta}$), and the gelation temperature ($T_g$) of the macromolecule solution over a range of concentrations to generate a bimodal curve, a spinodal curve, and a gelation line, respectively.

11. The method of claim 10, wherein the bimodal curve and the spinodal curve meet at a single point corresponding to a critical temperature $T_{crit}$ and a critical concentration $C_{crit}$.

12. The method of claim 1, wherein the $T_{ph}$ of the at least one macromolecule solution is raised by the addition of a non-ionic crowding agent.

13. The method of claim 12, wherein the non-ionic crowding agent is selected from the group consisting of: polyethylene glycol (PEG), Ficoll, and dextran.

14. The method of claim 1, wherein the $T_{ph}$ of the at least one macromolecule solution is lowered by the addition of a salt.

15. The method of claim 1, wherein a ATPS formation kinetics at a low macromolecule concentration can be expressed as a first-order reaction $$N = N_0 \exp(-k_{1st}t)$$

wherein droplet number N decays from an initial number No as a function of time t with a first-order rate constant $k_{1st}$.

16. The method of claim 1, wherein a ATPS formation kinetics at a high macromolecule concentration can be expressed as a second-order reaction $$\frac{1}{N} - \frac{1}{N_0} = k_{2nd}t$$

wherein droplet number N decays from an initial number No as a function of time t with a second-order rate constant $k_{2nd}$.

17. The method of claim 1, wherein the ATPS formation can be modeled using a Kohlrausch-Williams-Watts (KWW) function $$I = \exp(-(k_{KWW}t)^{\beta^{KWW}})$$

wherein I is normalized scattering intensity, t is time, $\beta^{KWW}$ is a cooperativity index, and $k_{KWW}$ is an apparent ATPS formation rate constant.

18. The method of claim 17, wherein a maximum rate constant, $k_{max}$, occurs within a region of spinodal temperature $T_{meta}$.

19. The method of claim 17, wherein a crossover in cooperativity occurs within a region of gelation temperature $T_{gel}$ where $\beta_{KWW}=1$.

20. The method of claim 12, wherein a critical crowder concentration is obtained by adding a concentration of the non-ionic crowding agent that produces the $T_{ph}$ of between about 0° C. and 30° C.

21. The method of claim 20, wherein the critical crowder concentration is obtained by adding a concentration of the non-ionic crowding agent that produces the $T_{ph}$ of 15° C.

22. The method of claim 20, wherein the at least one macromolecule solution has a minimum critical crowder concentration at an isoelectric point (pI).

23. The method of claim 20, wherein increasing the critical crowder concentration is configured to predict increased macromolecule stability.

24. The method of claim 23, wherein the at least one macromolecule solution comprises one or more excipients selected to maintain or increase the critical crowder concentration.

* * * * *